United States Patent [19]
Diewald

[11] Patent Number: 5,805,909
[45] Date of Patent: Sep. 8, 1998

[54] MICROPROCESSORS OR MICROCONTROLLER UTILIZING FLL CLOCK HAVING A REDUCED POWER STATE

[75] Inventor: Horst Diewald, Freising, Germany

[73] Assignee: Texas Instruments Incorporated, Dallas, Tex.

[21] Appl. No.: 510,808

[22] Filed: Aug. 3, 1995

[51] Int. Cl.[6] ............................... G06F 1/32; G06F 1/04
[52] U.S. Cl. ............... 395/750.04; 395/556; 395/750.05
[58] Field of Search .................... 395/750, 560, 395/559, 556, 750.04, 750.05; 364/482, 493

[56] References Cited

U.S. PATENT DOCUMENTS

| | | | |
|---|---|---|---|
| 4,677,322 | 6/1987 | Burson et al. | 307/525 |
| 4,918,405 | 4/1990 | Herleikson | 331/11 |
| 5,422,807 | 6/1995 | Mitra et al. | 364/184 |
| 5,506,790 | 4/1996 | Nguyen | 364/492 |
| 5,537,650 | 7/1996 | West et al. | 395/750 |

OTHER PUBLICATIONS

*Motorola Semiconductor Master Selection Guide*; Motorola, Inc. 1989; pp. 2–12 through 2–16.
*Texas Instruments First–Generation TMS320* User's Guide Texas Instruments Incorporated, 1988; pp. 6–8 and 6–9.
Diplomarbeit: Entwurfs– und Simulationssystem fur Brukenwellendigitalfilter fur den Sensorsignalprozessor MSP430, W. Meixer, 30 Sep. 1993, pp. 16–24, Fachhochschule Munchen.
Elektronik Entwicklung, "Intelligent Sensors", B. Ihler, vol. 24, No. 7–8, ISSN 0172–6153, pp. 11–13, Jul.–Aug. 1989, West Germany.
Computer Design, 32–Bit RISC Controller Targets PDAs, J. Child, vol. 32, No. 8, J. Child, p. 114 XP 000393011, 1 Aug. 1993.
Electronic Engineering, "Modular Design Adds Flexible UART to Microcomputer", vol. 55, No. 680, ISSN 0013–4902, pp. 37–44, S. Banerji et al., Aug. 1983, United Kingdom.
Patent Abstract of Japan, vol. 017, No. 175 (P–1516), 5 Apr. 1993.

*Primary Examiner*—Glenn A. Auve
*Attorney, Agent, or Firm*—Richard L. Donaldson; Gerald E. Laws

[57] ABSTRACT

A microprocessor or micro-controller of a module design and adapted for low power is described. Each of the modules is addressed and controlled by the CPU in the same way. All assembler instructions and all address modes can be applied to each module. Also, all 16 registers of the CPU are identical in character and can be used with each of the seven address modes. One such device is available in a 4K Byte or 8K Byte ROM, EPROM or RAM version (for prototyping). The high precision 12-bit A/D converter (which can be expanded to 14 bits without additional components) is combined with an LDC drive to output measurement results; the FET driver to switch on loads; the 8-bit Timer/Counter; several I/O ports which accept interrupts; and a watchdog which guarantees safe operation during unexpected events. Up to 16 nested interrupt levels (7 used in the first product) are active during all Processor/Power modes to capture various external events or timer results. A powerful set of only 51 assembler instructions and 76 address modes allow convenient and fast programming. The CPU can be programmed with minimal effort and a small number of code lines and is extremely economical with ROM space (the number of code lines for a task is a measurement of the programming time).

11 Claims, 44 Drawing Sheets

FIG. 2
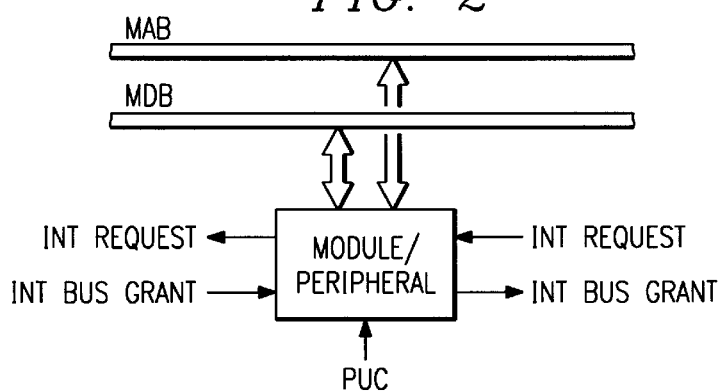
FIG. 3
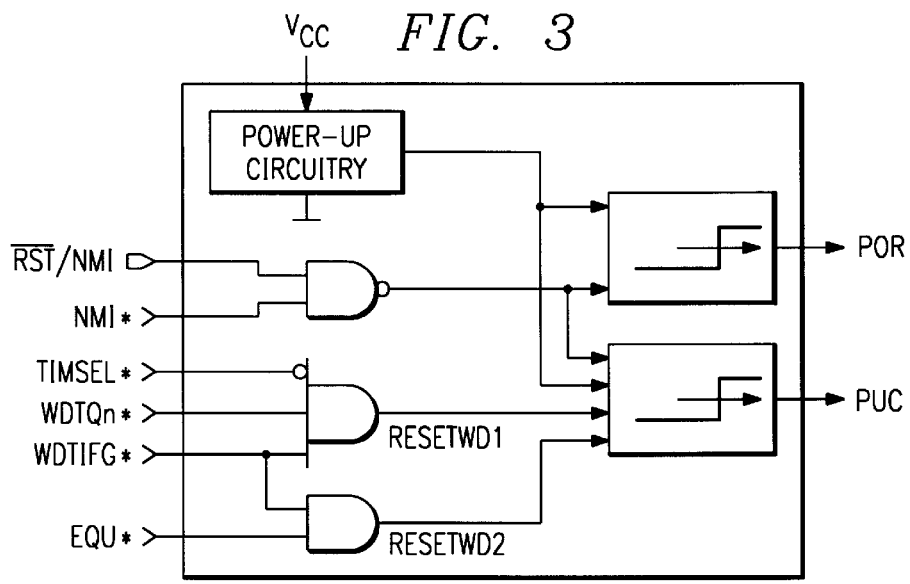
FIG. 7
| ADDRESS | NAME | 7                        0 | |
|---|---|---|---|
| 010h | P0IN | INPUT REGISTER | R |
| 011h | P0OUT | OUTPUT REGISTER | R/W |
| 012h | P0DIR | DIRECTION REGISTER | R/W |
| 013h | P0IFG | INTERRUPT FLAGS *) | R/W |
| 014h | P0IES | INTERRUPT EDGE SELECT | R/W |
| 015h | P0IE | INTERRUPT ENABLE | R/W |
*) THE TWO LSB OF INTERRUPT FLAGS ARE LOCATED IN SFR'S

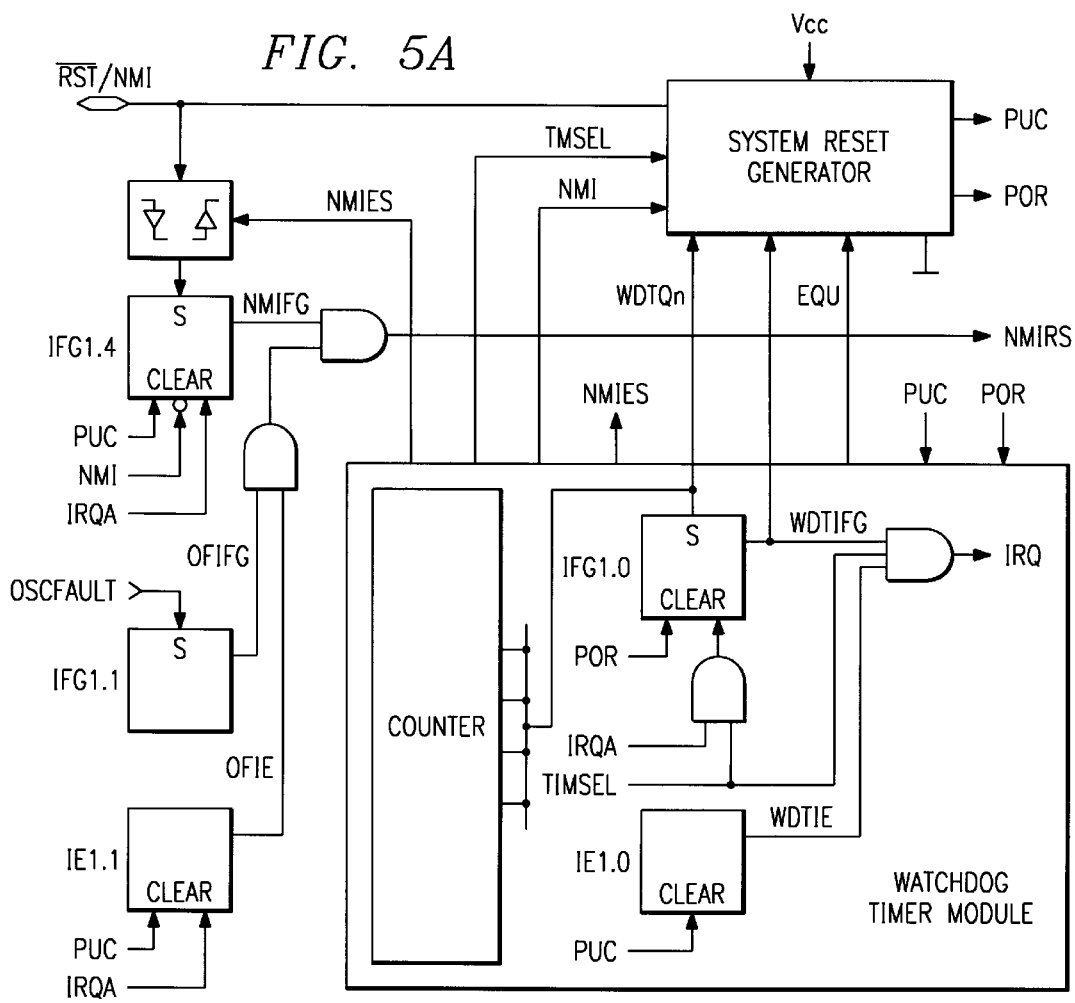

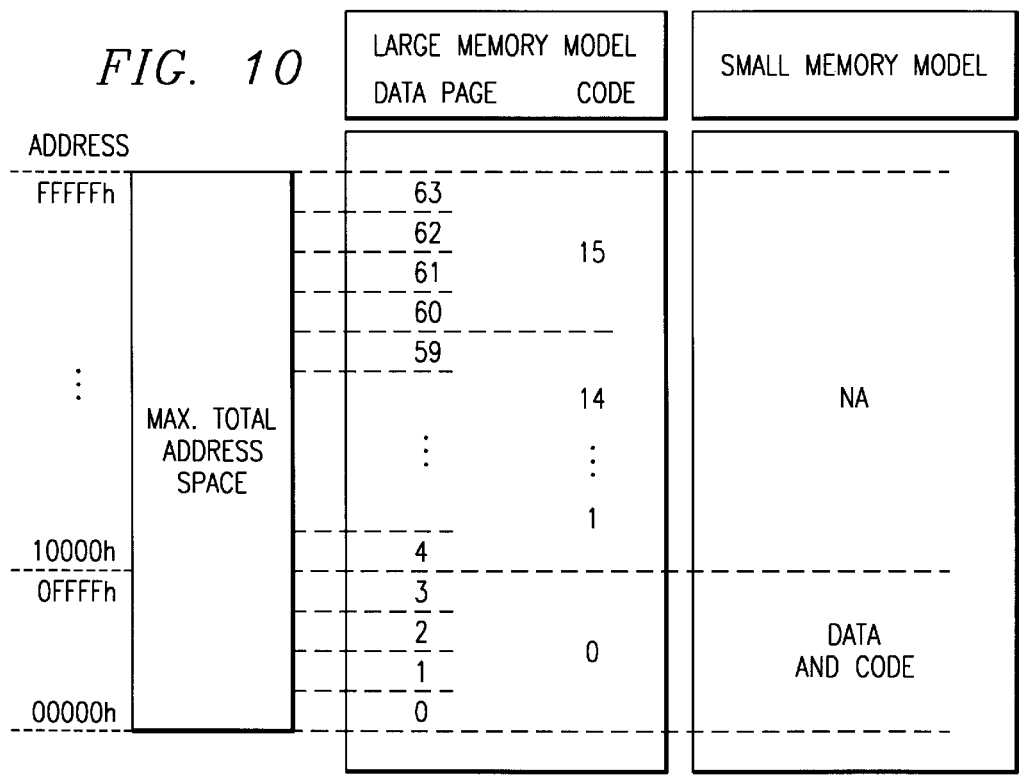

FIG. 15

| | |
|---|---|
| ⋮ | xxxAh |
| BYTE1: 012h | xxx9h |
| BYTE2: 034h | xxx8h |
| WORD1(HIGH BYTE):056h | xxx7h |
| WORD1(LOW BYTE):078h | xxx6h |
| WORD2(HIGH BYTE):09Ah | xxx5h |
| WORD2(LOW BYTE):0BCh | xxx4h |
| ⋮ | xxx3h |

ADD.B Byte1,Byte2::
Byte2=012h+034h=046h

ADD.W Word1,Word2::
Word2=05678h+09ABCh=0F134h

FIG. 16

| ADDRESS (HEX) | 7  0 | FUNCTION | ACCESS |
|---|---|---|---|
| 01FFh ⋮ 0100h | 16BIT PERIPHERAL MODULES | TIMER, ADC,... | WORD |
| 0FFh 010h | 8BIT PERIPHERAL MODULES | I/O, LCD, 8b T/C,... | BYTE |
| 0Fh 0h | SPECIAL FUNCTION REGISTERS | SFR | BYTE |

FIG. 17

| 15 | | 1 | 0 |
|---|---|---|---|
| | PROGRAM COUNTER BITS 15 TO 1 | | 0 |

FIG. 18

| 15 | | 1 | 0 |
|---|---|---|---|
| | SYSTEM STACK POINTER BITS 15 TO 1 | | 0 |

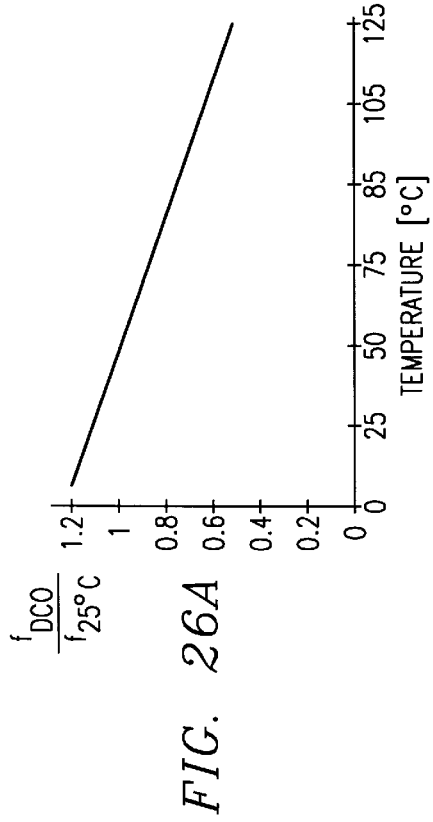
FIG. 26A
FIG. 26B
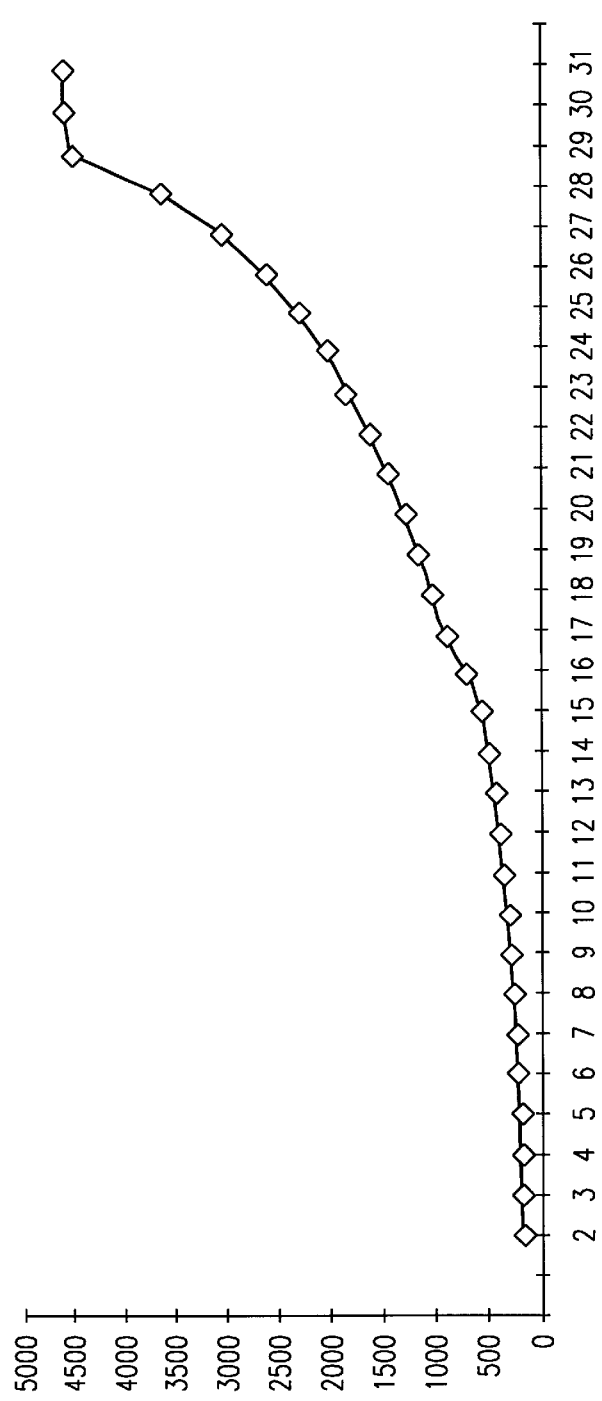
FIG. 26C

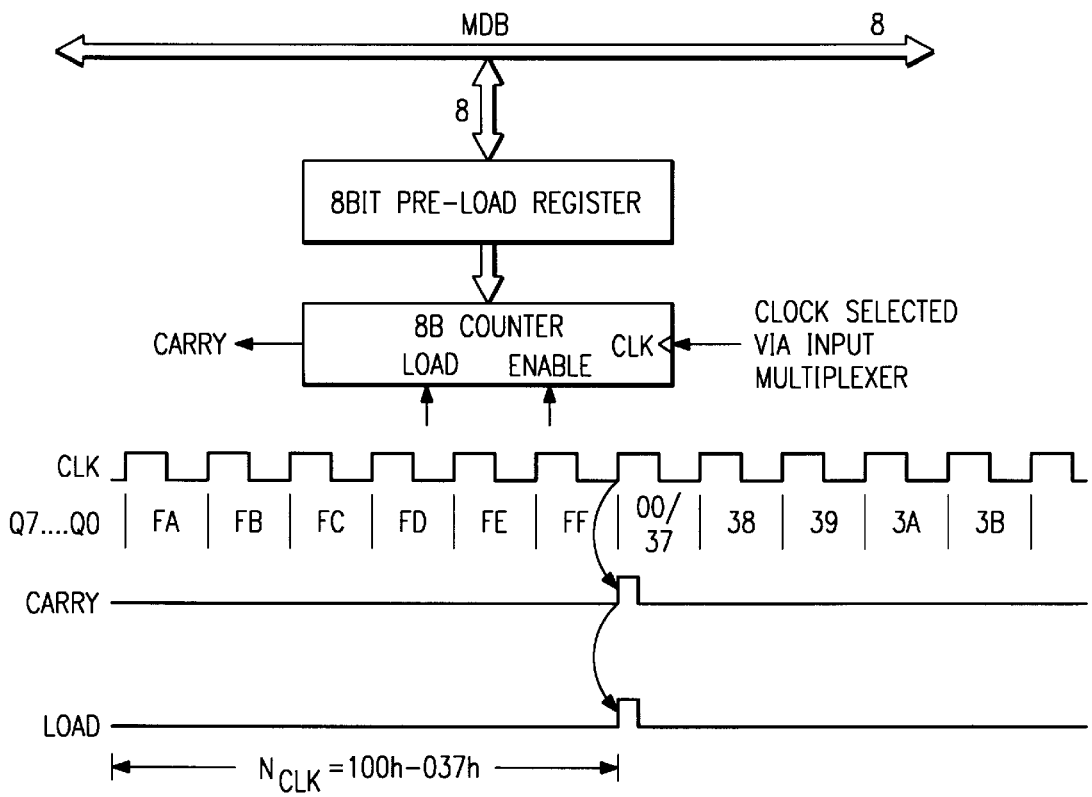
FIG. 39
FIG. 40
| TCCTL 00042h | SSEL1 | SSEL0 | ISCTL | TXE | ENCNT | RXACT | TXD | RXD |
|---|---|---|---|---|---|---|---|---|
| | rw-0 | rw-0 | rw-0 | rw-0 | rw-0 | rw-0 | rw-0 | r(-1) |
bit 7 ... bit 0
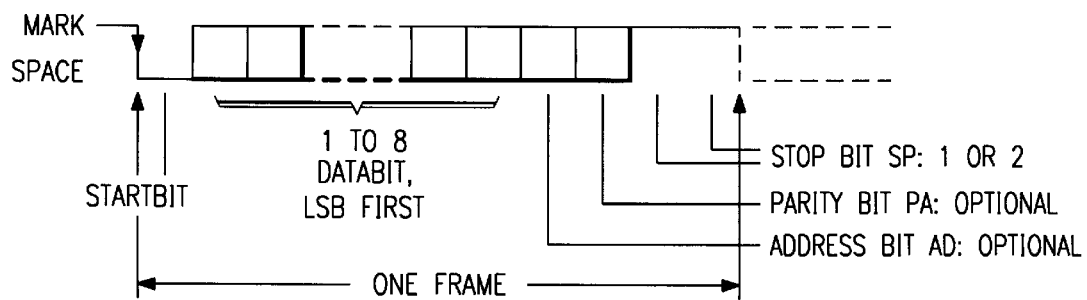
FIG. 41

FIG. 58

| MDB BIT | 7 | 6 | 5 | 4 | 3 | 2 | 1 | 0 | | |
|---|---|---|---|---|---|---|---|---|---|---|
| COM | 3 | 2 | 1 | 0 | 3 | 2 | 1 | 0 | | 1/2 DIGIT 8 |
| MAB 0003Fh | – | – | d | c | – | – | b | a | n=28 | |
| 0003Eh | – | – | h | g | – | – | f | e | n=26 | DIGIT 7 |
| 0003Dh | – | – | d | c | – | – | b | a | n=24 | |
| 0003Ch | – | – | h | g | – | – | f | e | n=22 | DIGIT 6 |
| 0003Bh | – | – | d | c | – | – | b | a | n=20 | |
| 0003Ah | – | – | h | g | – | – | f | e | n=18 | DIGIT 5 |
| 00039h | – | – | d | c | – | – | b | a | n=16 | |
| 00038h | – | – | h | g | – | – | f | e | n=14 | DIGIT 4 |
| 00037h | – | – | d | c | – | – | b | a | n=12 | |
| 00036h | – | – | h | g | – | – | f | e | n=10 | DIGIT 3 |
| 00035h | – | – | d | c | – | – | b | a | n=8 | |
| 00034h | – | – | h | g | – | – | f | e | n=6 | DIGIT 2 |
| 00033h | – | – | d | c | – | – | b | a | n=4 | |
| 00032h | – | – | h | g | – | – | f | e | n=2 | DIGIT 1 |
| 00031h | – | – | d | c | – | – | b | a | n=0 | |

PARALLEL-SERIAL CONVERSION

FIFTEEN TIMES INCLUDED

| MDB BIT | 7 | 6 | 5 | 4 | 3 | 2 | 1 | 0 | | |
|---|---|---|---|---|---|---|---|---|---|---|
| COM | 3 | 2 | 1 | 0 | 3 | 2 | 1 | 0 | | |
| MAB 0003Fh | – | Y | h | g | – | f | e | d | n=28 | DIGIT 10 |
| 0003Eh | – | c | b | a | – | Y | h | g | n=26 | DIGIT 9 |
| 0003Dh | – | f | e | d | – | c | b | a | n=24 | |
| 0003Ch | – | Y | h | g | – | f | e | d | n=22 | DIGIT 8 |
| 0003Bh | – | c | b | a | – | Y | h | g | n=20 | DIGIT 7 |
| 0003Ah | – | f | e | d | – | c | b | a | n=18 | |
| 00039h | – | Y | h | g | – | f | e | d | n=16 | DIGIT 6 |
| 00038h | – | c | b | a | – | Y | h | g | n=14 | DIGIT 5 |
| 00037h | – | f | e | d | – | c | b | a | n=12 | |
| 00036h | – | Y | h | g | – | f | e | d | n=10 | DIGIT 4 |
| 00035h | – | c | b | a | – | Y | h | g | n=8 | DIGIT 3 |
| 00034h | – | f | e | d | – | c | b | a | n=6 | |
| 00033h | – | Y | h | g | – | f | e | d | n=4 | DIGIT 2 |
| 00032h | – | c | b | a | – | Y | h | g | n=2 | DIGIT 1 |
| 00031h | – | f | e | d | – | c | b | a | n=0 | |

PARALLEL-SERIAL CONVERSION
FIFTEEN TIMES INCLUDED $S_{n+1}$, $S_n$

FIG. 60

| MDB BIT | 7 | 6 | 5 | 4 | 3 | 2 | 1 | 0 | | | |
|---|---|---|---|---|---|---|---|---|---|---|---|
| COM | 3 | 2 | 1 | 0 | 3 | 2 | 1 | 0 | | | |
| MAB 0003Fh | h | g | f | e | d | c | b | a | n=28 | DIGIT 15 |
| 0003Eh | h | g | f | e | d | c | b | a | n=26 | DIGIT 14 |
| 0003Dh | h | g | f | e | d | c | b | a | n=24 | DIGIT 13 |
| 0003Ch | h | g | f | e | d | c | b | a | n=22 | DIGIT 12 |
| 0003Bh | h | g | f | e | d | c | b | a | n=20 | DIGIT 11 |
| 0003Ah | h | g | f | e | d | c | b | a | n=18 | DIGIT 10 |
| 00039h | h | g | f | e | d | c | b | a | n=16 | DIGIT 9 |
| 00038h | h | g | f | e | d | c | b | a | n=14 | DIGIT 8 |
| 00037h | h | g | f | e | d | c | b | a | n=12 | DIGIT 7 |
| 00036h | h | g | f | e | d | c | b | a | n=10 | DIGIT 6 |
| 00035h | h | g | f | e | d | c | b | a | n=8 | DIGIT 5 |
| 00034h | h | g | f | e | d | c | b | a | n=6 | DIGIT 4 |
| 00033h | h | g | f | e | d | c | b | a | n=4 | DIGIT 3 |
| 00032h | h | g | f | e | d | c | b | a | n=2 | DIGIT 2 |
| 00031h | h | g | f | e | d | c | b | a | n=0 | DIGIT 1 |

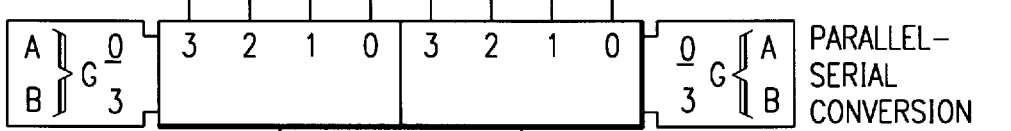

PARALLEL–
SERIAL
CONVERSION

FIFTEEN TIMES
INCLUDED

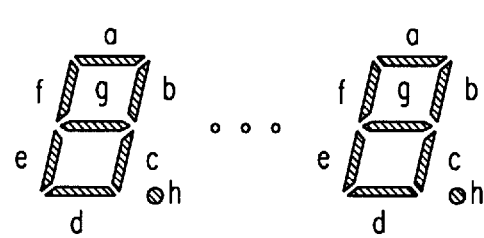

FIG. 75A
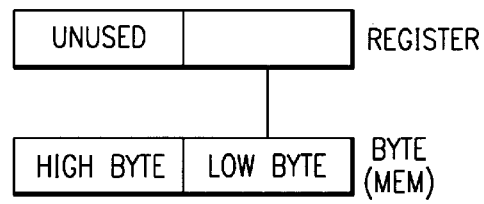
FIG. 75B
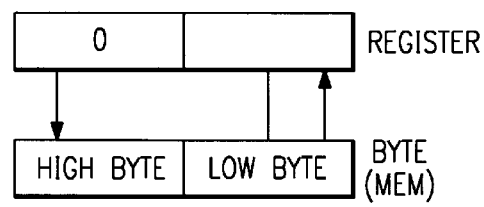
FIG. 76
| | |
|---|---|
| PROGRAM COUNTER PC | R0 |
| STACK POINTER SP | R1 |
| STATUS REGISTER SR | R2 |
| CONSTANT GENERATOR CG1 | |
| CONSTANT GENERATOR CG2 | R3 |
| WORKING REGISTER R4 | R4 |
| WORKING REGISTER R5 | R5 |
| ⋮ | ⋮ |
| WORKING REGISTER R13 | R13 |
| WORKING REGISTER R14 | R14 |
| WORKING REGISTER R15 | R15 |

FIG. 77A

| ADDRESS 0052h | 7 | | | | | | | 0 | |
|---|---|---|---|---|---|---|---|---|---|
| | M | $2^6$ | $2^5$ | $2^4$ | $2^3$ | $2^2$ | $2^1$ | $2^0$ | SCFQCTL |
| | rw-0 | rw-0 | rw-0 | rw-1 | rw-1 | rw-1 | rw-1 | rw-1 | |

FIG. 77B

| ADDRESS 0050h | 7 | | | | | | | 0 | |
|---|---|---|---|---|---|---|---|---|---|
| | 0 | 0 | 0 | 0 | 0 | 0 | $2^1$ | $2^0$ | SCFI0 |
| | r | r | r | r | r | r | rw-0 | rw-0 | |

FIG. 77C

| ADDRESS 0051h | 7 | | | | | | | 0 | |
|---|---|---|---|---|---|---|---|---|---|
| | $2^9$ | $2^8$ | $2^7$ | $2^6$ | $2^5$ | $2^4$ | $2^3$ | $2^2$ | SCFI1 |
| | rw-0 | rw-0 | rw-0 | rw-0 | rw-0 | rw-0 | rw-0 | rw-0 | |

FIG. 78A

| WDTCTL 120h | 15 | | | | | | | 8 | 7 | 0 |
|---|---|---|---|---|---|---|---|---|---|---|
| | 0 | 1 | 1 | 0 | 1 | 0 | 0 | 1 | READ DATA | |
| | r | r | r | r | r | r | r | r | rw-x, (w) | |

FIG. 78B

| WDTCTL 120h | 15 | | | | 8 | 7 | 0 |
|---|---|---|---|---|---|---|---|
| | 0 1 0 1 | | | 1 0 1 0 | | WRITE DATA | |
| | (w) 5 | | | A | | rw-x, (w) | |

MICROPROCESSORS OR MICROCONTROLLER UTILIZING FLL CLOCK HAVING A REDUCED POWER STATE

BACKGROUND OF THE INVENTION

The present invention relates to micro-controllers and micro-processors and in particular to a micro-controller architecture and family of devices that is adapted for analogue measurement, data processing and data transmission.

Energy consumption and the usage of natural resources is an ever increasing necessity in today's world. The limitation in natural resources like water, gas and oil, and the pollution caused as a side effect of using them require a more careful usage of energy. This can only be achieved by accurate monitoring.

Electronic Metering systems are ideal for this task and can guarantee accurate and stable measurement of all utilities over a long period of time.

A drawback of electronic system is their requirement for a power source which is problematic in remote or hazardous locations when powered by batteries. Typically microprocessors are designed for high processing speed which increases power consumption.

Another important requirement is that of cost. If a monitoring system cannot be installed and maintained cheaply then the concept will be abandoned and the resources will not be conserved.

SUMMARY OF THE INVENTION

According to the present invention in one more aspect thereof there is provided a micro-controller as claimed in the appended claims.

The device is organized as a series of modules including analogue modules which are addressed in a similar way. This leads to great flexibility in manufacturing since each module may be included or not in any particular device. Modules may also be repeated. Hence, there is a family of devices available without the cost of individual designs leading to a low cost controller adapted for monitoring.

According to the present invention in another aspect thereof there is provided a microprocessor or microcontroller organized for power saving and low power.

According to the present invention in yet a further aspect there is provided a micro-controller or micro processor of a modular arrangement.

Each of the modules is addressed and controller by the CPU in the same way. All assembler instructions and all address modes can be applied to each module. Also, all 16 registers of the CPU are identical in character and can be used with each of the seven address modes.

One such device is available in a 4K Byte or 8K Byte ROM, EPROM or RAM version (for prototyping). The high precision 12-bit A/D converter (which can be expanded to 14 bits without additional components) is combined with an LDC drive to output measurement results; the FET driver to switch on loads; the 8-bit Timer/Counter; several I/O ports which accept interrupts; and a watchdog which guarantees safe operation during unexpected events.

High accuracy analog measurement, data processing and data transmission are the strengths of this product. The MSP430 performs all these tasks, and controls the application with minimal power consumption.

As many as 6 Power Modes are available to switch parts of the device off stepwise. This means small batteries and long product lifetime.

Up to 16 nested interrupt levels are active during all Processor/Power modes to capture various external events or timer results.

A powerful set of only 51 assembler instructions and 76 address modes allow convenient and fast programming.

The CPU can be programmed with minimal effort and a small number of code lines and is extremely economical with ROM space (the number of code lines for a task is a measurement of the programming time).

BRIEF DESCRIPTION OF THE DRAWINGS

In order that features and advantages of the present invention may be further appreciated embodiments will now be described by way of example only and with reference to the accompanying diagrammatic figures of which:

FIG. 2 represents bus connection of modules/peripherals.

FIG. 3 represents System Reset Function.

FIG. 5A represents reset/NMI-mode selection.

FIG. 5B illustrates Watch Dog Timer Control Register;

FIG. 6 represents Status Register SR.

FIG. 7 represents I/O Control Registers.

FIG. 10 represents Total Memory Address Space.

FIG. 11 represents Memory Map of Basic Address Space.

FIG. 15 represents Byte and Word Operation.

FIG. 16 represents RAM/peripheral organization example.

FIG. 17 represents Program Counter PC.

FIG. 18 represents System Stack Pointer SP.

FIG. 25 represents schematic of system frequency generator.

FIG. 26 represents DCO Characteristics (typical).

FIG. 39 represents Schematic of 8 bit Counter.

FIG. 40 represents 8 bit Timer/Counter Control Register.

FIG. 41 represents Asynchronous communication format.

FIG. 58 represents use of Display Memory at 2MUX method.

FIG. 59 represents use of Display Memory at 3MUX method.

FIG. 60 represents use of Display Memory at 4MUX method.

FIG. 75A shows an example of register-byte operations;

FIG. 75B shows an example of a byte-register operation;

FIG. 76 illustrates the fifteen 16-bit registers;

FIG. 77A illustrates the SCFQCTL register;

FIG. 77B illustrates the SCFI0 register;

FIG. 77C illustrates the SCFI1 register;

FIG. 78A illustrates reading the WDTCTL register; and

FIG. 78B illustrates writing the WDTCTL register.

DETAILED DESCRIPTION

Figure 1:
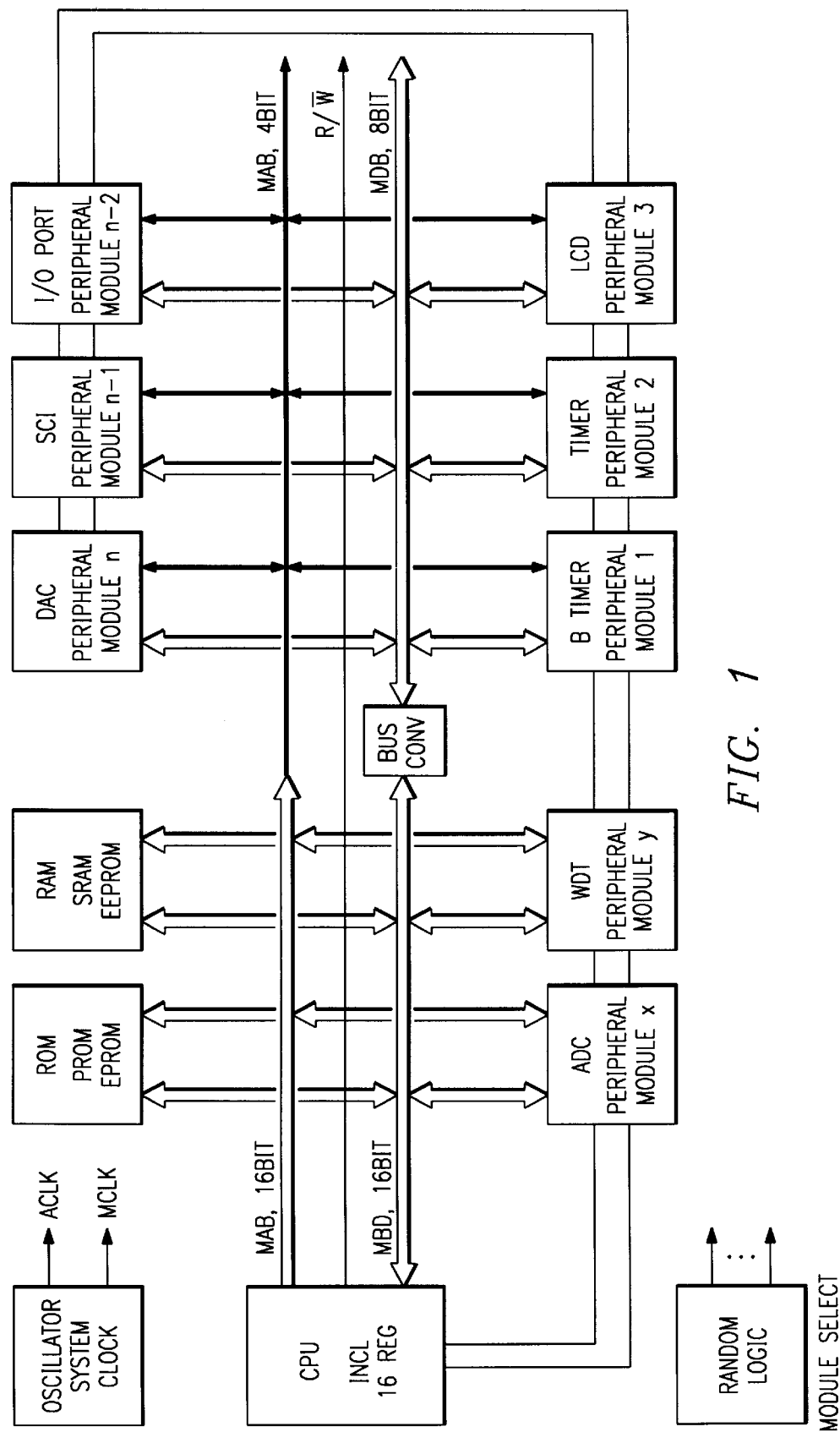
FIG. 1 represents system configuration.

The architecture of the device, hereinafter referred to as the MSP is based on a memory-to-memory architecture, a common address space for all functional blocks and a reduced instruction set applicable for all functional blocks (see FIG. 1).

The central processing unit incorporates following reduced, highly transparent instruction set and highly orthogonal design. It consists of a sixteen bit ALU, sixteen registers and an instruction control logic. Four of these registers are used for special purpose like Program Counter PC, Stack Pointer SP, Status Register SR and Constant Generator CG2. All registers—except R3/CG2 and part of R2/CG1—can be used as general-purpose registers applying the complete instruction set to registers. The constant generator supplies constants for performing the instruction not for storing any data. The addressing mode used on CG1 separates the data of the constants. The complete control over Program Counter, processor's Status Register and Stack Pointer with the reduced instruction set opens development of applications with complex addressing modes or SW algorithm.

The access to the Code Memory is always word organized for fetching code and data can be read with word or byte access. Any access uses the 16 bit Memory Data Bus and as many of the least significant address lines as it is needed to access the memory locations. Blocks of memory are automatically selected via Module Enable signals as a technique to reduce overall current consumption. Program memory can be integrated as programmable (EPROM) or mask programmable (ROM) memory. Standard members of the MSP430 family support OTP and mask programmed versions. Support of external memory is subject of future enhancements. Sixteen words of memory are reserved for reset and interrupt vectors at the top of the lowest 64 kByte address space from 0FFFFh down to 0FFE0h. Access to Program Memory via software program is fully supported for read operation (MOV #0FFA1h,R5) not for write (→ROM).

The address space will be enhanced using segmented memory areas. The expanded addressable space is supported mainly using three extensions: branch and call long instructions, code segment pointer CSP and data pointer DPP. The code segment pointer is located within the status register SR. This enhanced address space is used for instruction codes (CSP+PC) and for data memory ([DPPi]+operand address):

MAB = CSP*10000h + PC     during any access to code memory
MAB = DDP$_i$*4000h + R$_{s/d}$     during any access to stack or data memory For basic devices using up to 64 kByte addressing space the content of CSP and DPP is unused by the Memory Address Bus.

The Data Memory is connected to the CPU via two busses, the Memory Address Bus (MAB) and the Memory Data Bus (MDB). The Data Memory can be integrated into the specific family member either with full (word) data width or with reduced (byte) data width.

The entire instruction set is operating fully onto byte and word data. All operations on stack and PC are word operations and should use only aligned address.

The operations of the different MSP430 members are controlled mainly with the information stored in special function registers SFR'S. The different bits in the SFR's enable interrupts, support the software on the status of the interrupt flags and define the operating modes of the peripherals. Peripherals that are disabled stop their functional operation to reduce current consumption. All data stored in the module's register are retained. Peripherals that can be controlled on their operating mode can be identified in the specific sections.

Peripheral modules are connected to the CPU via Memory Address Bus MAB, Memory Data Bus MDB and interrupt service and request lines (see FIG. 2). The MAB is usually a 4 bit bus for most of the peripherals. The MDB is 8 bit or 16 bit bus. Modules with 8 bit data bus are connected via a bus conversion circuitry to the 16 bit CPU. The data exchange with these modules should be handled with byte instructions without any exception. Instruction execution on word oriented peripherals operate without any restrictions. Most of the peripherals are operating in byte format. The SFR's are handled within 8 bit data range without any exception. The operation to 8 bit peripherals follows the described orders.

The oscillator is specially designed for commonly used clock crystal 32 768 Hz with low current consumption. All analog components are integrated; only the crystal has to be connected. This oscillator is source for some modules with low frequency requirements. For the CPU and other modules the crystal's frequency is multiplied by a first order frequency lock loop circuitry FLL. The FLL starts after power-up with its lowest possible frequency and is regulated to the proper frequency by controlling a digital controlled oscillator DCO. The short-time stability is better than for controller operation and the long-term deviation is limited by the stability of the crystal and oscillator. The frequency of the clock generator for the processor operation is a fix multiple of the crystal and supports the clock MCLK.

The MSP has four possible reset sources applying supply voltage to VCC pin, a low input to the RST/NMI pin, a programmable watchdog timer time-out and a security key violation during write access to WDTCTL register (see FIG. 3).

After the occurrence of a reset, the program can interrogate flags according to reset source. The program can determine the source of reset in order to take appropriate action.

The MSP starts hardware initialization after applying VCC:
All I/O-pins are switched to the input direction
The I/O-flags are cleared as described in the appropriate peripheral descriptions
The address contained in the reset vector at word address 0FFFEh is placed into the Program Counter
The CPU starts at the address contained in the PUC vector.
The status register SR is reset.
All registers have to be initialized by the user's program (e.g., the Stack Pointer, the RAM, ... )—except PC and SR.
Registers located in the peripherals are handled as described in the appropriate section.
The frequency controlled system clock starts with the lowest frequency of the digital controlled oscillator. After the start of the crystal clock the frequency is regulated to the target value.

The RST/NMI pin is configured with the reset function after applying VCC. It remains reset as long as the reset function is selected. When the pin is configured with the reset function, the MSP430 starts operation after the RST/NMI pin is pulled down to Gnd and released with the following:
The address contained in the reset vector at word address 0FFFEh is placed into the Program Counter
The CPU starts at the address contained in the reset vector after the release of the RST/NMI pin.
The status register SR is reset.
All registers have to be initialized by the user's program (e.g., the Stack Pointer, the RAM, ... )—except PC and SR.
Registers located in the peripherals are handled as described in the appropriate section.
The frequency controlled system clock starts with the lowest frequency of the DCO. After the start of the crystal clock the frequency is regulated to the target value.
There are three types of interrupts:
System reset
Nonmaskable interrupts
Maskable interrupts
Sources causing a system reset are

| | |
|---|---|
| • Applying Supply voltage | @POR, PUC |
| • 'low' on RST/NMI (if reset mode selected) | @POR, PUC |
| • Watchdog timer overflow (if watchdog mode selected) | @PUC |
| • Watchdog timer security key violation (write to WDTCTL with incorrect password) | @PUC |

Figure 4:
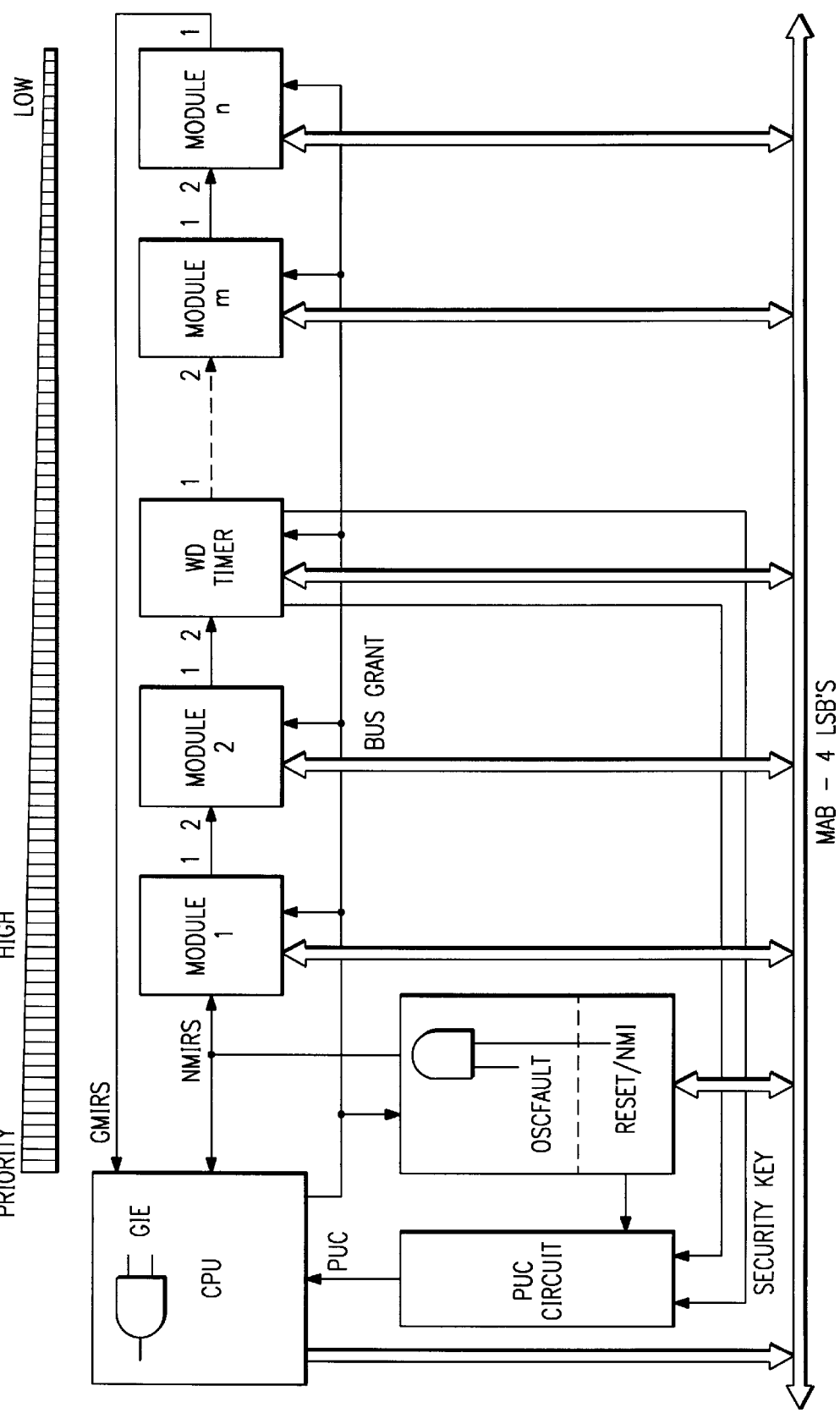
FIG. 4 represents interrupt priorities.

An NMI interrupt can be generated by:
Edge on RST/NMI -pin (if NMI mode selected)
Oscillator fault
Sources for maskable interrupts are:
Watchdog timer overflow (if timer mode selected)
other modules having interrupt capability
The interrupt priority of the modules is defined by the arrangement of the modules in the connection chain: the nearer a module in the chain is towards the CPU/NMIRS the higher is the priority (see FIG. 4).

Reset and NMI can be used only alternatively because they use the same input pin. The associated control bits are located in the Watchdog Timer Control register and are also password protected (see FIG. 5A). FIG. 5B illustrates the WDTCTL Register.

BIT 5:The NMI-Bit selects the function of the RST/NMI –input pin. It is cleared after PUC.
NMI=0: The RST/NMI input works as Reset input.
As long as the RST/NMI –pin is held 'low', the internal PUC-signal is active (level sensitive).
NMI=1: The RST/NMI input works as edge sensitive non-maskable interrupt input.
BIT 6:This bit selects the activating edge of the RST/NMI input if NMI function is selected. It is cleared after PUC.
NMIES=0: A rising edge triggers a NMI-interrupt.
NMIES=1: A falling edge triggers a NMI-interrupt.
Referring to FIG. 5, if the Reset function is selected, the CPU is held in the reset state as long as the RST/NMI –pin is held 'low'. After the input has changed to high, the CPU starts program execution at the word address which is stored in word location 0FFFEh (Reset vector). If the NMI function is selected, an edge according to the NMIES-bit generates an unconditional interrupt and program execution is resumed at the address which is stored in location 0FFFEh. The RST/NMI flag in the SFR (IFG1.4) is also set. It is automatically reset during interrupt request service. The RST/NMI pin should never held permanently 'low'. When a situation happens that activates the PUC, the consecutive reset of the bits in WDTCTL register are reset and the reset function of RST/NMI pin is selected. An enduring 'low' at RST/NMI pin results in a permanent reset and system holds.

As described in the oscillator section, the FLL oscillator is still working even if the crystal is defect. But it runs at the lowest possible frequency. The second limit is the highest possible frequency. Both cases are usually error conditions and must be detectable by the CPU. Therefore the oscillator fault signal can be enabled by SFR bit IE1.1 to generate an NMI interrupt. By testing the interrupt flag IFG1.1 in the SER the CPU can determine if the interrupt was caused by an oscillator fault.

Three sources can initiate system reset:
Power-up logic
RST/NMI input
Watchdog overflow.

Resets caused by RST/NMI and the watchdog can be evaluated by S/W through testing the associated interrupt flags in SFR bits IFG1.4 resp. IFG1.0.

The MSP430 programmable interrupt structure allows flexible on-chip and external interrupt configurations to meet real-time interrupt-driven system requirements. Interrupt sources may come from processor's operating conditions like watchdog overflow, peripheral modules or external events. Each interrupt source can be disabled individually by an interrupt enable bit or all interrupts are disabled by general interrupt enable bit GIE in status register.

Whenever an interrupt is requested and the appropriate interrupt enable bit AND. the General Interrupt Enable Bit (GIE) is set, the interrupt service routine becomes active:

CPU active: The currently executed instruction is completed.

CPU stopped: The low power modes are terminated.

The Program Counter pointing to the next instruction is pushed onto the stack.

The Status Register is pushed onto the stack.

The interrupt with the highest priority is selected if multiple interrupts occurred during the last instruction and are pending for service.

The appropriate interrupt requesting flag is reset automatically on single source flags.

Multiple source flags remain set for servicing by software.

The general interrupt enable bit GIE is reset, the CPUOff bit, the OscOff bit and the SCG1*) bit are cleared, the status bits N, Z and C are reset.

The content of the appropriate interrupt vector is loaded into the Program Counter: The program continues with the interrupt handling routine at that address.

*) SCG0 is left unchanged and FLL loop control remains in previous operating condition.

Figure 70:
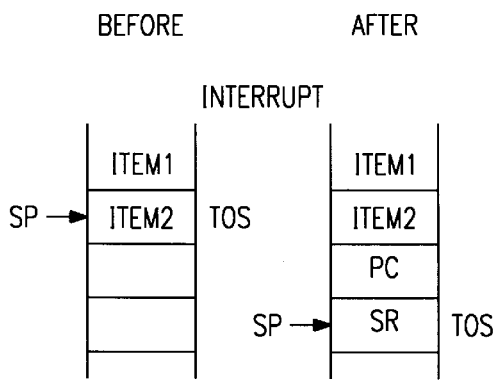
FIG. 70 shows the operation of the interrupt cycle.

The interrupt latency is six cycles starting with acceptance of an interrupt request till beginning execution of the first instruction of the appropriate interrupt service routine. FIG. 70 illustrates operation of the stack during an interrupt cycle.

The interrupt handling routine terminates with the instruction:

RETI which does the following actions:

The Status Register shown in FIG. 6 is popped from the stack. The interrupted software continues with exactly the same status like before interrupt including OscOff, CPUOff and GIE bits. The GIE bit in the Status Register replaces the logical state present during interrupt service with the pushed state from TOS. It is set anyway—because it was set prior accepting interrupt. The Program Counter is popped from the stack.

Figure 71:
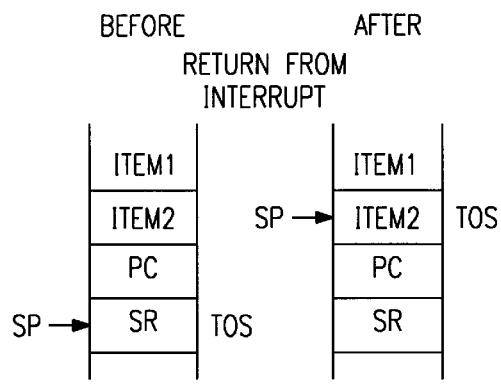
FIG. 71 shows the operation of a return from an interrupt cycle.

The return from interrupt service routine with instruction RETI takes five cycles. FIG. 71 illustrates operation of the stack during a return from an interrupt cycle.

Interrupt nesting is empowered if the GIE-bit is set inside the interrupt handling routine.

The general interrupt enable bit GIE is located in the Status Register SR/R2 which is included in the CPU:

Besides the GIE bit, other sources of interrupt requests can be enabled/disabled individually or in groups. The interrupt enable flags are located together within two addresses of the special function register SFR. The program flow conditions on interrupt requests can be comfortable adjusted by extensive use of this interrupt enable masks. The hardware serves the highest priority within the empowered interrupt source.

Most of the interrupt control bits, interrupt flags and interrupt enable bits are collected in SFR's under a few addresses. The Special Function Registers are located in the lower address range and are realized in byte manner. SFR's should be only accessed with byte instructions.

The different devices of the MSP430 Family support the SFR's with the correct logic and function within the individual modules. Each module interrupt source, except the non-maskable sources, can be individually enabled to access the interrupt function and the operation. Full SW control of these configuration bits enables the application software to react to system requirements on interrupt enable mask.

The interrupt vectors and the power-up starting address are located in the ROM, using address range 0FFFFh–0FFE0h. The vector contains the 16-bit address of the appropriate interrupt handler instruction sequence.

An entire port of eight bits is fully implemented for interrupt processing of external events. All individual I/O bits are programmable independently:

Any combinations of inputs, outputs and interrupt conditions are possible. This allows an easy adaptation to different I/O configurations.

Three separate vectors are allocated to the port 0 module. The signals on P0.0, P0.1 and the remaining port signals P0.2 to P0.7 are used as the three interrupt sources. The vector contained in ROM is loaded into the Program Counter by an interrupt event: vector in word address 0FFFAh on P0.0 events, vector in word address 0FFF8h on P0.1 events. Any other interrupt event on bit 2 to 7 (P0.2 . . . P0.7) use the common vector specified in ROM word location 0FFE0h. The six registers used for the control of the I/O pins is shown in FIG. 7.

Input Register:
Read only register, to scan the signals at the I/O-pins, independent of the direction of the pin.

Output Register:
The Output Register shows the information of the output buffer, an 8 bit register that contains the information output by the I/O-pins if used as outputs. The output buffer can be modified by all instructions that write to a destination. When read, the contents of the output buffer are read independently of the direction. A direction change does not modify the output buffer contents.

Direction Register:

This register contains eight independent bits which define the direction of the I/O-pins:

Bit=0: The I/O-pin is switched to input direction

Bit =1: The I/O-pin is switched to output direction Interrupt Flags:

This register contains eight flags that contain information if the I/O-pins are used as interrupt inputs:

Bit=0: No interrupt is pending

Bit=1: An interrupt is pending due to a transition at the I/O-pin.

Writing a zero to an Interrupt Flag resets it.

Writing a one to an Interrupt Flag sets it. The operation continues just the same way as if an interrupt event would have occurred.

Interrupt Edge Select:

This register contains a bit for each I/O-pin that selects which transition triggers the interrupt flag.

Bit=0: The interrupt flag is set with LO/HI transition

Bit=1: The interrupt flag is set with HI/LO transition

Interrupt Enable:

This register contains a bit for each I/O-pin to enable interrupt request on an interrupt event.

Bit=0: The interrupt request is disabled

Bit=1: The interrupt request is enabled

Figure 8:
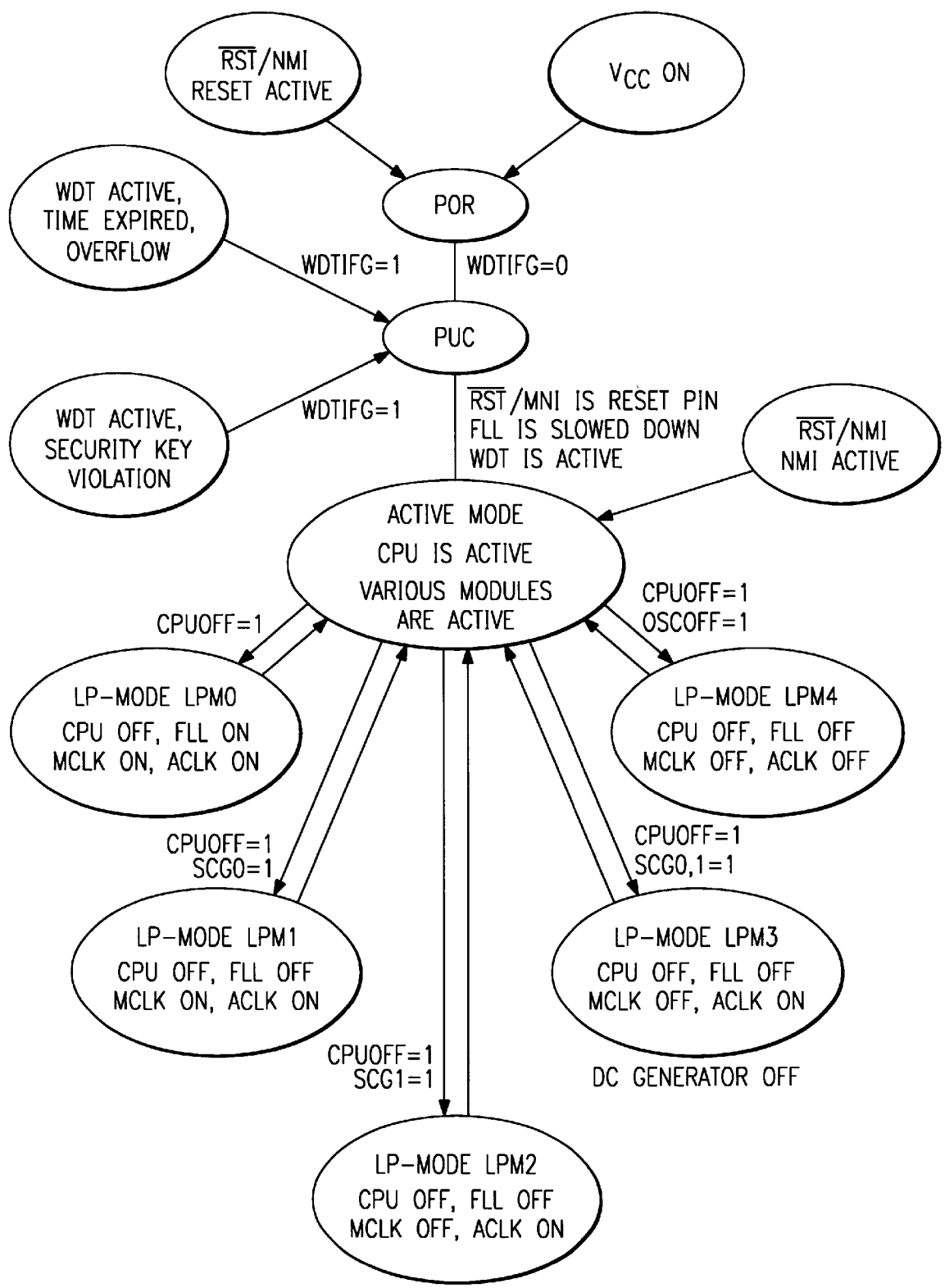
FIG. 8 represents intelligent management of operations.

The MSP430 operating modes support in an advanced manner various requirement for ultra-low power and ultra-low energy consumption with an intelligent management of the operations during the different situations of module and CPU states. This can be seen in FIG. 8. It is fully supported during interrupt event handling. An interrupt event awakes the system from each of the various operating modes and return with the RETI instruction to the mode that was selected before the interrupt event.

The MSP430 Family concept is developed under the ultra-low power premise and uses different levels of operating modes.

Ultra-low power system design in CMOS technology follows three primary intentions:

race for speed, data throughput is contrary to design for ultra-low power minimize individual current consumption limit activity state to its minimum required.

Figure 9:
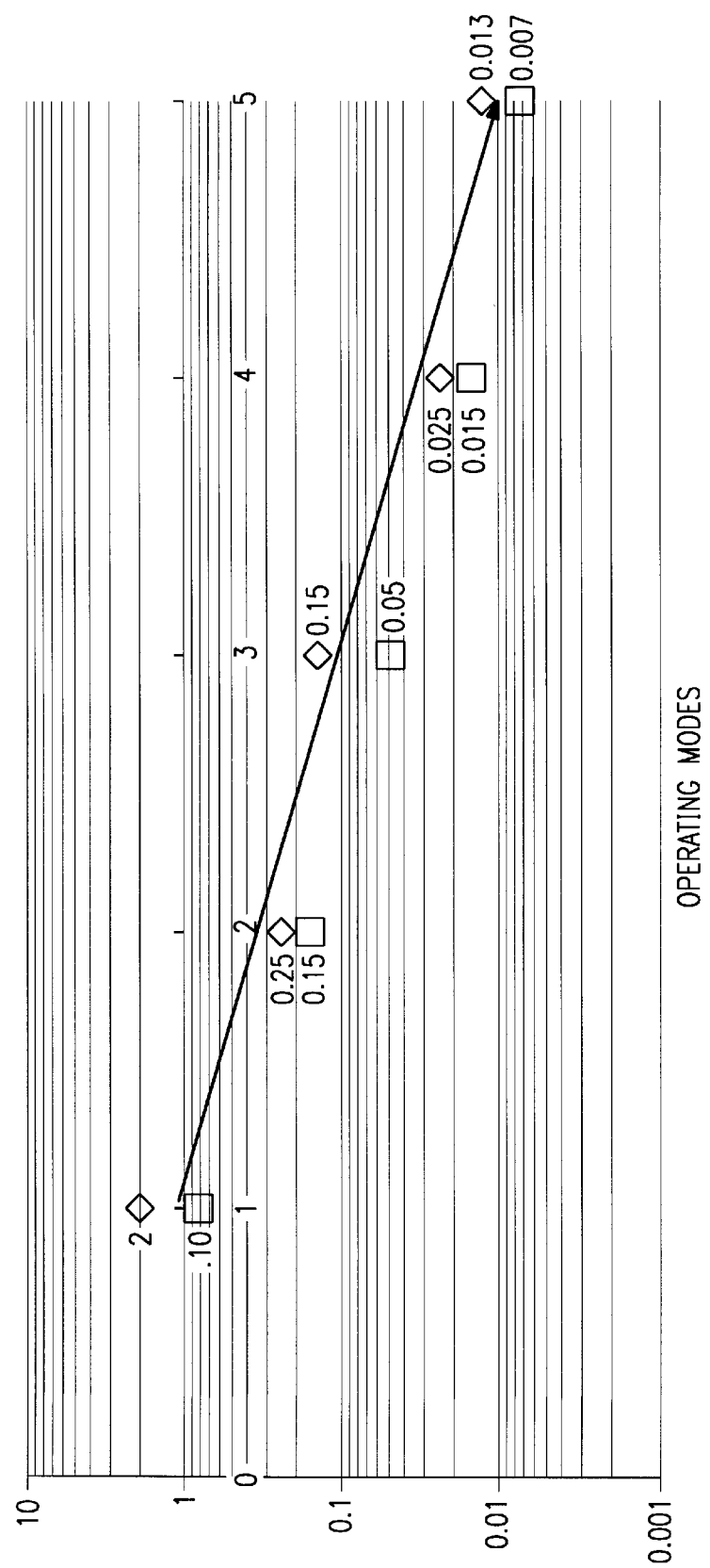
FIG. 9 represents operating modes.

There are five operating modes the software can configure. These are shown in FIG. 9.

Active Mode AM, with different combination of active peripheral modules

Low Power Mode 0 LPM0, with CPUOff bit set the CPU is disabled, peripheral's operation is not halted by CPUOff, ACLK and MCLK signal are active. Loop control for MCLK is active.

@ SCG1=0, SCG0=0, OSCOff=0, CPUOff=1

Low Power Mode 1 LPM1, with CPUOff bit set the CPU is disabled, peripheral's operation is not halted by CPUOff, loop control (frequency-lock-loop) for MCLK is inactive, ACLK and MCLK signal are active.

@ SCG1=0, SCG0=1, OSCOff=0, CPUOff=1

Low Power Mode 2 LPM2, with CPUOff bit set the CPU is disabled, peripheral's operation is not halted by CPUOff, loop control for MCLK and MCLK signal are inactive, ACLK signal is active.

@ SCG1=1, SCG0=0, OSCOff=0, CPUOff=1

Low Power Mode 3 LPM3, with CPUOff bit set the CPU is disabled, peripheral's operation is not halted by CPUOff, Loop control for MCLK and MCLK signal are inactive, DC generator of the DCO (→MCLK generator) is switched off.

ACLK signal is active.

@ SCG1=1, SCG0=1, OSCOff=0, CPUOff=1

Low Power Mode 4 LPM4, with CPUOff bit set the CPU is disabled, peripheral's operation is not halted by CPUOff, loop control for MCLK and MCLK signal are inactive, DC generator of the DCO (→MCLK generator) is switched off, ACLK signal is inactive; the crystal oscillator is stopped.

@ SCG1=X, SCG0=X, OSCOff=1, CPUOff=1

The activity state of individual peripheral modules and the CPU can be controlled using the appropriate function and various possibilities to stop operation of parts or the entire peripheral modules. There are different ways to configure, with the software on an application individually basis, the lowest potential current consumption. The special function registers include module enable bits that stop or enable the operational function of the specific peripheral module. All registers of the peripherals may be accessed even during disable mode. Other current saving functions can be implemented into peripherals that are accessed via the state of register bits. An example is the enables/disable of the analog voltage generator in the LCD peripheral that is turned on or off via one register bit. The most general bits that influence the current consumption and support fast turn-on from low power operating modes are located in the status register SR. There are four bits that control the CPU and the system clock generator.

These four bits are very useful to support the request for discontinuous active mode AM and to limit the time slot for the full operating mode. The four bits are CPUOff, OscOff, SCG0 and SCG1. The major advantage of including the operating mode bits into the status register is that the present state of the operating condition are saved onto stack during an interrupt request service. Without a manipulation of the stored status register information the processor continues (after RETI) with that operating mode identically to that before of the interrupt event. Another program flow may be selected by manipulation of the data stored on stack or the stack pointer. The comfortable access of stack and stack pointer with the instruction set allows individual optimized program structures.

The module enable bits in the SFR's enables the configuration of individual power consumpting controller operation states. The user's program defines the state of the peripheral modules to be active or inactive. The current consumption of disabled modules is decreased to leakage current for all parts that can be disabled. Only that parts of a module are active which are mandatory to get it to the enable state or to pass interrupt request to CPU (e.g. external hardware interrupt). Additional to that individual enable options there are five more current saving modes possible: The CPU off mode (LPM0) and four operating configuration of the system clock generator. They are entered if one or more of the bits CPUOff, SCG1, SCG0, OscOff—located in the Status Register—are set. The reaction of the system clock generator module on the status of the bits SCG1, SCG0 and OscOff with its four low power modes are described in detail in the system clock generation module.

The interrupt routine is entered and processed if an enabled interrupt wakes-up the MSP430:

The SR and PC stored onto the stack with that content present at interrupt event.

Subsequently the operation mode control bits OscOff, SCG1 and CPUOff are cleared in Status Register automatically.

Two different ways back from interrupt service routine to continue flow of operation are practicable:

Return with set low power mode bits

Return with reset low power mode bits

When returning from the interrupt, the program continues at the address following the instruction which set the OscOff or CPUOff-bit in the Status Register.

The low power mode 0 is selected if the appropriate bit CPUOff in the status register is set. Immediate after set of the bit the CPU stops operation and the normal operation of the system core is stopped. The operation of the CPU is halted until any interrupt request or reset is effective. All internal bus activities are stopped. The system clock generator is not affected and the clock signals MCLK and ACLK are active pending on the state of the other three bits, SCG0, SCG1 and OscOff in the status register.

Those peripherals are active that are enabled and clocked with the MCLK or ACLK signal. All pins of I/O ports and the RAM/registers are unchanged. Wake-up is possible by all enabled interrupts.

Those peripherals are active that are enabled and clocked with the ACLK signal. Peripherals that are operating with the MCLK signal are inactive because the MCLK signal is inactive. All pins of I/O ports and the RAM/registers are unchanged. Wake-up is possible by those enabled interrupts coming from system clock (MCLK) independent sources.

All activities cease, only the RAM contents, Port and registers are maintained. Wake-up is only possible by enabled external interrupts.

Before activating the LPM4, the software flow should consider the conditions that are applied to the system during the period of this low power mode. The two and most important figures that should be looked at are the environment situation with the influence at the DCO and the clocked operation conditions. The environment situation defines whether the actual value of the frequency integrator should be hold of corrected. A correction can be intended when ambient conditions would increase the system frequency drastically. When clocked operation is applied it should be considered that the loop can lose control over the frequency if there remaining time slot is unsufficient to hold the closed loop in the correct operating range.

The MSP memory space is configured in a "von-Neumann-Architecture" and has code memory (ROM, EPROM, RAM) and data memory (RAM, EEPROM, ROM) in one address space using a unique address and data bus (see FIG. 10). All the physical separated memory areas, the internal areas for ROM, RAM, SFR'S and peripheral modules and the external memory, are mapped into the common address space. The total addressable memory space provided is 64 kB in the small memory model and 1 MB in the large memory model. The small memory model use a linear address space while in the large memory model the address space is arranged in sixteen segments of 64 KB at code access and 64 pages of 16 KB at data access.

Devices with a memory configuration of 64 KB or less use the small memory model with basic address range of the lowest 64 KB and do not care about code segments and data pages. The configuration according to the small memory model and data bus width is shown in FIG. 11.

The Data Bus is 16 bit or 8 bit wide. For those modules that can be accessed with word data it is always 16 bits and for the other modules it is 8 bit and they should only be accessed with byte instructions. The Program Memory (ROM), the Data Memory (RAM) can be accessed with byte or word instructions. Parts of peripheral modules are realized as 16 bit wide or 8 bit wide modules. The access should use the proper instructions, byte or word.

Figure 12:
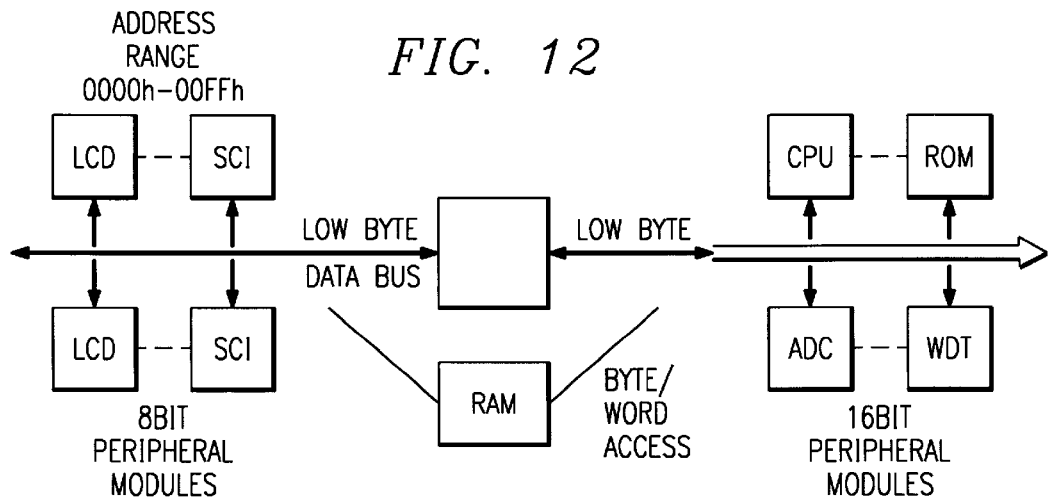
FIG. 12 represents peripheral modules.

Many peripheral modules are connected to the CPU with an 8 bit Memory Data Bus (MDB), the 5 least significant bits of the Memory Address Bus (MAB) plus two Module Enable signals (ME), two interrupt control/request lines and a power-up signal (see FIG. 12). The access to these modules should be always performed using byte instruction formats. Other 16 bit peripheral modules are connected to the 16 bit MDB with full supporting word processing and should use word instruction format for any access.

Figure 13:
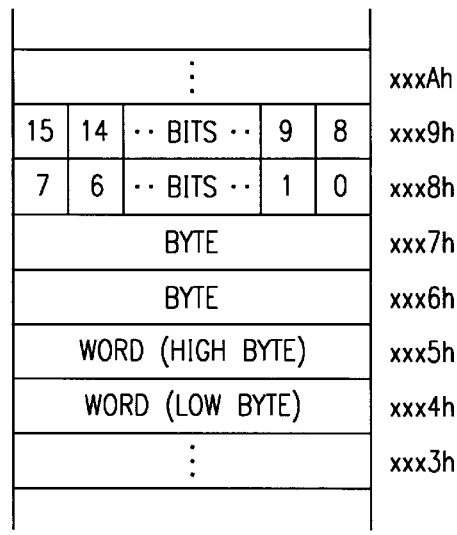
FIG. 13 represents Bit, Byte and Word in a byte organized Memory.

Bytes are located at even or odd addresses. Words are located in the ascending memory locations aligned to even addresses: the low byte is at the even address followed by the high byte at the next odd address. This is illustrated in FIG. 13.

Figure 14:
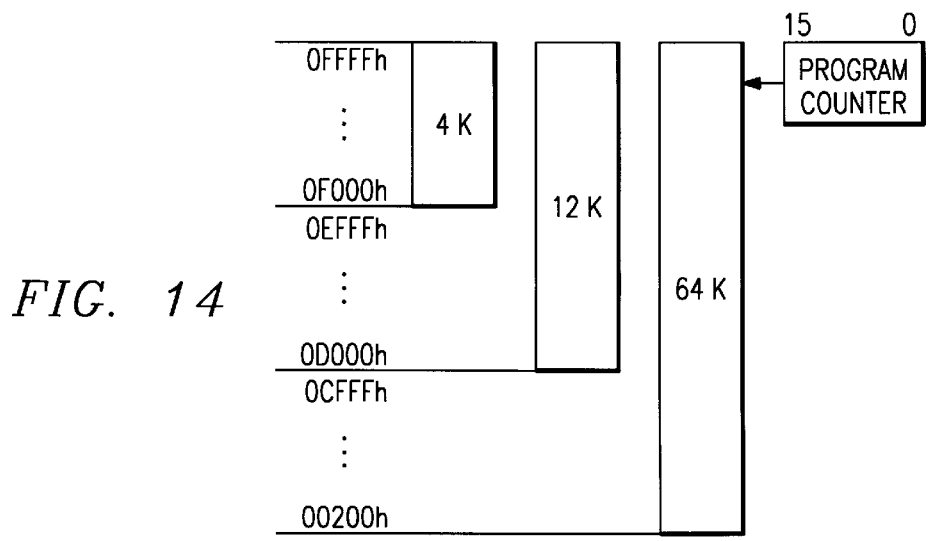
FIG. 14 represents ROM Organization.
Figure 19:
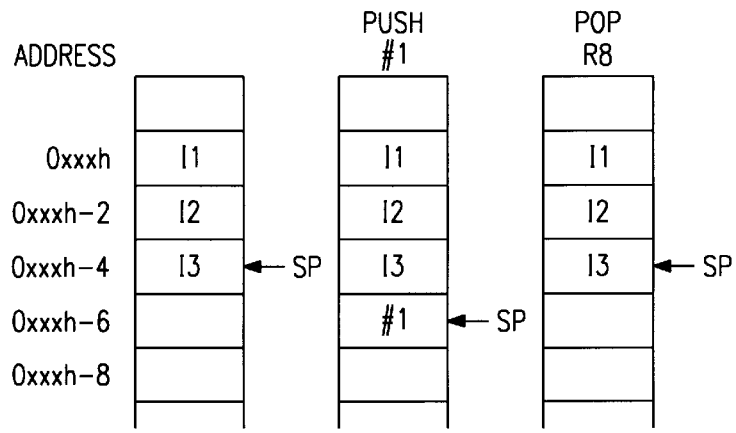
FIG. 19 represents Stack Usage.

Various ROM-sizes up to 64K Byte are possible. The common address space is shared with special function registers, peripheral modules registers, data and code memory. The special function registers and peripheral modules are mapped into the address range starting with 0 and up to 01FFh. The remaining address space 0200h to 0FFFFh is shared by data and code memory. The start address for all different sizes of ROM is at the same address 0FFFEh. The interrupt vector table starts with highest priority at this highest ROM word address too. The program counter and hence the flow of instructions is in the opposite direction— from lower addresses toward higher addresses. The program counter is increased by two, four or six according to the address mode used—program flow control instruction Jumps, branches and calls excluded. The ROM organization is shown in FIG. 14.

The interrupt vectors and the power-up vector are located in the ROM, starting at address 0FFFEh. The vectors contain the 16-bit addresses of the appropriate interrupt handler instruction sequence.

The MSP architecture allows the storage of large tables in the ROM. To access these tables, all word instructions can be used. This offers various advantages to flexible and ROM saving programming constructions:

Storage of an Output-PLA for display character conversion inside of the ROM

As much OPLA-terms as needed (no restriction to n terms)

OTP version includes automatically OPLA programmability

Computed table accesses (e.g. for a bar graph display)

Table supported program flows.

The processing of tables is a very important feature, which allows very fast and clear programming. Especially for sensor applications it is advantageous to have the sensor data in tables e.g. for linearization, compensation etc.

Computed branches and subroutine calls are possible using standard instructions. The CALL and BR instructions use the same addressing modes as the other instructions (see programming examples).

The addressing modes allow indirect indirect addressing, ideally suited for computed branches and calls. The fully use of this programming technique permits a program structure different to conventional 8 and 16 bit controllers. A lot of routines can be handled easily using pointer and stack handling instead of 'Flag' type program flow control.

The computed branches and subroutine calls are valid within a 64 kB code segment.

The entire RAM can be accessed in byte or word data using the appropriate instruction suffix. The peripheral modules are located in two different address spaces:

the special function registers are byte orientated by hardware and mapped into the address space from 0h up to 0Fh the peripheral modules that are byte orientated by hardware are mapped into the address space from 010h up to 0FFh and peripheral modules that are word orientated by hardware are mapped into the address space from 100h up to 01FFh The RAM can be used for both, code and data memory. Code accesses are always made on even byte addresses.

The suffix at the instruction memonic defines the access of the data as word or byte data.
Example:

| ADD.B | &TCDATA,TCSUM_L | | | |
| ADDC.B | TCSUM_H | | | |
| ADD | R5,SUM_A | = | ADD.W | R5,SUM_A |
| ADDC | SUM_B | = | ADDC.W | SUM_A |

A Word consists of two bytes, a Highbyte (bit 15 to bit 8) and a Lowbyte (bit 7 to bit 0) and should always be aligned to even addresses (see FIG. 15).

All operations on Stack and PC are word operations and use aligned memory addresses. Word-to-word and byte-to-byte operations are performed fully correct; both the results of operation and the status bit information.

| Word-word operation: | Byte-byte operation |
|---|---|
| R5 = 0A28Fh | R5 = 0123h |
| EDE .EQU 01012h | EDE .EQU 0102h |
| Mem(0A28Fh) = 0FFFEh | Mem(0123h) = 05Fh |
| Mem(01012h) = 00112h | Mem(0102h) = 043h |
| ADD @R5,&EDE | ADD.B @R5,&EDE |
| Mem(01012h) = 00110h | Mem(0202h) = 0A2h |
| C = 1, Z = 0, N = 0 | C = 0, Z = 0, N = 1 |

Figure 72A:
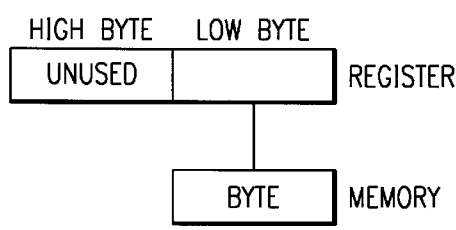
FIG. 72A shows an example of a register-byte operation.
Figure 72B:
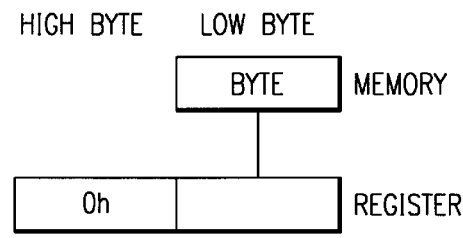
FIG. 72B shows an example of a byte-register operation.

FIG. 72A shows an example of a register-byte operation, while FIG. 72B illustrates a byte-register operation.

| Register-byte Operation | Byte-register Operation |
|---|---|
| R5 = 0A28Fh | R5 = 01202h |
| R6 = 0203h | R6 = 0223h |
| Mem(0203h) = 012h | Mem(0223h) = 05Fh |
| ADD.B R5,@(R6) | ADD.B @R6,R5 |
| 08Fh | 05Fh |
| + 012h | + 002h ;Lowbyte of R5 |
| 0A1h | 061h ;-> store into R5 - Highbyte is 0 |
| Mem(0203h) = 0A1h | R5 = 00061h |
| C = 0, Z = 0, N = 1 | C = 0, Z = 0, N = 0 |
| (Lowbyte of register) | (addressed byte) |
| + (addressed byte) | + (Lowbyte of register) |
| ->(addressed byte) | ->(Lowbyte of register, zero to Highbyte) |

Alternative mode of operation is illustrated below. In this scheme, the memory access on byte or word data is defined by the address of the memory. In addition, the memory address defines the relation of the byte and the word data.

Figure 73:
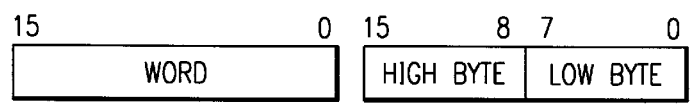
FIG. 73 shows the division of a word into two bytes, a High Byte and a Low Byte.

All the data memory is an entire physical unit. The difference to access the data as word or byte data is made by accessing it via different addresses for the same data. Presently, the identifying mark of byte and word data representation is address 1000h. For further explanation, a word data is divided into two bytes, a Highbyte (bit 15 to bit 8) and a Lowbyte (bit 7 to bit 0), as illustrated in FIG. 73, and described in the following equation:

$$AHB = (AW - 1000h) \times 2 + 1$$

$$AHB = (AW - 1000h) \times 2$$

or $$AW = \frac{ALB}{2} + 1000h$$

where:
AHB: Address Highbyte
ALB: Address Lowbyte
AW: Address Word.

Figure 74:
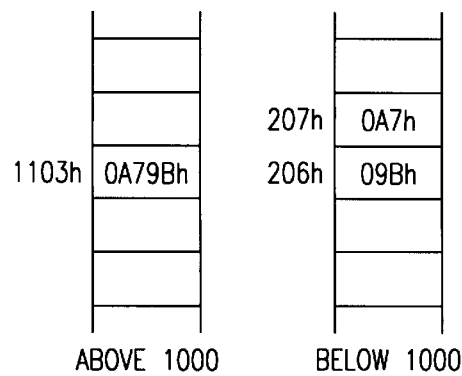
FIG. 74 shows examples of word and byte addressing.

FIG. 74 shows examples of word and byte addressing.

All operations on stack and PC are word operations and should use only the memory address space supporting full word functions.

Word-to-word and byte-to-byte operations are performed full correct; both the results of operation and the status bit information.

| Word-word operation | Byte-to-Byte operation |
|---|---|
| R5 = 0A28Fh | R5 = 0223h |
| R6 = 01012h | R6 = 0202h |
| Mem(0A28Fh) = 0FFFEh | Mem(0223h) = 05Fh |
| | [Mem(01111h)=05FAAh] |
| Mem(01012h) = 00112h | Mem(0202h) = 043h |
| | [Mem(01101h)=01F43h] |
| ADD @R5,@R6 | ADD @R5,@R6 |
| Mem(01012h) = 0011h | Mem(0202h) = 0A2h |
| | [Mem(01101h)=01FA2h] |
| C = 1, Z = 0, N = 0 | C = 0, Z = 0, N = 1 |

FIG. 75A illustrates a register-byte operation, while FIG. 75B illustrates a byte-register operation.

| Example Register-Byte Operation | Example Byte-Register Operation |
|---|---|
| R5 = 0A28Fh | R5 = 01202h |
| R6 = 0203h | R6 = 0223h |
| Mem(0203h) = 012h | Mem(0223h) = 05Fh |
| [Mem(0110lh) = 012A4h] | [Mem(01111h) = 05FAAh] |
| ADD @R5,@R6 | ADD @R5,@R6 |
| 08Fh | 05Fh |
| +012h | +002h ;Lowbyte of R5 |
| 0A1h | 061h ; -> store into R5 - Highbyte is 0 |
| Mem(0203h) = 0A1h | R5 = 00061h |
| [Mem(01101h) = 0A1A4h] | |
| C = 0, Z = 0, N = 1 | C = 0, Z = 0, N = 0 |
| (Lowbyte of register) | (addressed byte) |
| +(addressed byte) | + (Lowbyte of register) |
| ->(addressed byte) | ->(Lowbyte of register, zero to Highbyte) |

All peripheral modules are accessed and controlled by the software. All 5 instructions are approved for the data interchange operation. Since there are modules using physically the MDB with its word construction and modules that use only the eight least significant bits the address space from 0100 to 01FFh is reserved for word modules and the address space from 00h to 0FFh is reserved for byte modules. Peripheral modules mapped into the word address space should be accessed with word instructions (e.g. MOV R5,&WDTCTL) or byte instructions (MOV.B#1,&TCCTL). The addressing of both is made via the absolute addressing mode or via the 16-bit working registers using the indexed, indirect or indirect autoincrement addressing mode (see FIG. 16).

Word modules are peripherals that are connected to the complete 16 bit MDB.

The access to word modules is always in word and supports not the byte access since the hardware is constructed for word operation only.

The peripheral file address space is organized in sixteen frames and each frame represents eight words.

Byte modules are peripherals that are connected to the reduced (eight LSB) MDB. The access to byte modules is always a byte access. The hardware in the peripheral byte modules takes the LowByte—the least significant bits—along with a write operation. Reading a memory location from the hardware of a peripheral byte module the Highbyte is always 00h. The data transfer from and to the RAM should always use byte instructions - determined by the byte suffix '.B'. Word data are written into a byte module by writing the LowByte to the appropriate peripheral register and ignoring the HighByte. Reading data from byte module into word accessed RAM writes the HighByte with 0h and the LowByte with the data pointed by the operation. The peripheral file address space is organized in sixteen frames.

The system configuration and the individual reaction of the peripheral modules to processor operation modes are mainly defined in Special Function Registers. The Special Function Registers are located in the lower address range and are realized in byte manner. SFR's should be only accessed with byte instructions. Even if specific SFR bits share the same address space they can be implemented physically within the according module.

The different devices of the MSP Family support the SFR's with the correct logic and function within the individual modules. Each module can be enabled individually to access the interrupt function and the operation. Full SW control of these configuration bits enables the application software to react to system requirements on interrupt enable mask. The power consumption of the system is influenced by the amount and function of the enabled modules. Disabling a module from the actual operation mode reduces power consumption while other parts of the controller are fully active. Two parts can not be disabled: ROM and RAM. The processor core can be switched to disabled mode—CPUOff Mode—with all internal functions disabled: CPU and bus activities are stopped.

The equal width of the PC and the working registers allows new features, for example seven addressing modes. The used "von-Neumann-Architecture" has RAM and ROM in one address space using a unique address and data bus.

Fifteen 16-bit-registers (R0 to R2, R4 to R15) are used for data and addresses. These registers are implemented in the CPU. They are able to address up to 64K Bytes (ROM, RAM, EERAM, Peripherals, ...) without any segmentation. The complete CPU register set is shown in FIG. 76. The registers which are used for special purposes are marked. The registers R0, R1, R2 and R3 are restricted in their common use due to their special functions described later.

The 16-bit Program Counter PC defines which instruction will be executed next. Each instruction uses an even number of bytes, two, four or six bytes. The instruction accesses are performed on word boundaries and so the program counter is aligned to even addresses. The PC is double-incremented while the fetch cycle of an instruction: It points to the word following the currently executed instruction. This makes two additional addressing modes possible (Immediate Mode, Symbolic Mode), which use the word following the instruction for information (see FIG. 17).

The system Stack Pointer SP should always be aligned to even addresses since the stack is accessed with word data during interrupt request service. The system Stack Pointer SP is used by the CPU for the storage of the return addresses of subroutine calls and interrupts. It uses a pre-decrement, post-increment scheme. This scheme has the advantage, that the item on the top of the stack (TOS) is available. The SP may be used by the user's software (PUSH and POP instructions) but it should be remembered, that the CPU uses the Stack Pointer too.

Examples for system Stack Pointer addressing (refer to FIGS. 18 and

| MOV | SP,R4 | ; #0xxxh-4 -> R4 |
|---|---|---|
| MOV | @SP,R5 | ; Item I3 (TOS) -> R5 |
| MOV | 2(SP),R6 | ; Item I2 -> R6 |
| MOV | R7,@SP | ; overwrite TOS with R7 |
| MOV | R8,4(SP) | ; modify item I1 |
| PUSH | R12 | ; store R12 in address 0xxxh - 6; SP points to same address |
| POP | R12 | ; restore R12 from address 0xxxh - 6; SP points to 0xxxh-4 |
| MOV | @SP+,R5 | ; item I3 -> R5 (popped from Stack); same as POP instruction |

Figure 20:
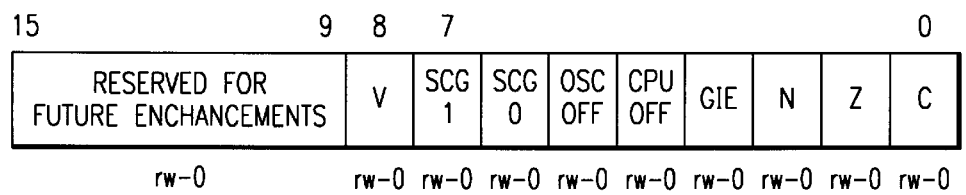
FIG. 20 represents Status Register SR.

The Status Register SR contains the CPU status bits (see FIG. 20):

| • | V | Overflow Bit |
|---|---|---|
| • | SCG1 | System Clock Generator Control Bit 1 |
| • | SCG0 | System Clock Generator Control Bit 0 |
| • | OscOff | Crystal Oscillator Off Bit |
| • | CPUOff | CPU Off Bit |
| • | GIE | General Interrupt Enable Bit |
| • | N | Negative Bit |
| • | Z | Zero Bit |
| • | C | Carry Bit |

For every instruction it is shown at the right margin, in which way the status bits are affected.

Overflow Bit (V):

Set if the result of an arithmetic operation overflows the signed variable range. It is valid for both data formats, byte and word:

| ADD(.B), ADDC(.B) | Set when:<br>Positive + Positive = Negative<br>Negative + Negative = Positive,<br>otherwise reset |
|---|---|
| SUB(.B), SUBC(.B),CMP(.B): | Set when:<br>Positive − Negative = Negative<br>Negative − Positive = Positive<br>otherwise reset |

SCG1, SCG0:

These bits control four activity states of the system clock generator and therefore influence the operation of the processor system.

Oscillator Off:

If set, the Crystal Oscillator enters the Off Mode: All activities cease, the RAM contents, Port and registers are maintained. Wake-up is possible only by enabled external interrupts AND. if GIE is set. This bit should n o t be set without simultaneously setting CPUOff bit.

CPU Off:
If set, the CPU enters the Off Mode: All activities ceases, the RAM, Port and registers and specially enabled peripherals e.g. Basic Timer, UART . . . stay active. Wake-up is possible by all enabled interrupts.
GIE Bit (GIE):
If set, all enabled interrupts are handled. If reset all interrupts are disabled. The GIE Bit is cleared by interrupts and restored by the RET/RETI instruction. It can be also changed by appropriate instructions.
Negative Bit (N):
Set if the result of an operation is negative.
Word operations: Negative bit is set to the value of bit 15 of the result.
Byte operations: Negative bit at is set to the value of bit 7 of the result.
Zero Bit (Z):
Set if the result of an operation is 0, cleared if the result is not 0.
Carry Bit(C):
Set if the result of an operation produced a carry, cleared if no carry occurred.
Word operation: The carry is as the result of the word operation.
Byte operation: The carry is as the result of the byte operation.
The most often used constants can be generated with the constant registers R2 and R3 without occupying an additional 16-bit-word. The used constant for immediate values is defined by the addressing bits As:

| Register | As | Constant | Remarks |
|---|---|---|---|
| R2 | 00 | — | Register mode |
| R2 | 01 | (0) | absolute address mode |
| R2 | 10 | 00004h | +4, bit processing |
| R2 | 11 | 00008h | +8, bit processing |
| R3 | 00 | 00000h | 0, word processing |
| R3 | 01 | 00001h | +1 |
| R3 | 10 | 00002h | +2, bit processing |
| R3 | 11 | 0FFFFh | −1, word processing |

Values of constant generators CG1, CG2

The major advantages are allied with the use of this type of constant generation:
No special instructions
No additional word for the seven most used constants
Shorter instruction cycles time: direct access without use of MDB The assembler uses the R2 or R3 modes automatically, if one of the six constants is used in immediate mode as source operand. The Status Register SR/R2 —used as source or destination register—can be used in register mode. The remaining combinations of address bits As are used to support absolute address mode and bit processing without adding additional instructions. Register R2 and R3 used in the 'constant mode' cannot be addressed explicitly; they act just like a source only register.

The Constant Generator Registers allows the emulation of several instructions by other ones. The CPU is much more simpler this way. Only 27 instructions are needed for the complete instruction set. For example the Single Operand Instruction. CLR dst is emulated by the Double Operand Instruction with the same length:
MOV R3,dst
or equivalent
MOV #0,dst where #0 is replaced by the assembler with R3 used with As=00:
one word instruction
no additional control operation or hardware within CPU
register addressing mode for source: no extra fetch cycle for constants (#0).
All seven addressing modes for the source operand and all four addressing modes for the destination operand can address the complete address space. The bit numbers show the contents of the As resp. Ad mode bits.

| As/Ad | Addressing Mode | Syntax | Description |
|---|---|---|---|
| 00/0 | Register Mode | Rn | Register contents are operand |
| 01/1 | Indexed Mode | X(Rn) | (Rn + X) points to the operand. X is stored in the next word |
| 01/1 | Symbolic Mode | ADDR | (PC + X) points to the operand. X is stored in the next word. Indexed Mode X(PC) is used |
| 01/1, | Absolute Mode | &ADDR | The word following the instruction contains the absolute address. |
| 10/— | Indirect Register Mode | @Rn | Rn is used as a pointer to the operand |
| 11/— | Indirect Autoincrement | @Rn+ | Rn is used as a pointer to the operand. Rn is incremented afterwards |
| 11/— | Immediate Mode | #N | The word following the instruction contains the immediate constant N. Indirect Auto-increment Mode @PC+ is used |

Most of the modes show the same addressing modes for source and destination, but any valid combination of source and destination addressing modes is possible with an appropriate instruction.

Figure 21:
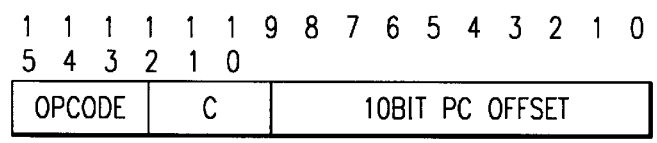
FIG. 21 represents Conditional Jump Instruction Format.

Conditional jumps allow program branches relative to the Program Counter. The possible range is from −511 to +512 words relative to the PC state of the Jump instruction. The 10-bit PC offset is treated as a signed 10-bit value which is added to the Program Counter. The conditional jumps do not affect the Status Bits (see FIG. 21).

The instruction code fetch and PC increment technique used ends with the formula:

$$PC_{new}=PC_{old}+2+PC_{offset}*2$$

| JEQ/JZ | Label | Jump to Label if Zero-bit is set |
|---|---|---|
| JNE/JNZ | Label | Jump to Label if Zero-bit is reset |
| JC | Label | Jump to Label if Carry-bit is set |
| JNC | Label | Jump to Label if Carry-bit is reset |
| JN | Label | Jump to Label if Negative-bit is set |
| JGE | Label | Jump to Label if(N .XOR. V) = 0 |
| JL | Label | Jump to Label if(N .XOR. V) = 1 |
| JMP | Label | Jump to Label unconditionally |

The instruction code fetch and PC increment technique used ends with the formula:

$$PC_{new}=PC_{old}+2+PC_{offset}*2$$

The MSP Core CPU architecture is grown from the idea to use a reduced instruction set and highly transparent instruction formats. There are instructions that are implemented into hardware and instructions that use the present hardware construction and emulate instructions with high efficiency. The emulated instructions are using core instructions with the additional built-in constant generators CG1 and CG2. Both, the core instructions (hardware implemented instructions) and the emulated instructions are described in this part. The mnemonics of the emulated instructions are used with the examples.

The words in program memory used by an instruction vary from 1 to 3 words depending on the combination of addressing modes. Each instruction uses minimum one word (two bytes) in the program memory. The indexed, symbolic, absolute and immediate modes need additional one word in the program memory. These four modes are available for the source operation. The indexed, symbolic and absolute mode can be used destination operation.

The instruction combination for source and destination consumes one to three words of code memory.

The oscillator and the system clock generator follow the major targets of low system cost and low power consumption. External component count is reduced down to a commonly used crystal to achieve the target of low system cost. The use of a low frequency crystal and oscillator combined with a multiplier meets system cycle speed and the second target of low power consumption.

Figure 22:
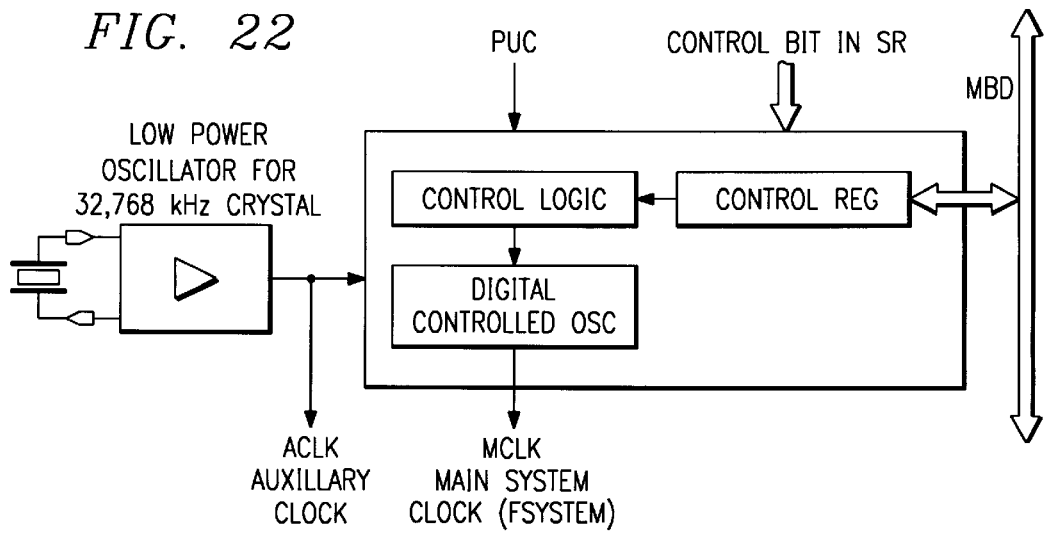
FIG. 22 represents Principle of Clock Generation.

Special other features are obviously mandatory in very low power consuming devices that use the different operating modes extended. These features include startup timing, long term frequency stability on voltage, temperature and time, high-stable time base for real time clocks. Current limited real-time applications demand two conflicting requirements: Low system clock frequency for energy conservation and high system clock frequency for fast reactions onto requesting events. Especially battery based applications are very critical with respect to current consumption. Response to external events or time requests requires typically but occasionally high speed in real-time applications. A processor clock generator with fast start-up empowers exhaustive use of different power dissipation modes that could theoretically solve this dilemma. On the other hand fast start-up is closely combined with unacceptable low frequency stability. Design with multiple clock sources or different clock operations could take into account the clock requirements of certain peripheral components for real-time applications like low frequency communication, display (e.g. LCD), timers and counters (see FIG. 22).

The output of the low frequency crystal oscillator provides the clock signals for the CPU operation and the peripheral modules. The oscillator of the MSP430 operates with the widely used crystal without any external components. The different requirements of CPU and modules driven by current consumption objectives oblige use of two clock signals:

Auxiliary Clock with crystal's frequency

System Clock with higher frequency: $N \times f_{crystal}$.

The special design of the oscillator supports feature of low current consumption and the use of a 32 768 Hz crystal. The crystal is connected to two pins without any other external components. All components for stabilizing the operation state or phase shifter capacitors are integrated. Two factors dominate the choice of the well-known and widely used watch crystal:

oscillator and time base for low current consumption optimize system costs.

Figure 23:
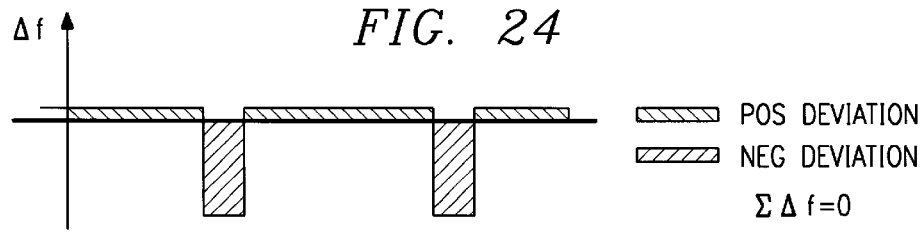
FIG. 23 represents Status Register SR.

The oscillator starts operating after applying VCC due to reset of the control bit OscOff in the Status Register SR. It can be stopped by setting the OscOff bit (see FIG. 23).

The System Clock of controllers has to deal different requirements according to the application and system conditions:

High frequency to react fast onto system hardware requests or events

Low frequency to minimize current consumption, EMI, . . .

Stable frequency for timer applications e.g. real time clock RTC

Low Q-oscillators to enable start-stop operation with 'zero' delay to operation.

All the contrary but essential requests can not be handled whether with high-Q, fast frequency crystals nor with low-Q RC-type oscillators. Proper current consumption and the frequency stability mention the application of a low frequency crystal. The compromise used in the MSP430 is to use a low frequency crystal and to multiply its frequency up to the nominal operating range:

$$f_{System} = N \times f_{crystal}$$

Different ways for the multiplication of the crystal's frequency to the system frequency are known and several practiced. The most well known methods are Phase-Locked-Loop PLL technique and Frequency-Locked-Loop FLL.

The PLL technique holds two major disadvantages in systems with frequently and time-undefined intermitted operating modes. PLL's are systems following second order response. All the on-off operating modes result in out-of-phase conditions and therefore in continuous 'limp-mode' handling. The wide ranges of off-time conditions are contrary to the use of analog filter-integrator in the closed loop. Changes in the capacitor's charge automatically result in phase and/or frequency deviation and an improper frequency until system is in phase. The FLL technique in combination with a digital controlled oscillator (DCO) avoids both serious problems.

The major features of the DCO are:

fast start-up digital control signals—not analogs.

Figure 24:
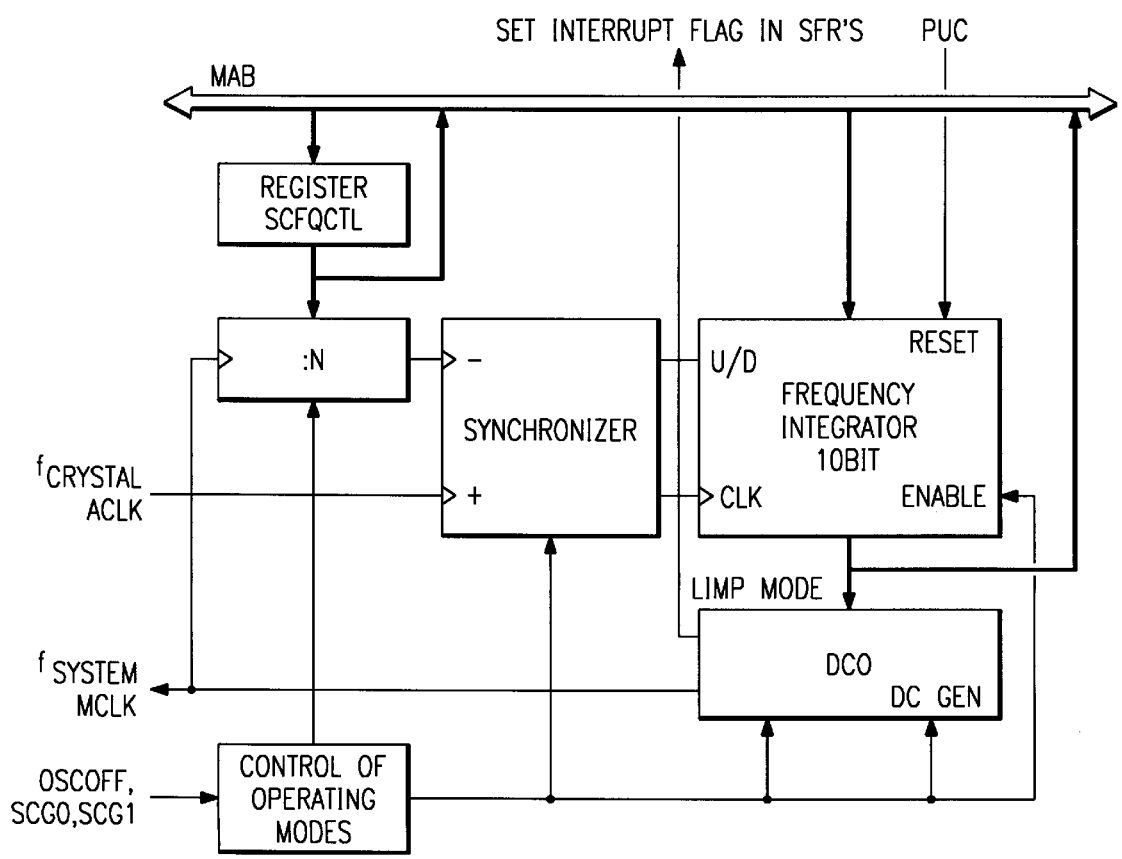
FIG. 24 represents system frequency vs. Time.

Beside these advantages one item needs careful consideration, the variation of the frequency with the supply voltage and temperature. The DCO is absolutely monotone. The FLL operates as a continuous frequency integrator. An up/down counter that follows the loop control corrects permanently the multiplication factor N. The follow-up or up-date rate is identically to the crystal's frequency rate. Using a 32,768 kHz crystal the rate is 30.5 us. The accumulated frequency error is the same as the crystal's. The time deviation from one machine cycle to another is less than 20%. The system frequency with respect to time is shown in FIG. 24.

The start-up operation of the system clock depends on the previous machine state. During a PUC the DCO is reset to its lowest possible frequency. The control logic starts operation immediately after removing PUC condition. Proper working condition for the control logic needs the presence of stable crystal oscillation.

The frequency integrator of 10 bit length controls the frequency the DCO is running with. The integrator—starting at zero digital value after PUC—counts up to run the frequency $f_{System}$ at the selected value N. It takes slightly more periods of the crystal input than the suggested number of 10 bit or 1024 if the maximum length of the frequency integrator is needed. The control logic system operates aperiodically. Applications that run the controller with intermitted operation need some attention to the conditions of handling the system frequency control conditions. The correction of the frequency integrator is possible each period of the crystal (30.5 ms @ 32 768 Hz) plus the period of $f_{System}/N$. Longer integration periods are mandatory to avoid accumulating deviations in time. The schematic of the system frequency generators is shown in FIG. 25.

In the special function register are two flags incorporated that allows the application program to get back control over the system if the digital controlled oscillator is at its upper or lower frequency limit. The operation at its upper or lower limit can be easily detected by controlling the frequency integrator via access to SCFI0 and/or SCFI1, illustrated in FIG. 77B and FIG. 77C.

The system clock generator and crystal oscillator are controlled by three signals. These signals are located in the status register SR and are reset during the four different power-up conditions. These three control signals provide the system application with different operating conditions and maximum flexibility to optimize overall system power consumption. During some combinations of the three control signals the system clock MClk stops operation; the present value of frequency integrator remains.

During the DC generator off mode only the crystal oscillator is active. The DC current of the DC generator that sets the basic timing conditions is switched off. The power consumption constraints force high impedance design. The start of the DCO from power-down mode with DC generator off can take some time ($t_{DCGon}$) to run with the selected frequency. The time is in the range between ns up to µs.

During DCO off, the crystal oscillator and the DC generator are still active during PDM2 and an immediate start is possible. The start-up delay is limited to some gate delays.

When the frequency lock loop is off, the crystal oscillator, the DC generator and the DCO are still active during PDM1. The processor with all its peripheral modules are fully functional without any limitation. The frequency is determined from the output value of the frequency integrator. This value with the characteristic of the DCO determine the

| OscOff | SCG1 | SCG0 | Crystal oscillator | DC Generator | DCO | Loop control | Comments |
|---|---|---|---|---|---|---|---|
| 0 | 0 | 0 | ON | ON | ON | ON | Condition after PUC Crystal and DC oscillator are active Loop control is operating |
| 0 | 0 | 1 | ON | ON | ON | OFF | Low Power Mode LPM1 Crystal and DC oscillator are active Loop control is off |
| 0 | 1 | 0 | ON | ON | OFF | OFF | Low Power Mode LPM2 Crystal oscillator and DC Generator are active DCO and LOOP control are off |
| 0 | 1 | 1 | ON | OFF | OFF | OFF | Low Power Mode LPM3 Crystal oscillator is active All other functions are off |
| 1 | X | X | OFF | OFF | OFF | OFF | Low Power Mode LPM4 All functions are disabled $f_{MCLK} = f_{AClk} = 0Hz$ |

The three control signals provide five different power down modes supporting ultra-low power applications by intensive use of them. All these different modes provide the system application with the potential for operation with the smallest time slot possible and the optimized current consumption in each time slot.

The system clock control register SCFQCTL, illustrated in FIG. 77A, is set to 01Fh with PUC and the frequency integrator is reset. The reset of the frequency integrator set the system frequency to its lowest value and counts up continuously until it locks at a system frequency that is equal to N times the crystal frequency.

During the oscillator off mode all parts of the processor are inactive and the current consumption is at its lowest limit. Starting with operation is only possible after power-up circuitry detected a low supply voltage condition or any external interrupt event that will request an interrupt synchronously.

The appropriate enable for interrupt sources should be applied during the program flow. The start-up sequence of the system clock generator out of oscillator off mode:
the present system frequency defined by the output value of the frequency integrator and the DCO characteristic will continue running
the frequency integrator is continuously counted down with the frequency of $f_{system}/N$ till the DCO is running at its lowest frequency as long as the crystal oscillator has not started operation
after the crystal oscillator starts operation the loop control will settle the frequency integrator to the value following $f_{system}=N * f_{crystal}$.

frequency of MCLK signal that is identical with the system frequency fsystem There is no start-up delay, the oscillator is already running. The loop control is activated synchronously and with a slight frequency variation but it settles fast and aperiodically.

The system clock generator interacts with other processor parts via three general module registers and the special function registers. The general module registers are mapped into the lower peripheral file address range where all byte modules are located. Three control lines for the operating states, SCG1, SCG0 and OscOff, are supplied from the status register SR of the CPU.

Two eight bit registers control the system clock generator. The user's software loads one of the registers with the multiplication factor N. The other register holds control bits or signals used for various operating modes.

The content of register SCFQCTL controls the multiplication of crystal's frequency. The seven bits indicates a range of 3+1 to 127+1.

$$f_{system}=(x*2^6+x*2^5+x*2^4+x*2^3+x*2^2+x*2^1+x*2^0+1)*f_{crystal}$$

The default value in SCFQCTL after PUC was active is 31 that results in a factor of 32. The range of the $f_{System}$ is theoretical and depends on the adjustable frequency range of the DCO (see more information in electrical characteristics).

The output of the frequency integrator controls the DCO. This value can be read using the appropriate address of SCFI1 and SCFI0. See FIG. 77B and FIG. 77C. The digital representation is:

$N_{DCO=(x \cdot 2^9+x*2^8+x*2^7+x*2^6+x*2^5)+(1-M)*(x*2^4+x*2^3+x*2^2+x*2^1+x*2^0)}$ Two bits in the SFR address range handle the system control interaction according to the function implemented in the SCG. These three bits are:

OscFault Interrupt Flag OFIFG (located in IFG1.1, initial state is unchanged)

OscFault Interrupt Enable OFIE (located in IE1.1, initial state is reset).

The interrupt flag is part of a multiple source interrupt request. The same interrupt vector is also used for the an event at the RST/NMI–pin when NMI function is selected. The interrupt is defined to be non-maskable. Non-maskable implies that the general interrupt enable bit GIE can not disable the interrupt request. Since the interrupt shares the same interrupt vector and an oscillator fault is active after PUC the interrupt flag is not automatically reset.

Three different situations should be handled by the software:

After PUC a proper sequence should be programmed to identify or to set a oscillator condition that prevents active level at OscFault signal and therefore permanently set of OFIFG. The OFIFG should be reset by software.

PUC resets the OFIE bit and no interrupt is requested.

When an interrupt from the OscFault signal was requested and serviced, the interrupt enable bit OFIE is reset automatically to disable further continuous interrupt requests until proper response from the software conducts to a inactive OscFault signal. After reaching the inactive state the OFIE bit can be set again follow the general rules of module interrupts. An oscillator fault event is not affected by the general interrupt enable bit GIE.

The interrupt flag OFIFG can be used to identify the interrupt source at beginning of the interrupt service routine. The OFIFG is set independent of an additional NMI event and is dominant.

The digital controlled oscillator varies with temperature and supply voltage. Running the frequency loop this is unimportant for application because the period of control is identical with the period of the ACLK signal. With a 32 768 Hz crystal it is 30.5 µs. FIG. 26 shows the DCO's typical characteristics.

Figure 27:
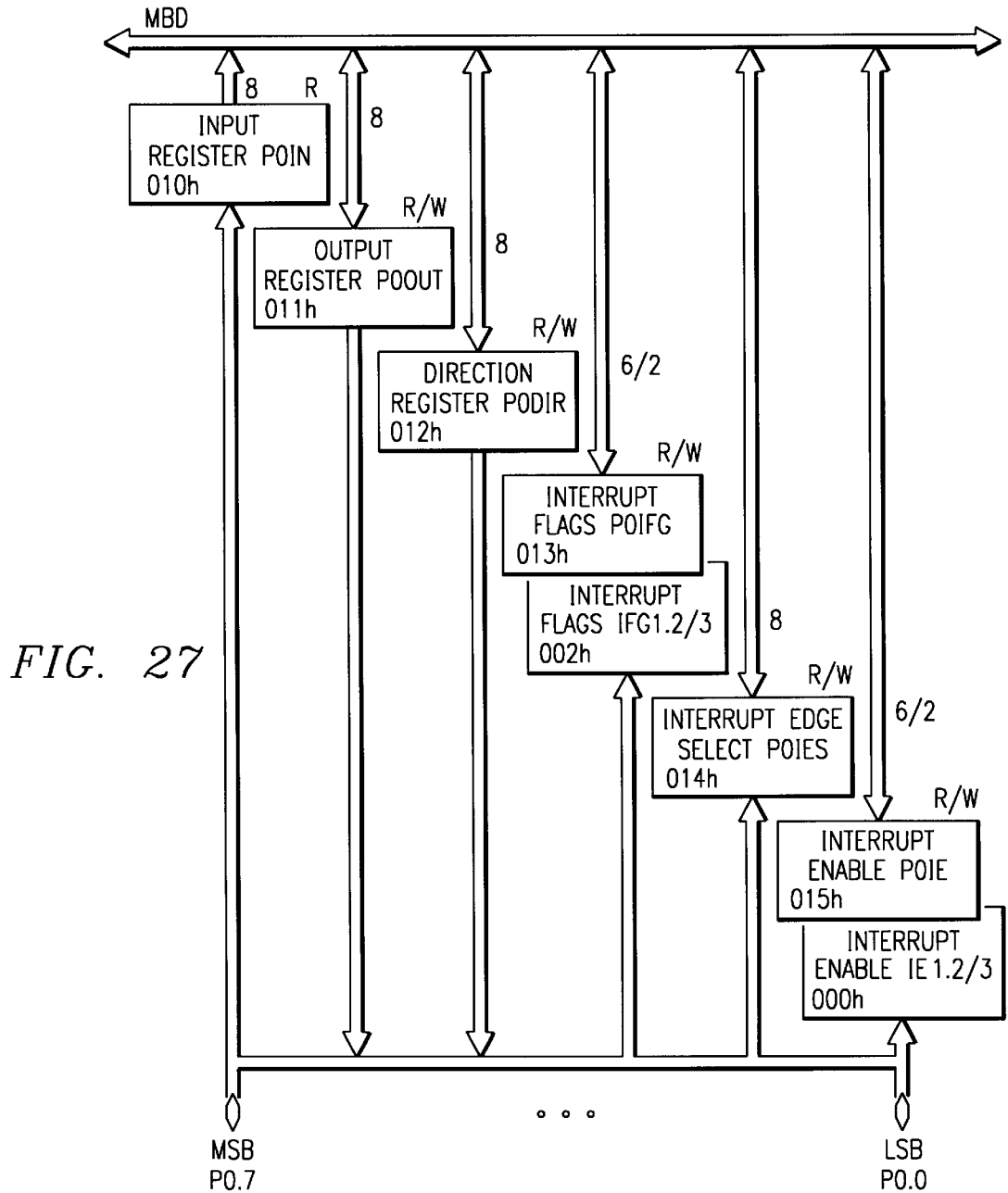
FIG. 27 represents Port 0 Configuration.

The general port P0 incorporates all functions to select individually the pin function and to use each signal as interrupt source as can be seen in FIG. 27. The six registers are used for the control of Port's I/O pins. The general module registers are mapped into the lower peripheral file address range where all byte modules are located.

The six control registers give maximum flexibility of digital input/output to the application:

All individual I/O bits are programmable independently:

Any combination of input, output and interrupt condition is possible.

Interrupt processing of external events is fully implemented for all eight bits of the port P0.

Access to all registers with all instructions according to implemented read and write possibilities.

The six registers are:

| Register type | | Address | Initial State |
| --- | --- | --- | --- |
| Input register: | — | read only | 010h |
| Output register: | unchanged | read/write | 011h |
| Direction register: | reset | read/write | 012h |
| Interrupt Flags: | reset | read/write | 013h |
| Interrupt Edge Select: | unchanged | read/write | 014h |
| Interrupt Enable: | reset | read/write | 015h |

All these registers contain eight bits except the two LSB's in the interrupt flag register and the interrupt enable register. These two bits are included into the special function register SFR.

Figure 28:
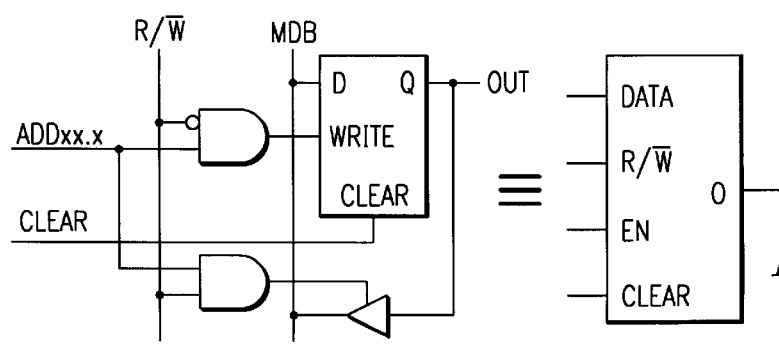
FIG. 28 represents schematic of bit register.
Figure 29:
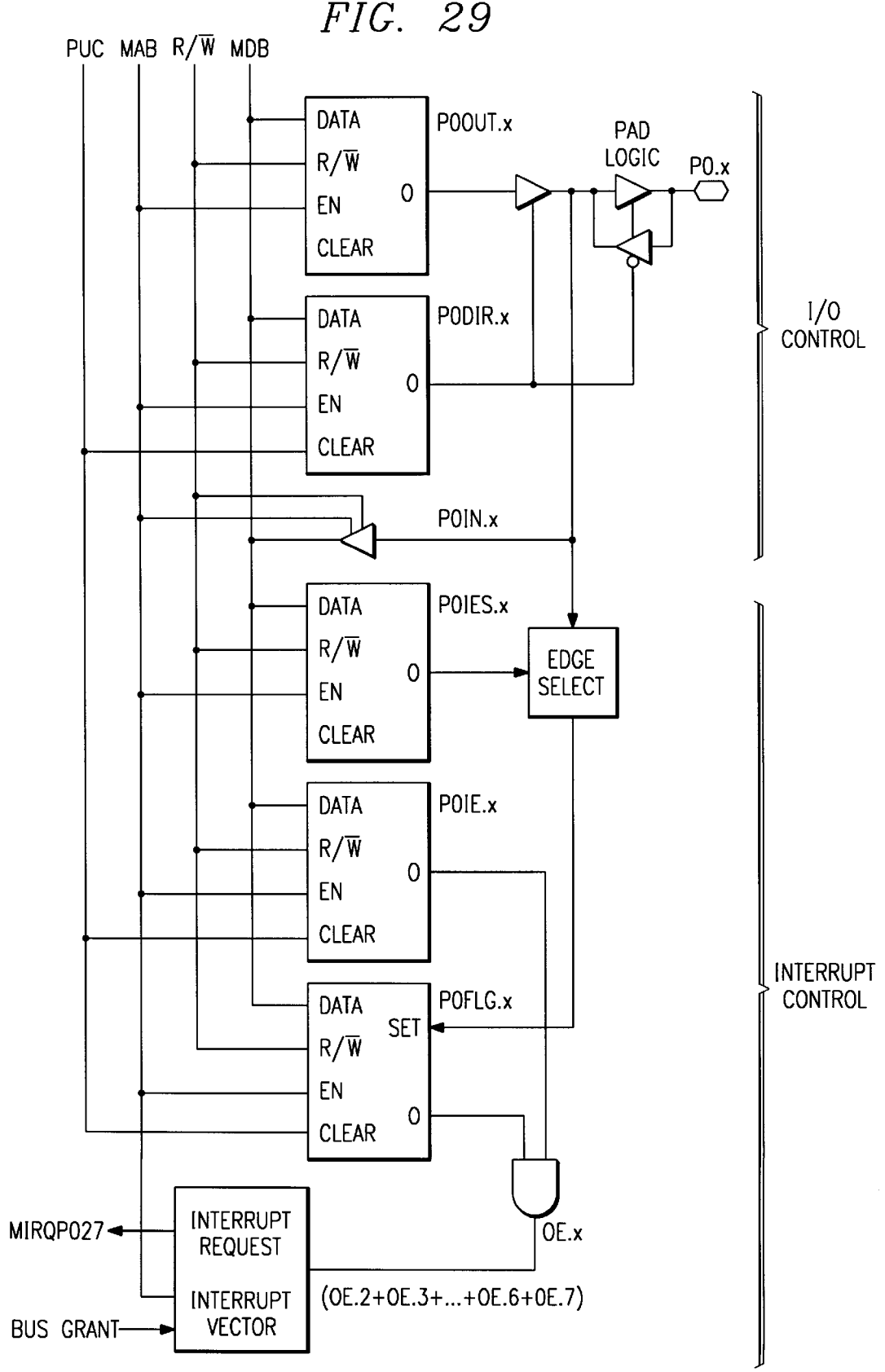
FIG. 29 represents schematic of single bit of port P0.7 to P0.3.
Figure 30:
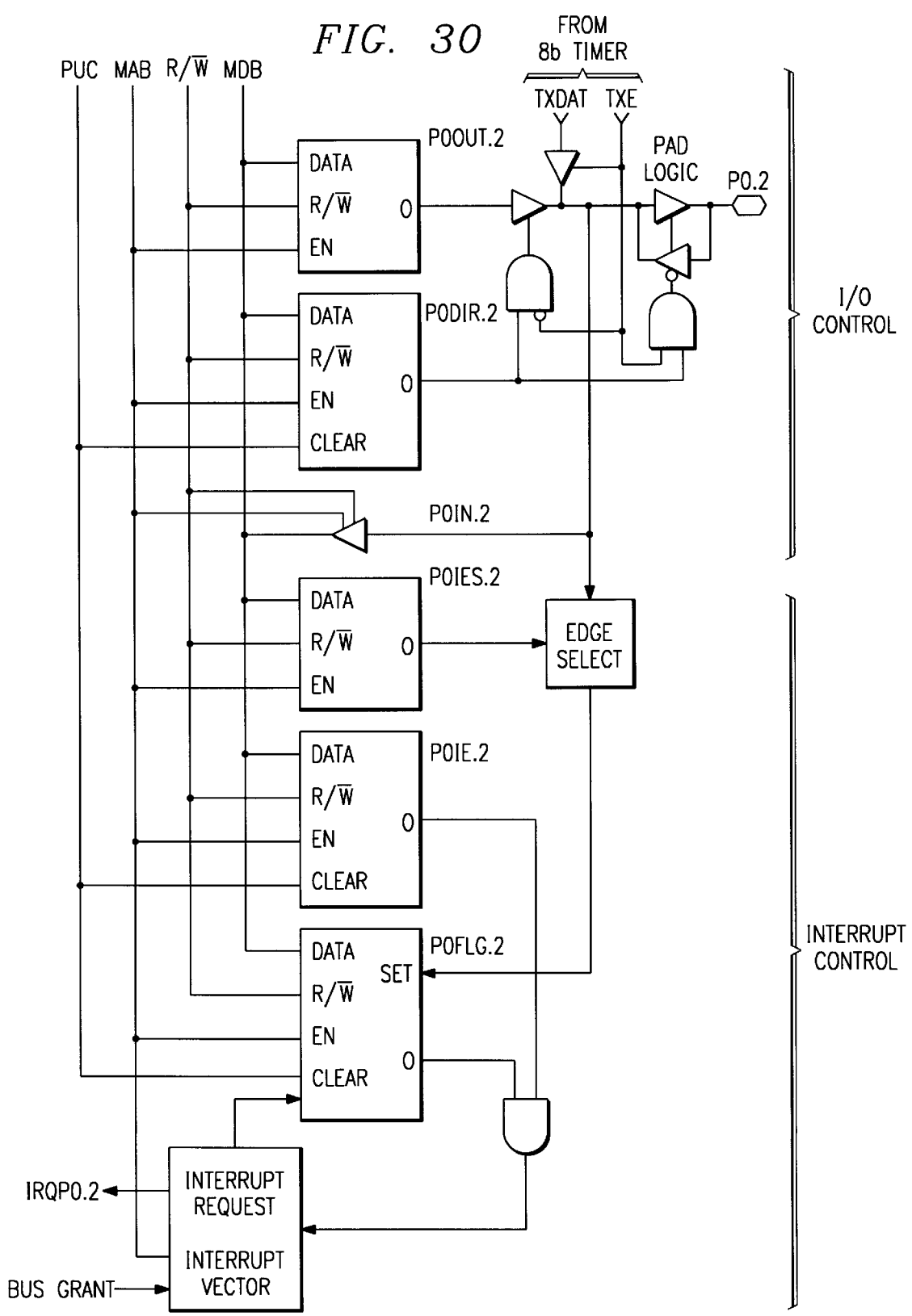
FIG. 30 represents schematic of single bit of port P0.7 to P0.2.
Figure 31:
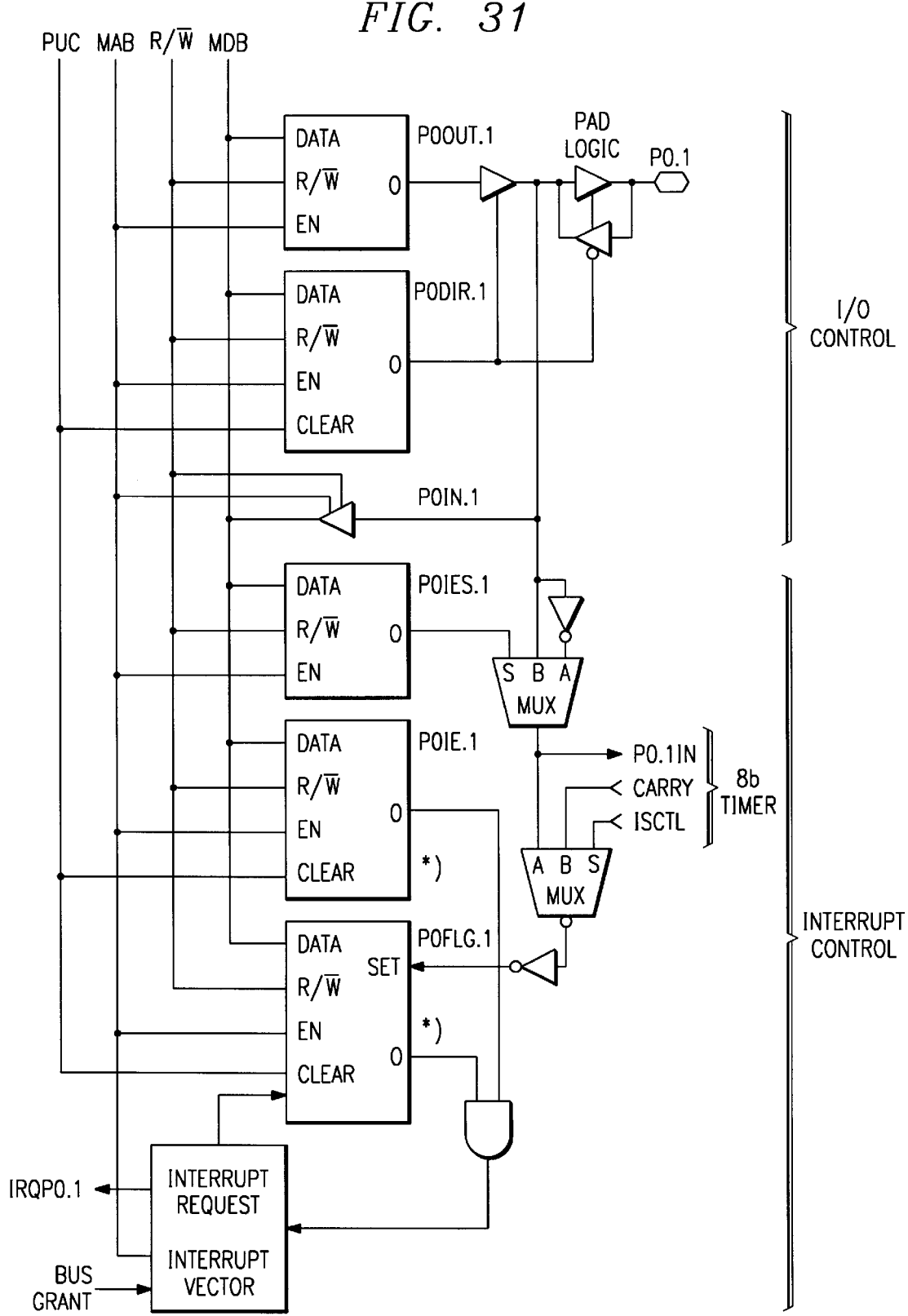
FIG. 31 represents schematic of single bit of port P0.7 to P0.1.
Figure 32:
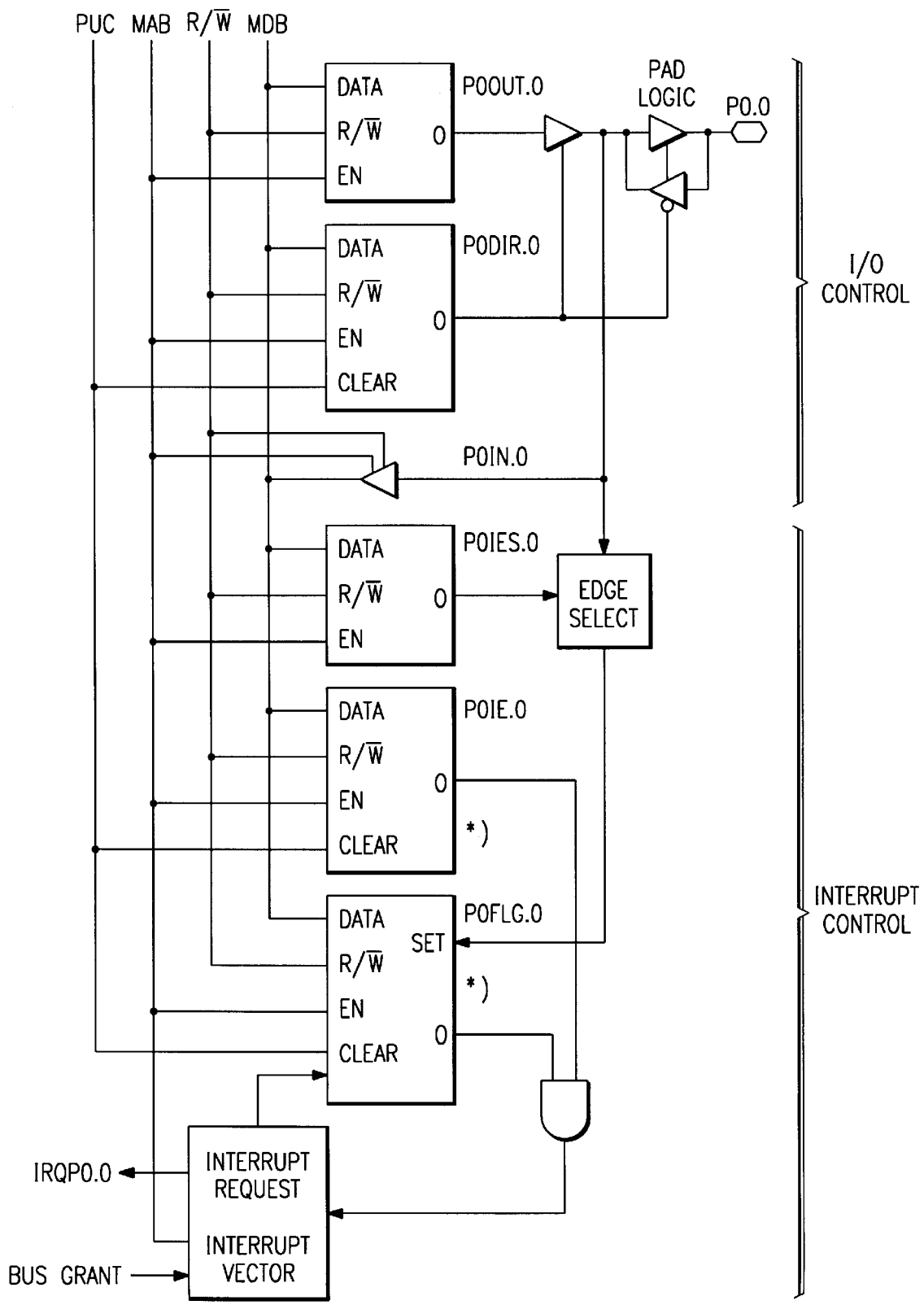
FIG. 32 represents schematic of single bit of port P0.0.

The pin logic of each individual signal of port P0 is built from five identically register bits and one 3-state bus driver. The register bits include the bit storing element plus the according control logic. FIG. 28 shows the schematic of the bit register, FIGS. 29, 30, 31 and 32 shows the schematic of the single bit ports.

The I/O function of P0.7 to P0.2 differs to that function of P0.1 and P0.0 in the interrupt control section. Each of the interrupt event on pin P0.1 and P0.0 triggers one interrupt flag and results in a different vector address. The event on one of the pins P0.7 to P0.2 are collected into a 'group' or multiple source interrupt. An event on one or more of the pins P0.7 to P0.2triggers the appropriate and enabled IO flag P0FLG.x. If any of these IO flags P0FLG.x is set and the appropriate interrupt enable bit is set too it will result into an interrupt on the same vector address. The software should identify the trigger source testing the individually flags (P0GLG.x). Multiple interrupt source flags are not reset during interrupt request service. They should be handled in the interrupt service routine.

The port0 uses eight bits for interrupt flags, eight bits for interrupt enable, eight bits to select the effective edge of an interrupt event and three different interrupt vector addresses.

The three interrupt vector addresses are assigned to:

P0.0

P0.1/RXD

P0.2 to P0.7

Two port0 signals P0.0 and P0.1/RXD are used for dedicated signal processing. Four bits in the SFR address range and two bits in the port0 address frame handle the interrupt events on P0.0 and P0.1/RXD:

P0.0 Interrupt Flag P0.0IFG (located in IFG1.2, initial state is reset)

P0.1/RXD Interrupt Flag P0.1IFG (located in IFG1.3, initial state is reset)

P0.0 Interrupt Enable P0.0IE (located in IE1.2, initial state is reset)

P0.1/RXD Interrupt Enable P0.1IFG (located in IE1.3, initial state is reset)

P0.0 Interrupt Edge Select (located in P0IES.0, initial state is reset)

P0.1/RXD Interrupt Edge Select (located in P0IES.1, initial state is reset)

Both interrupt flags are single source interrupt flags and are automatically reset when the processor system serves them. The enable bits and edge select bits remain unchanged.

The interrupt control bits of the remaining six I/O signals P0.2 to P0.7 are located in the I/O address frame. Each signal uses three bits that define reaction on interrupt events:

interrupt flag, P0GLG.2 to P0GLG.7 interrupt enable bit, P0IE.2 to P0IE.7 interrupt edge select bit, P0IES.2 to P0IES.7

The interrupt flags P0GLG.2 to P0GLG.7 are part of a multiple source interrupt request. Any interrupt event on one or more pin P0.2 to P0.7 will request an interrupt when two conditions are met, the appropriate individual bit P0IE.x (2<x<7) is set and the general interrupt enable bit GIE is set. The six interrupt sources use the same interrupt vector. Since the interrupt shares the same interrupt vector interrupt flags P0.2 to P0.7 are not automatically reset.

The software of the interrupt service routine handle the detection of the source and also resets the appropriate flag when it is serviced.

The LCD ports can be selected partly to drive a liquid crystal display or to act as digital outputs driving static output signals. The control of a liquid crystal display requires output stages that can drive analog signals if higher multiplex rates are included.

The LCD outputs use transmission gates to transfer the analog voltage to the output pin. This analog voltage generates the analog voltage generator in conjunction with the appropriate control logic and the selected state of the segment.

Figure 33:
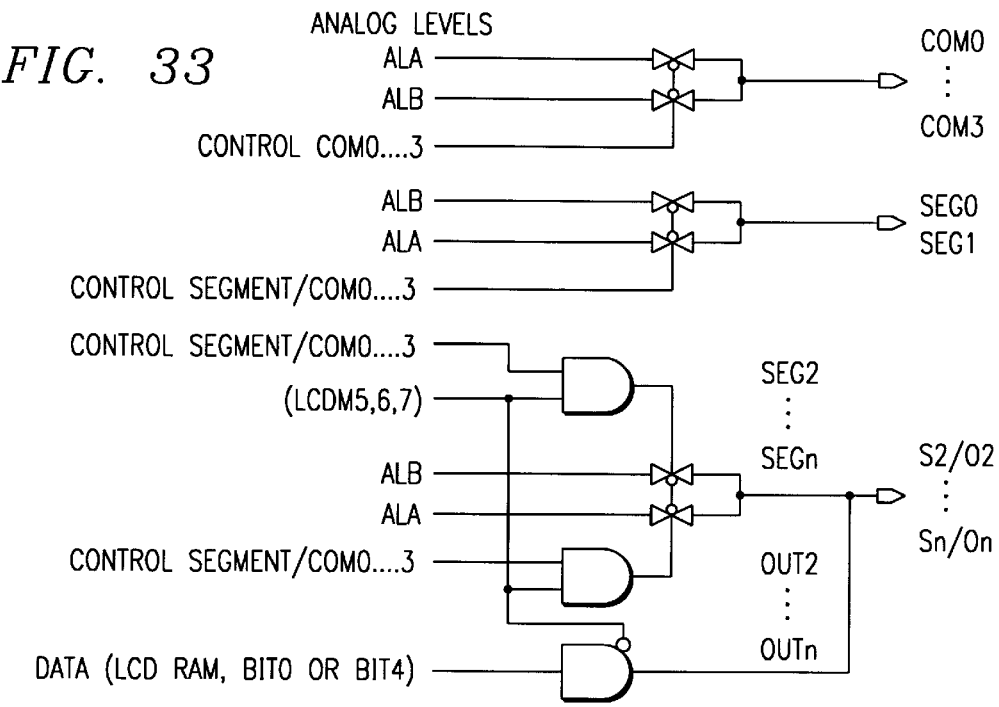
FIG. 33 represents schematic of LCD pin configuration.

Groups of pins which drive liquid crystal display signal or digital output signals are shown in FIG. 33. Three bits in the LCD mode register LCDM5, LCDM6 and LCDM7 control the function of these group of signals. For more information on control of these outputs see LCD description.

The intention of the basic timer operation is to support the software and various peripheral modules with a low power consuming, low frequency reference. Examples of software functions controlled by crystal's stability:

real time clock RTC debouncing keys, keyboard

Figure 34:
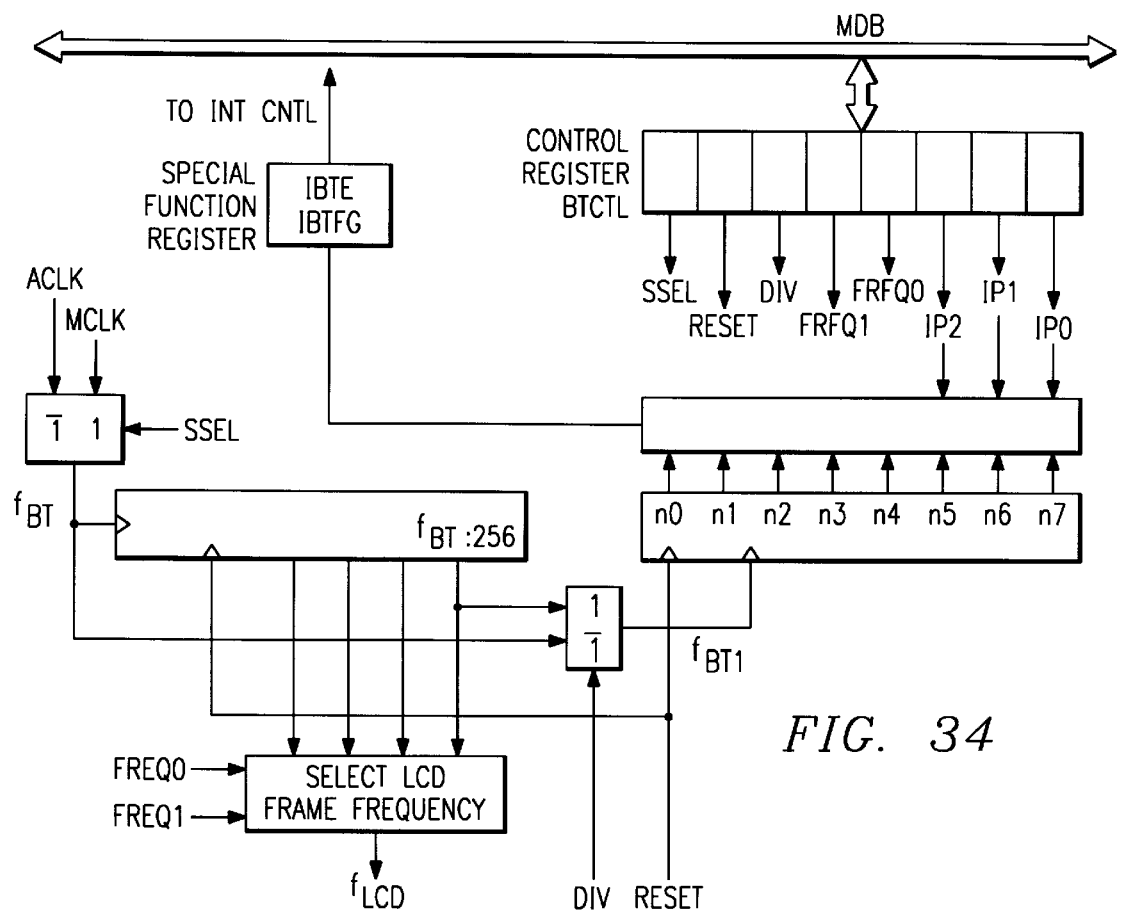
FIG. 34 represents Basic Timer Configuration.

The configuration of the basic timer is shown in FIG. 34.

The Basic Timer BT divides the frequency—selected with signal SSEL—to gain low frequency control signals. This is done within the system with one central divider, the basic timer, to support low current applications. The control register BTCTL holds the flags to control or select the different operational functions. The register BTCTL is connected to the CPU with the peripheral standard interconnection using the MAB, MDB and control lines. When supply voltage is applied, a reset of the device or a watchdog overflow or any other operational condition occurred all bits in the register hold undefined or unchanged status. The user's software usually configures the operational conditions on the BT during initialization.

The Basic Timer module hardware is connected to the processor core using access via the 8 bit MDB structure and MAB:

| Register | Short form | Register type | Address | Initial state |
|---|---|---|---|---|
| BT control register | BTCTL | Type of read/write | 040h | unchanged |

Figure 35:
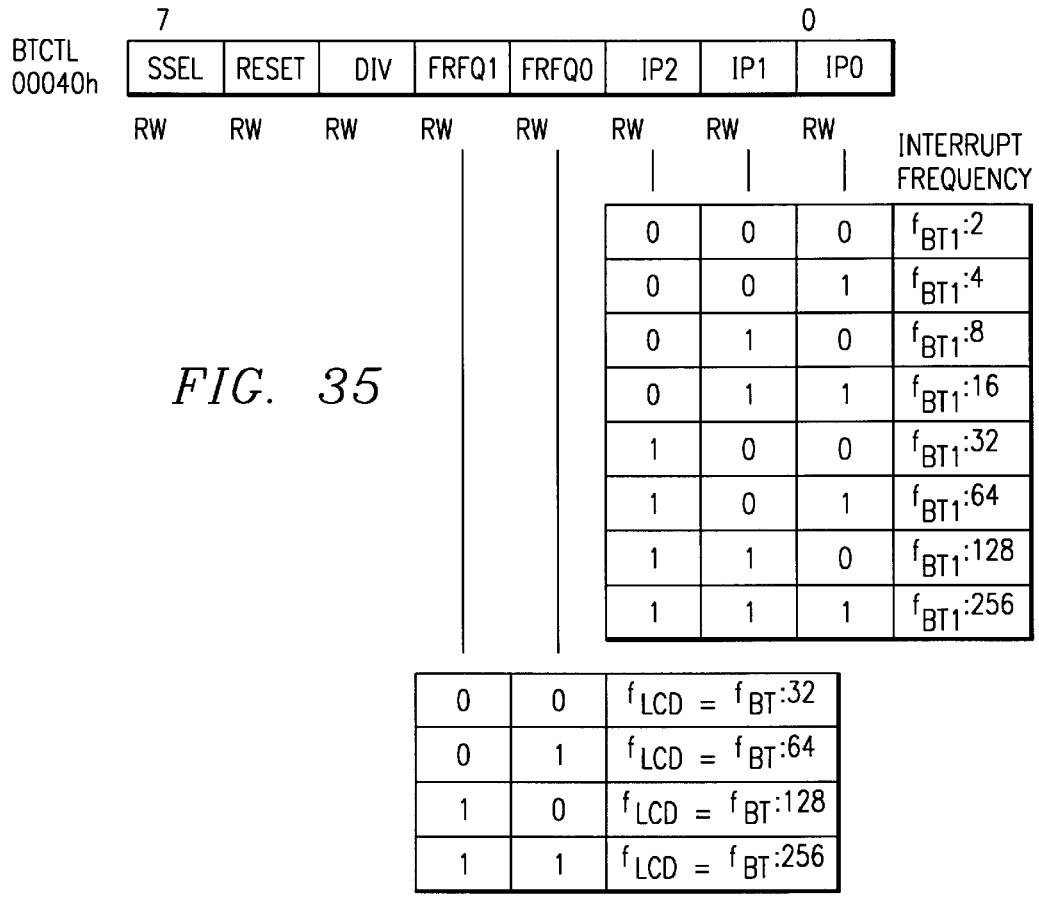
FIG. 35 represents Basic Timer Register Function.

The information stored in the basic timer register shown in FIG. 35 determines the operation of the basic timer. The status of the different bits selects the frequency source, the interrupt frequency and the framing frequency of the LCD control circuitry.

Three bits in the SFR address range handle the system control interaction according to the function implemented in the basic timer. These three bits are:

Basic Timer Module Enable BTME (located in ME2.7)

Basic Timer Interrupt Flag BTIFG (located in IFG2.7)

Basic Timer Interrupt Enable BTIE (located in IE2.7)

The module enable bit inhibits all functions of the module and reduces the power consumption to its minimum—the leakage current. The access of the system to the general module register BTCTL is not affected. It can be read or written in the usual manner. The interrupt flag and interrupt enable follow the general rules of module interrupts. Beside the individual interrupt enable bit the interrupt request is also controlled by the general interrupt enable bit GIE.

The interrupt flag BTIE is reset on PUC. The interrupt flag BTIFG is reset when the basic timer is reset (Reset bit in BTCTL) or when an interrupt request of the basic timer was accepted.

The basic timer is constantly incremented by the clock selected with the signal SSEL. This signal selects either the auxiliary clock ACLK (32 768 Hz) or the main clock MCLK (system clock fsystem). An interrupt can be used to control system operation. The interrupt is a single source interrupt.

Figure 36:
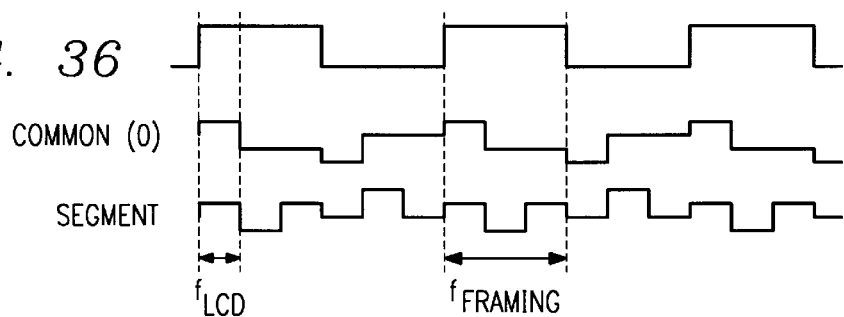
FIG. 36 represents Frequency Select for LCD (Example for 3MUX).

The peripheral LCD module uses the signal $f_{LCD}$ to generate the timing for common and segment lines. The frequency of the signal $f_{LCD}$ is in the proper range only if the ACLK is selected. Using a 32 768 Hz crystal at the oscillator the frequency at $f_{LCD}$ is 1024 Hz, 512 Hz, 256 Hz or 128 Hz. The bits FRFQ1 and FRFQ0 allow the right choice of the frame frequency. The proper frequency $f_{LCD}$ depends on the LCD's characteristic data for the framing frequency and the multiplex rate of the LCD. The frequency select for the LCD is shown in FIG. 36.

Example for 3MUX:

LCD data sheet: $f_{Framing}$=100 Hz . . . 30 Hz

FRFQ: $f_{LCD}$=3×$f_{Framing}$ $f_{LCD}$=3×100 Hz . . . 3×30 Hz=300 Hz . . . 90 Hz Select $f_{LCD}$: 1024 or 512 or 256 or 128 Hz $f_{LCD}$=128 Hz×FRFQ1=1; FRFQ0=1

The programmable interrupt interval timing offers opportunities to programmers for time based operations that can be divided into three main fields of applications:

Considering the following:

low frequency and very low power applications medium frequency and less critical current consumption mixed modes under strict software control.

These types of applications use typically long periods of interrupt intervals in the range up to seconds. That means for the basic timer operation to select the auxiliary clock ACLK with SSEL=0 and DIV=1. The ACLK signal is identically with the watch crystal's frequency usually 32 768 Hz. With these conditions the intervals are in the range of 15.625 ms to 2 s in eight steps each step twice as long as the previous. These intervals can be used for key or keyboard debouncing or real time clock software routines.

Medium and short interval application use two bits to select the proper frequency:

SSEL bit selects the clock frequency

DIV bit selects the pre divider rate 1 or 256.

The four combinations resulting from these two bits demonstrate the frequency range selectable:

| SSEL | DIV | Source/Factor | $f_{Interrupt}$ with:<br>ACLK = 32 768 Hz<br>MCLK = 31 × ACLK<br>IP2 = IP1 = IP0 = 0<br>$f_{Interrupt}$ = Source/Factor |
|---|---|---|---|
| 0 | 0 | ACLK/2 | 16 384 Hz |
| 0 | 1 | ACLK/512 | 64 Hz |
| 1 | 0 | MCLK[1)]/2 | 507 904 Hz |
| 1 | 1 | MCLK/512 | 1 984 Hz |

1) Selection of SSEL=1 and DIV=0 together with low division factor defined by IP2 . . IP0 will result in more frequently interrupts than processor can handle.

The mixes of different intervals for interrupt are requested from various application conditions. This need arises e.g. with combination of debouncing of keys and real time clock requirement. The software needs to be defined carefully on the timing of selecting the different intervals. The principle structure demonstrates a software example using this technique:

The basic timer has limited possibilities to generate fixed periodically intervals. This feature is operating together with the reset function available due to the Reset bit. The activation of reset while using a LCD and/or a real time clock needs carefully consideration on the resulting conditions.

Figure 37:
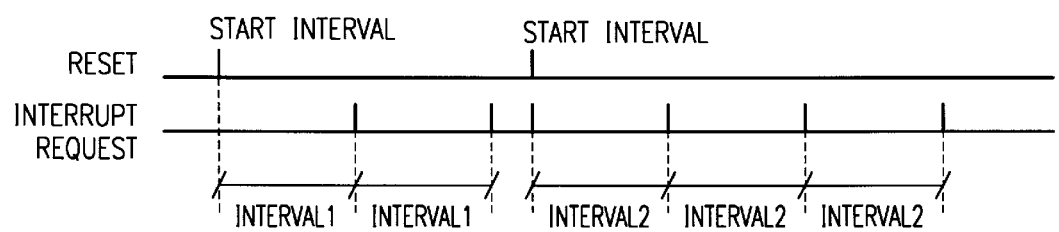
FIG. 37 represents Fixed Interval Timing.

The basic timer has limited possibilities to generate fixed periodically intervals. This feature is operating together with the reset function available due to the Reset bit. The activation of reset while using an LCD and/or a real time clock needs carefully consideration on the resulting conditions. The fixed interval timing is illustrated in FIG. 37.

Figure 38:
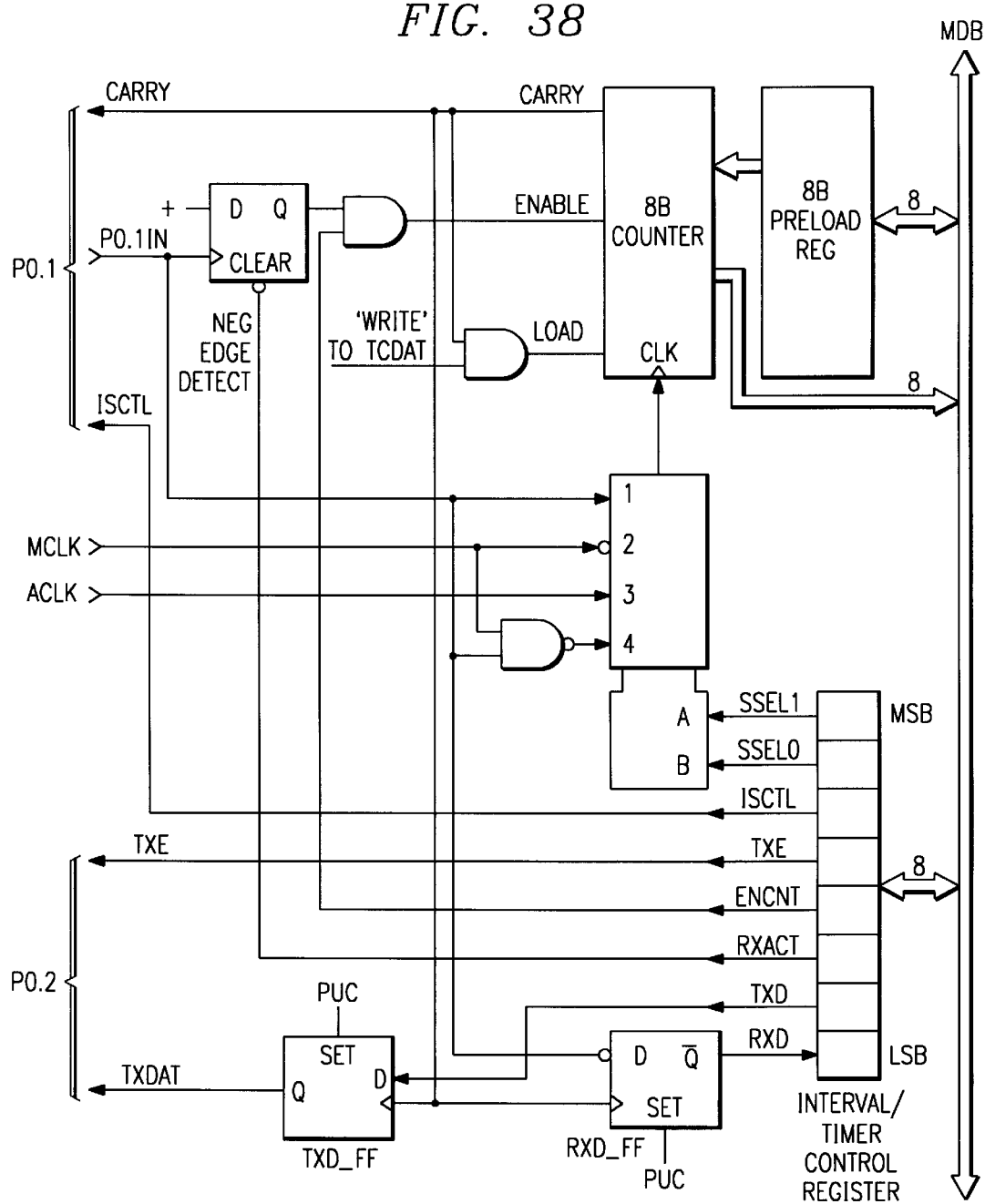
FIG. 38 represents Principle Schematic of 8 bit Timer/Counter.

The 8 bit interval timer supports three major functions for the application:
  serial communication or data exchange
  puls counting or puls accumulation
  timer The 8 bit Timer/Counter includes following major blocks which are further illustrated in FIG. 38.
  8 bit Up-Counter with pre-load register
  8 bit Control Register
  Input clock selector
  Edge detection, e.g. Start bit at asynchronous protocols
  Input and output data latch, triggered by carry-out-signal from 8 bit counter.

The 8 bit counter counts up with the input clock selected via two control bits (SEL0, SEL1) of the control register. Two inputs (Load, Enable) at the counter control the operation (see FIG. 39).

One of the two inputs control the load function. A load operation loads the counter with the data of the pre-load register. A write access to the counter results in loading the pre-load register content into the counter, The software writes or reads the pre-load register with full control with all instructions. The pre-load register acts as a buffer and can be written immediately after the load of the counter has completed. The second of the two inputs enable the count operation. When the enable signal is set to high the counter will count-up each time a positive clock edge is applied to the clock input of the counter.

The information stored in the 8 bit control register selects the operating mode of the timer/counter and controls the function.

Two signals out of the 8 bit control register select the source for the clock input of the 8 bit up-counter. The four sources are the system clock MCLK, the auxiliary clock ACLK, the external signal from pin P0.1 and the signal from the logical AND. of MCLK and pin P0.1.

Serial protocols like UART protocol needs the start bit edge detection to determine at the receiver the start of a data transmission.

The clock to latch data into the input and output data latch is the carry signal from the 8 bit counter. Both latches are used as single bit buffer and change their outputs with the pre-defined timing.

The Timer/Counter module hardware is going to be controlled using access via the 8 bit MDB structure and MAB:

| Register Initial State | Short form | Register type | Address |
|---|---|---|---|
| T/C control register: Reset | TCCTL | Type of read/write | 042h |
| Pre-load register: Unchanged | TCPLD | Type of read/write | 043h |
| Counter: Unchanged | TCDAT | Type of read/(write) | 044h |

The information stored in the control register determines the operation of the timer/counter (see FIG. 40).

The information stored in the pre-load register is loaded into the 8 bit counter when a write access to the counter (TCDAT) is performed:

The pre-load register (TCPLD) can be accessed using the address 043h.

The data of the 8 bit counter can be read using the address 044h. Writing to the counter loads the content of the pre-load register—not the data mentioned by the instruction.

The 8 bit Timer/Counter has no individual interrupt bits; it shares the interrupt bits with the port P0. One bit in the control register TCCTL, the bit ISCTL, selects the interrupt source for the interrupt flag. The port0 signal P0.1/RXD or the carry of the 8 bit counter is used for interrupt source. Two bits in the SFR address range and one bit in the port0 address frame handle the interrupt events on P0.1/RXD:

0 P0.1/RXD Interrupt Enable P0.LIE (located in IE1.3, initial state is reset)
  P0.1/RXD Interrupt Edge Select P0IES.1 (located in P0IES, initial state is reset)

The interrupt flag is a single source interrupt flag and is automatically reset when the processor system serves it. The enable bit and edge select bit remain unchanged.

The Timer/Counter peripheral incorporates some details to support serial data exchange with software. The data exchange consists of transmit cycle and receive cycle. The peripheral hardware supports half duplex protocols especially.

The software operation can be separated into three categories to support the different conditions and requirements of individual applications:
  Control the bit information immediately after each receive cycle
  Control all bits of one frame immediately after each receive cycle
  Receive the complete telegram, store the frames in memory and check it after completion of receive cycle.

The UART protocol is a serial bit stream which includes start bit, 1 to 8 data bits, an optional parity bit, an optional address bit and 1 or 2 stop bits. The LSB data bit is sent first after the start bit (see FIG. 41).

Figure 42:
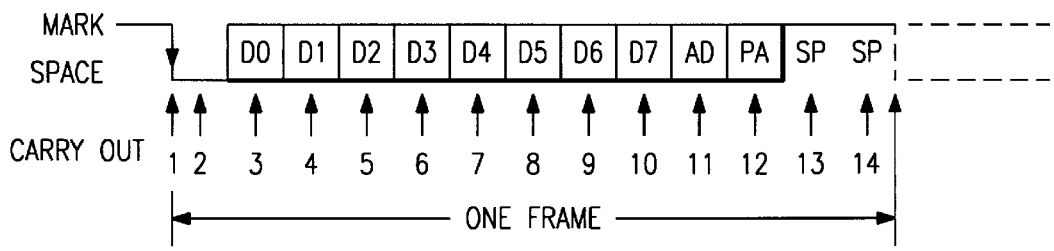
FIG. 42 represents scanning of the asynchronous bits of one frame.

The Timer/Counter acts as a timer and the carry out latches the bit information available at the pin P0.1. The negative edge—from mark to space of the start bit— indicates the start of one frame. Each bit is scanned right in the middle of each bit (see FIG. 42).

The SW-UART is closely combined with the start of a receive cycle and the baud rate. All timings vary from bit to bit if a reference or clock frequency clocks the timer in non-multiple frequency from the selected baud rate. The example herein should run with a baud rate of 2400 baud with a crystal frequency of 32,768 Hz. The result of these conditions is that each bit interval has got its own timing and therefore its own pre-load value.

Figure 43:
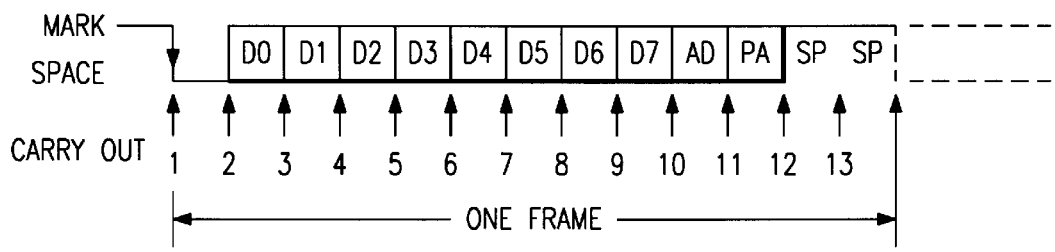
FIG. 43 represents transmitting of the asynchronous bits of one frame.

The Timer/Counter acts as a timer and the carry out latches the bit information available from the control register TCCTL, bit 1: TXD. The SW-UART should load the TXD bit with the information that should be on the I/O pin P0.2. The next carry from the timer latches the TXD bit into the TXD_FF. The transmission of data out of the I/O pin P0.2 is enabled by setting of bit TXE in the control register. The reset state of the signal TXE disables the output buffer connected to pin P0.2 and sets parallel the TXD_FF output. This corresponds to the mark state defined for UART format (see FIG. 43).

The timing of the transmit part of the SW-UART depends on the baud rate. All timings vary from bit to bit if a reference or clock frequency clocks the timer in non-multiple frequency from the selected baud rate. The example herein should run with a baud rate of 2400 baud with a crystal frequency of 32,768 Hz. The result of these conditions is that each bit interval has got its own timing and therefore its own pre-load value.

Each communication needs features to recognize errors that happens during the data transmission. Four different error conditions are defined:

Parity Error

Overrun Error

Framing Error

Break detect

Additional to the previous fundamentals there is an optional function included to support protocol handling: the identification of the start of a block of frames and the destination of the telegram. Two different modes for identifications are used in the industry, the idle line multiprocessor protocol and the address bit multiprocessor protocol.

Figure 44:
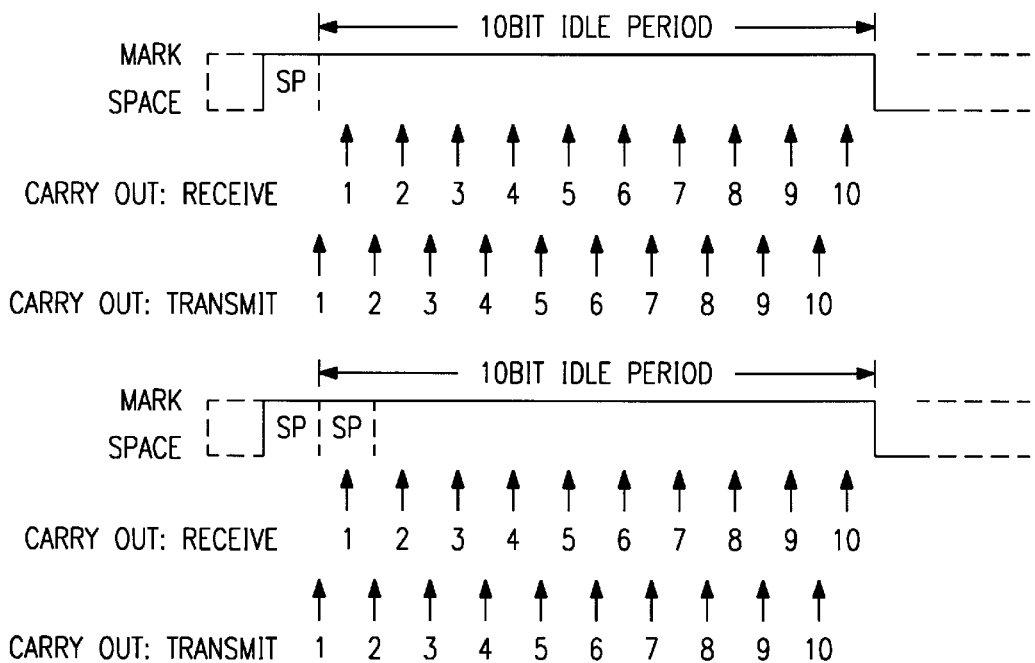
FIG. 44 represents UART idle period.

The Idle line multiprocessor mode format is illustrated in FIG. 44.

The blocks of data are separated by idle time between them. An idle receive line is detected when ten or more mark state (1's) in a row are received after the first stop bit of a character. When two stop bits are used, the second is counted as the first mark bit of the idle. The first character received after an idle period is an address character. The idle line periods detected by the receiver are illustrated with one and two stop bits.

Figure 45:
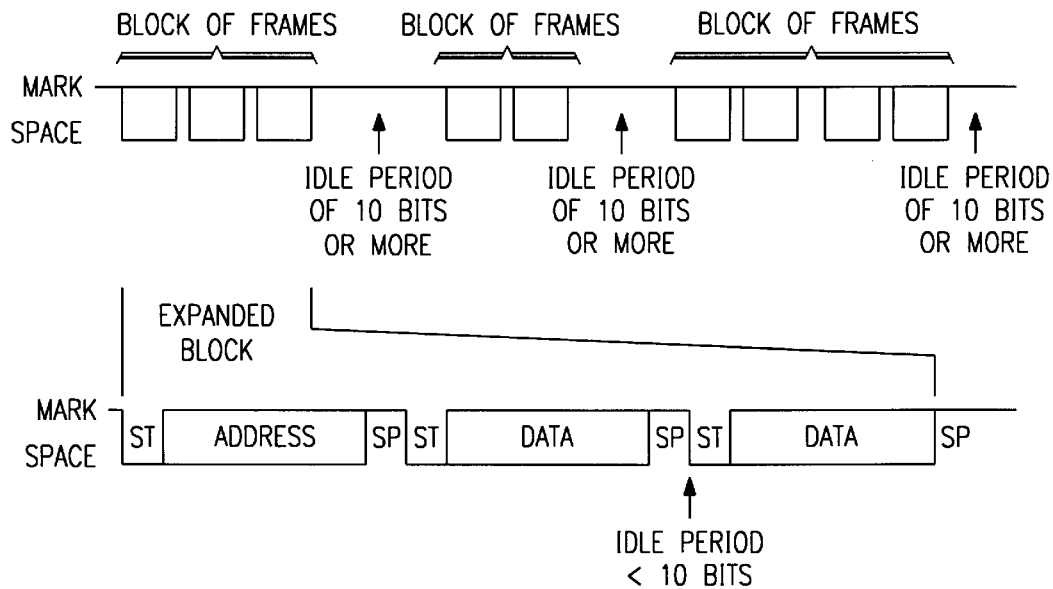
FIG. 45 represents idle line multiprocessor protocol.

It is recommended to transmit an idle period of 11 bit instead of 10 bit. The precise idle period generates an efficient address character identifier. The first character of a blocks of frames can be identified as an address. The time frame of frames within a block of information's should not exceed the idle period detect time of 10 bits. The idle line multiprocessor protocol is illustrated in FIG. 45.

Figure 46:
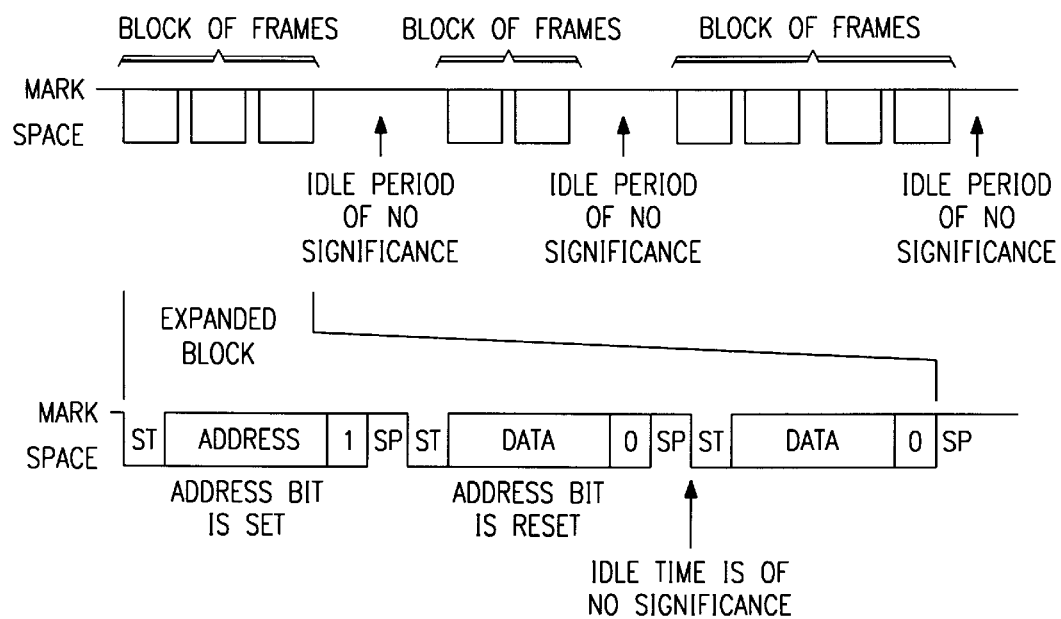
FIG. 46 represents address bit multiprocessor mode format.

Address bit multiprocessor mode format is shown in FIG. 46.

Each character contains an extra bit that represents an address indicator. The first character in a block of data (frames) carries an address bit that is set. This indicates that the character is an address.

The programming example of a serial UART communication protocol using the features of the 8 bit Timer/Counter should follow these conditions:

Baud rate 2400 baud

ACLK=32 768 Hz

Parity Even

Two stop bits

Half duplex

The carry signal of the Timer/Counter module is selected for the interrupt source instead of P0.1 source. The according vector contains the address of the transmit/receive interrupt routine. The first instructions separate the program flow into the transmit or receive part and use the bit TXRX as indicator for the running mode.

The time intervals between two carry's differs during each transmit or receive cycle. The selected baud rate of 2400 baud and the clock frequency of 32 768 Hz would require a divider of =13.67. The deviation from this ideal factor is accomplished using the sequence 14-13-14 for the division.

Figure 47:
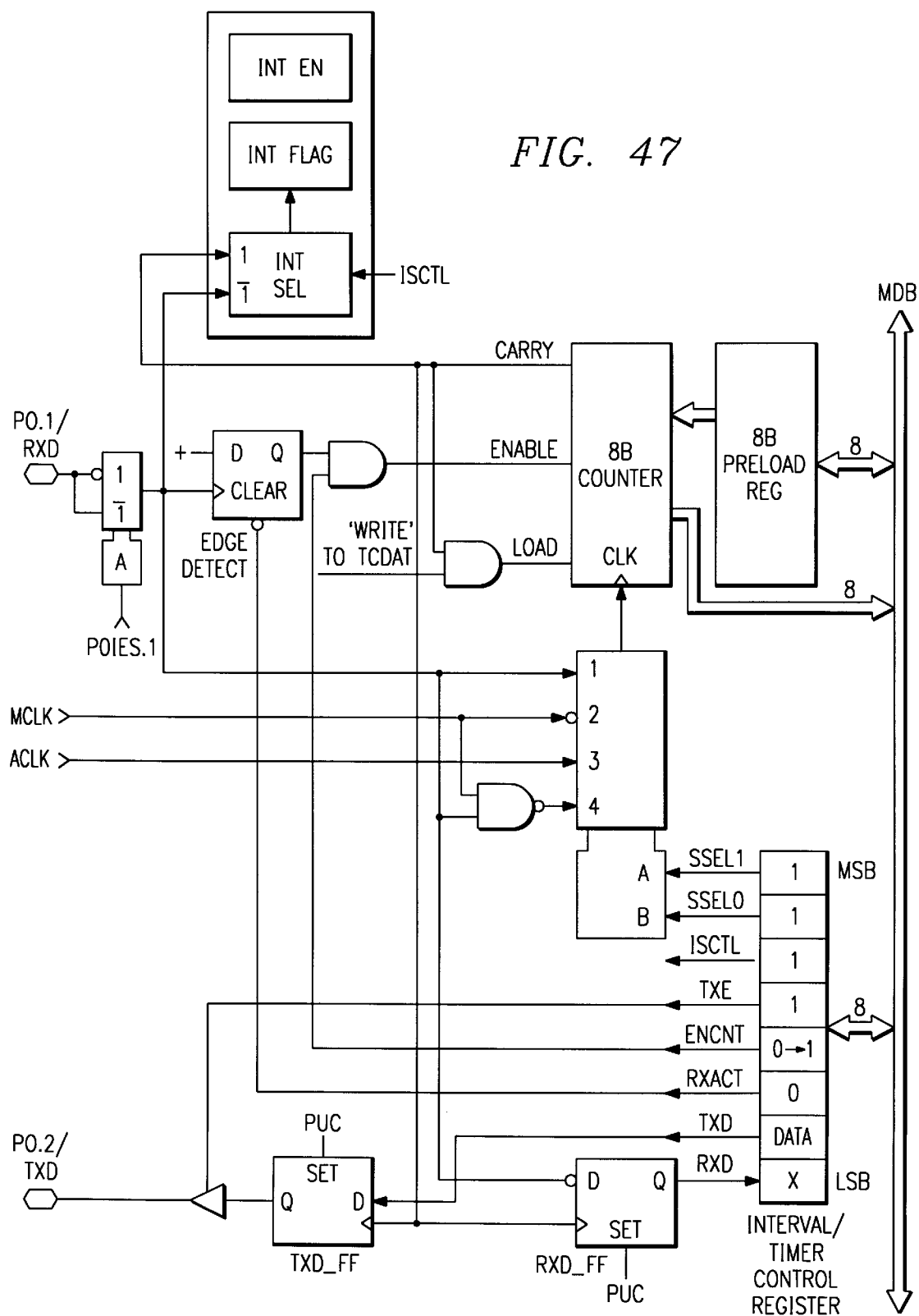
FIG. 47 represents 8 bit Timer/Counter configuration for transmit example 2400 Baud ACLK clock.

The transmit mode uses the 8 bit timer/counter, the pre-load register, the control register, the clock selector and the TXD data latch shown in FIG. 47.

Before a serial communication character transmit starts there are some operation conditions to be defined:

The output buffer should be enabled → TXE bit is set.

The clock input into the 8 bit timer should be selected → ACLK is selected with SSEL0 bit is reset and SSEL1 bit is set.

The interrupt source control bit ISCTL selects carry out of timer.

The appropriate bits regarding P0.1 direction and interrupt edge bits should be chosen properly.

The pre-load register is loaded.

The write access to the counter loads the pre-load value into the timer.

The RXACT bit is reset.

Figure 48:
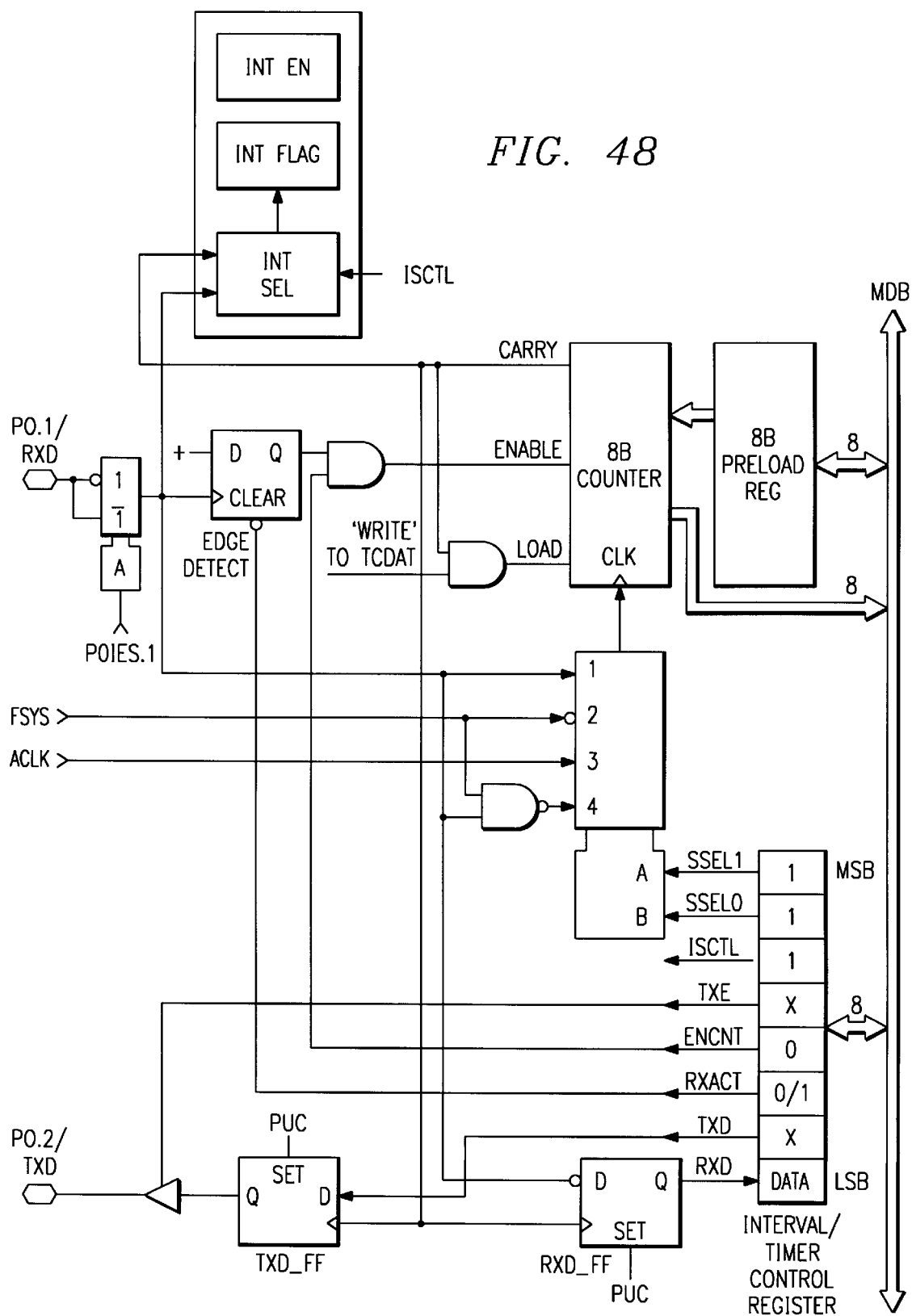
FIG. 48 represents 8 bit Timer/Counter configuration for receive example 2400 baud, ACLK clock.

The receive mode uses the 8 bit timer/counter, the pre-load register, the control register, the clock selector, the edge detect logic and the RXD data latch shown in FIG. 48.

Before a serial communication character receive starts there are some operation conditions to be defined (assuming RXACT bit is reset):

The output buffer should be disabled → TXE bit is reset.

The clock input into the 8 bit timer should be selected → ACLK is selected with SSEL0 bit is reset and SSEL1 bit is set.

The interrupt source control bit ISCTL selects carry out of timer.

The appropriate bits regarding P0.1 direction and interrupt edge bits should be chosen properly.

The pre-load register is loaded.

The write access to the counter loads the pre-load value into the timer.

The RXACT bit is set.

As long as the RXACT and ENCNT bit are reset the timer/counter is halted. The change to the receive active state with set of RXACT bit enables the negative edge detect. The first edge of the start bit, applied to pin P0.1, set the output of the edge detect latch. It will be set until another reset of RXACT bit will be performed.

Once the edge detect latch is set the time starts operation. The first time interval is started and with the elapse of the programmed time the logical level of the pin P0.1 is latched into the RXD latch. After that activity the interrupt is requested.

The interrupt routine for the first bit is optional and can test presence of start bit. In absence of the start bit the receive cycle is stopped. When receive cycle is continued the next timing should be prepared by loading the pre-load register with proper data.

All further bits follow nearly the same rule handled in the interrupt routine.

The interrupt routine should handle:
Store RXD bit information
Prepare next timing
Optional: update parity information
    decide program flow on parity error
    look for address bit information
Test stop bit if received bit should be stop bit.

Figures 49, 50:
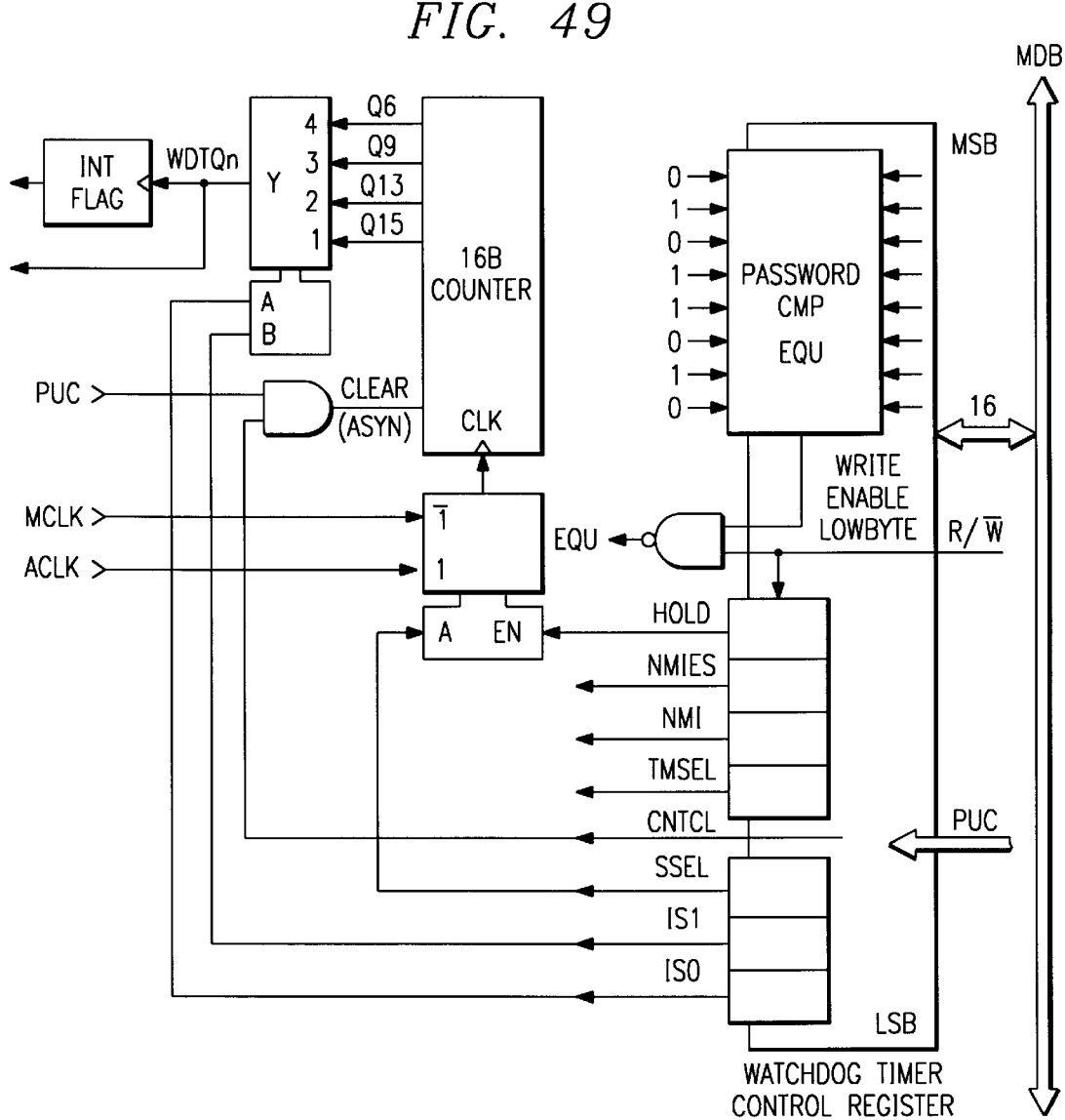
FIG. 49 represents Schematic of Watchdog Timer.
FIG. 50 represents Watchdog Timer Control Register.

The primary function of the Watchdog Timer module WDT is, to perform a controlled system restart after a S/W upset has occurred. The schematic of the WTD is shown in FIG. 49. If the selected time interval expires, a system reset is generated. If this watchdog function is not needed in an application, the module can work as an interval timer, which generates an interrupt after the selected time interval.

Features:
eight S/W-selectable time intervals
two operating modes: as watchdog or interval timer
expiration of time interval in watchdog mode generates a system reset, in timer mode an interrupt request
for safety reasons, writing to the WDT control register is only possible using a password
supports ultra-low power feature using hold mode The watchdog timer counter WDTCNT is a 16bit up-counter, which is not directly accessible by S/W. The WDTCNT is controlled through the watchdog timer control register WDTCTL, which is a 8 bit read/write-register located at the low byte of word address 0120h.n Writing to WDTCTL is, in both operating modes (watchdog or timer), only possible in conjunction with the correct password (see FIG. 50).

Read access:

WDTCTL can be read without restriction by a password. A read is performed by simply accessing word address 0120h. The Lowbyte contains the value of WDTCTL. The value of the Highbyte is 069h. The value of the Highbyte is selected to 069h and limits the effect of instructions that can alter the WDTCTL register. Reading WDTCTL is illustrated in FIG. 78A.

Write access:

A write access to WDTCTL is only possible using the correct password in the high-byte. Changing the WDTCTL-register is performed by writing to word address 0120h. The low-byte keeps data to be written to WDTCTL and the high-byte has to be the password which is 05Ah. If any other value than 05Ah is written to the high-byte of address 0120h a system reset is generated. Writing WDTCTL is illustrated in FIG. 78B.

The Watchdog Timer use two bits in the SFR address range:
WDT Interrupt Flag WDTIFG (located in IFG1.0, initial state is reset)
WDT Interrupt Enable WDTIFG (located in IE1.0, initial state is reset)

The WDT interrupt flag is reset when power is applied or a reset from the RST/NMI pin is performed. The signal is called POR. The watchdog interrupt flag indicates in that situation if the watchdog was the reason for a PUC or applying power/reset. The vector address is in address 0FFFEh. The enable bit is not relevant.

The Watchdog Timer operates in two different modes. When the WDT is configured to operate in watchdog mode both, the watchdog overflow and the security violation, triggers the PUC signal that automatically clears the appropriate register bits in the entire system. For the bits in the WDTCTL register it ends in a system configuration were the WDT is set into the watchdog mode and the RST/NMI pin is switched to reset configuration.

When the WDT is configured to operate in timer mode the WDT flag is set after the selected time interval and it requests a standard interrupt service. The WDT interrupt flag is single source interrupt flag and is automatically reset when the processor system serves it. The enable bit remains unchanged. The WDT enable bit and the GIE bit should be set to activate interrupt request situation. The vector address is different from that in watchdog mode.

The Watchdog Timer module can be configured in two modes, the watchdog mode and the interval timer mode.

Watchdog mode

After power-on reset or a system reset the Watchdog Timer module automatically enters the watchdog mode with all bits in watchdog control register WDTCTL and watchdog counter WTCNT cleared. The initial conditions at the WDTCTL register results in an initial time interval of 32 ms @ $f_{sys}$=1 MHz. Since also the digital controlled oscillator DCO in the system clock generator is set to its lowest frequency ca. 32 600 cycles are available for the software to react on such a drastically event. This was selected to run the WDCNT with the system frequency $f_{sys}$ and to allow the application software to start operation with a compromise of the watchdog time in the middle of the time frame. When the module is used in watchdog mode, the S/W must periodically reset WDTCNT by writing a '1' to bit CNTCL of WDTCTL to prevent expiration of the selected time interval. In case a S/W upset occurs and the time interval expires because the counter is not reset anymore, a reset is generated and system power-up clear PUC is activated. The system restarts at the same program address as after power-up. The cause of reset can be determined by testing bit0 in the Interrupt Flag Register 1 in the SFR block. The appropriate time interval is selected by setting the bits SSEL, IS0 and IS1 accordingly.

Timer mode

Setting bit TMSEL in the WDTCTL register to '1' selects the timer mode. This mode provides periodic interrupts at the selected time interval. A time interval can also be started under S/W control by writing a '1' to bit CNTCL in the WDTCTL register.

The system check generator can run in five different modes. With three of them MCLK and ACLK signals are active. During one mode of them only the ACLK signal is active and during the other remaining mode neither MCLK nor ACLK signal is active. The application requirements set the handling of the watchdog timer in combination with the hardware reaction to the different operating conditions of ACLK and MCLK.

| | |
|---|---|
| CPUOFF mode: | The program execution is stopped. The software should define the operating conditions during this operating mode. |
| MCLKOFF mode/PDM2 . . . 3: | The ACLK signal is active and MCLK is inactive. When ACLK (32 768 Hz) is selected, the watchdog timer continues operation and will awake the CPU through a system reset resp. a timer interrupt (if enabled) depending on the selected operating mode. When MCLK is selected the WDT halts operation until MCLK is restarted. |

| | |
|---|---|
| OSCOFF mode/PDM4: | The MCLK and ACLK signal are inactive and the watchdog timer counter halts until the system is restarted. The software can reset the counter before entering the OscOff mode depending on the application needs. |

The feature of a hold function supports ultra-low power operation and hold of the watchdog timer in applications with intensive use of the various power down modes.

Liquid crystal displays use the ambient luminescence to display information and they do not send out light actively. This mechanism stands for low power consumption. The requirement for visible displayed information is enough luminescence. The liquid crystal should be driven with alternating voltage. DC drive would destroy the liquid crystal. This AC drive requirement is the main factor for any power consumption. The electrical equivalence for the driving stage is a capacitor. Its both electrodes are the back plane or common plane and are controlled by signal COMn and the segment driven by SEGn. The frequency of the AC drive is low—in the range of 1000 Hz to 30 Hz. The data sheets of the LCD manufacturer give defined ranges for this frequency.

Different methods of controlling LC displays were developed in the past. The different driving methods are applied as a compromise between number of segments, number of pins at display and driving source, LCD contrast, temperature range. Multiplexing method reduces the number of pins needed.

Figure 51:
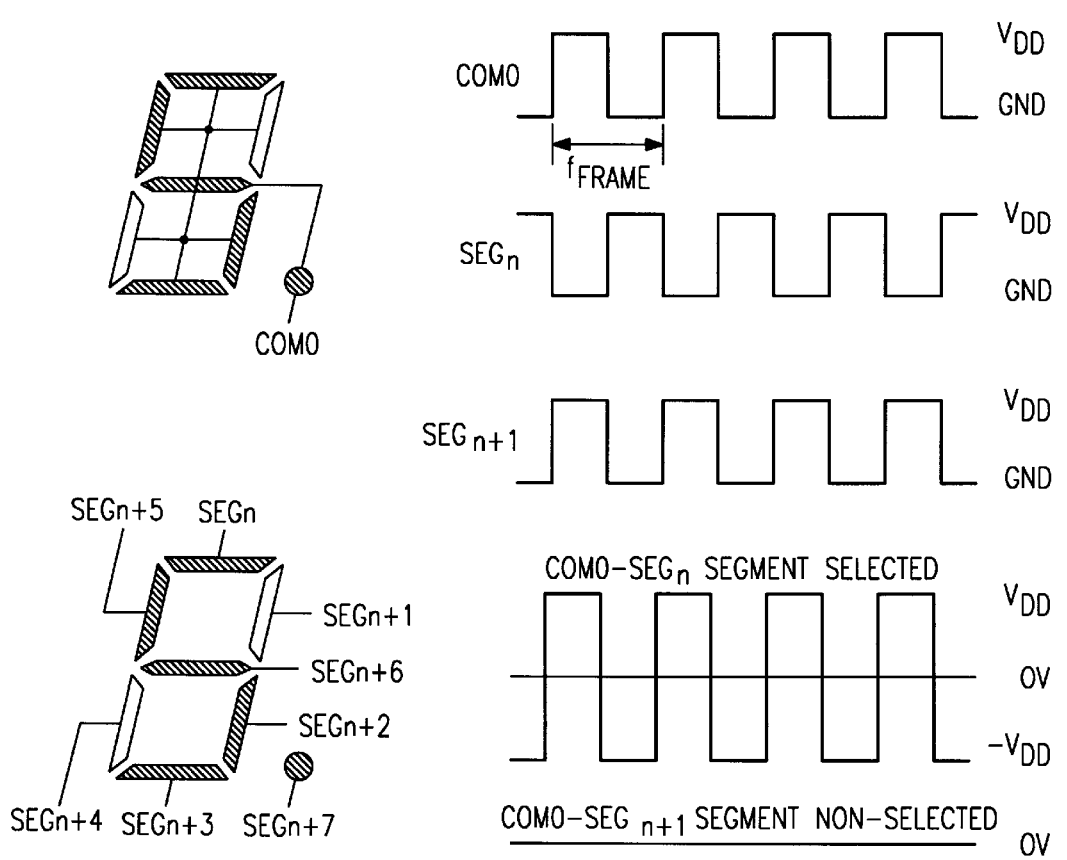
FIG. 51 represents example of static wave form drive.

In the static drive method each segment line drives one segment (see FIG. 51). The example shows one digit on the liquid crystal display including connection example, displaying '5' and the output wave forms.

Figure 52:
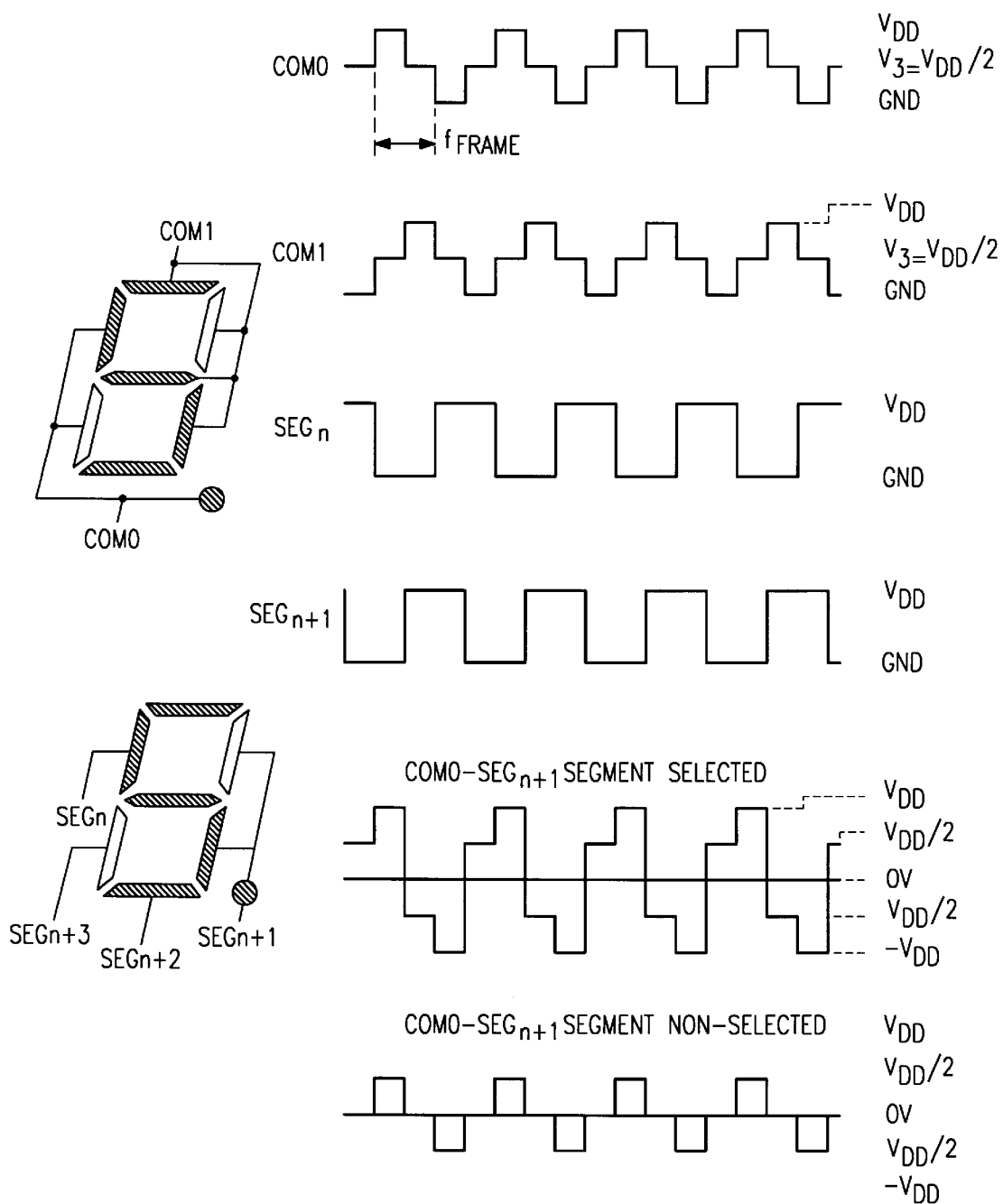
FIG. 52 represents example of 2MUX wave form drive.

In the 2MUX drive each segment line drives two segments (see FIG. 52). The example shows one digit on the liquid crystal display including connection example, displaying '5' and the output wave forms.

Figure 53:
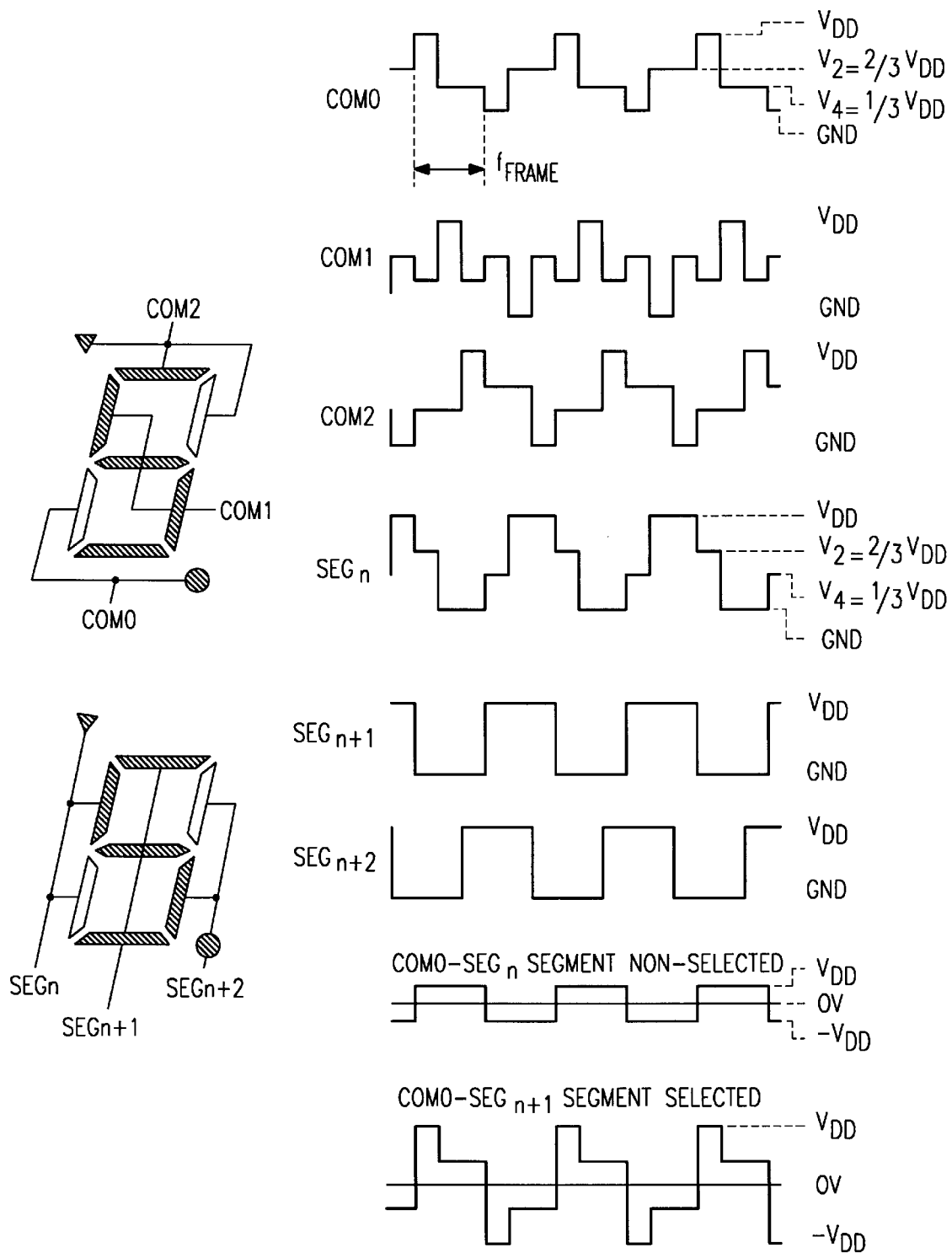
FIG. 53 represents example of 3MUX wave form drive.

In the 3MUX drive each segment line drives three segments (see FIG. 53). The example shows one digit on the liquid crystal display including connection example, displaying '5' and the output wave forms.

Figure 54:
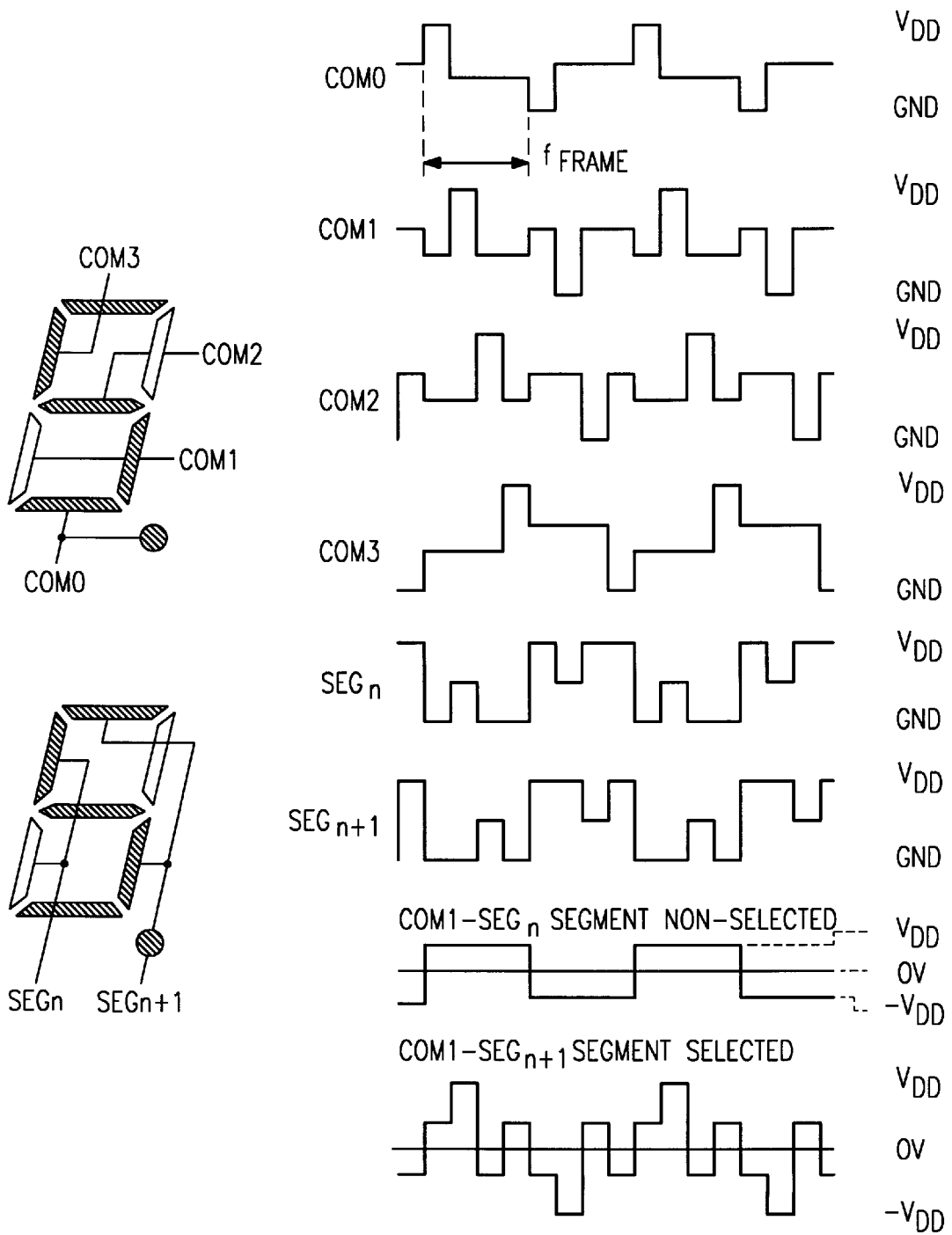
FIG. 54 represents example of 4MUX wave form drive.

In the 4MUX drive each segment line drives four segments (see FIG. 54). The example shows one digit on the liquid crystal display including connection example, displaying '5' and the output wave forms.

Figure 55:
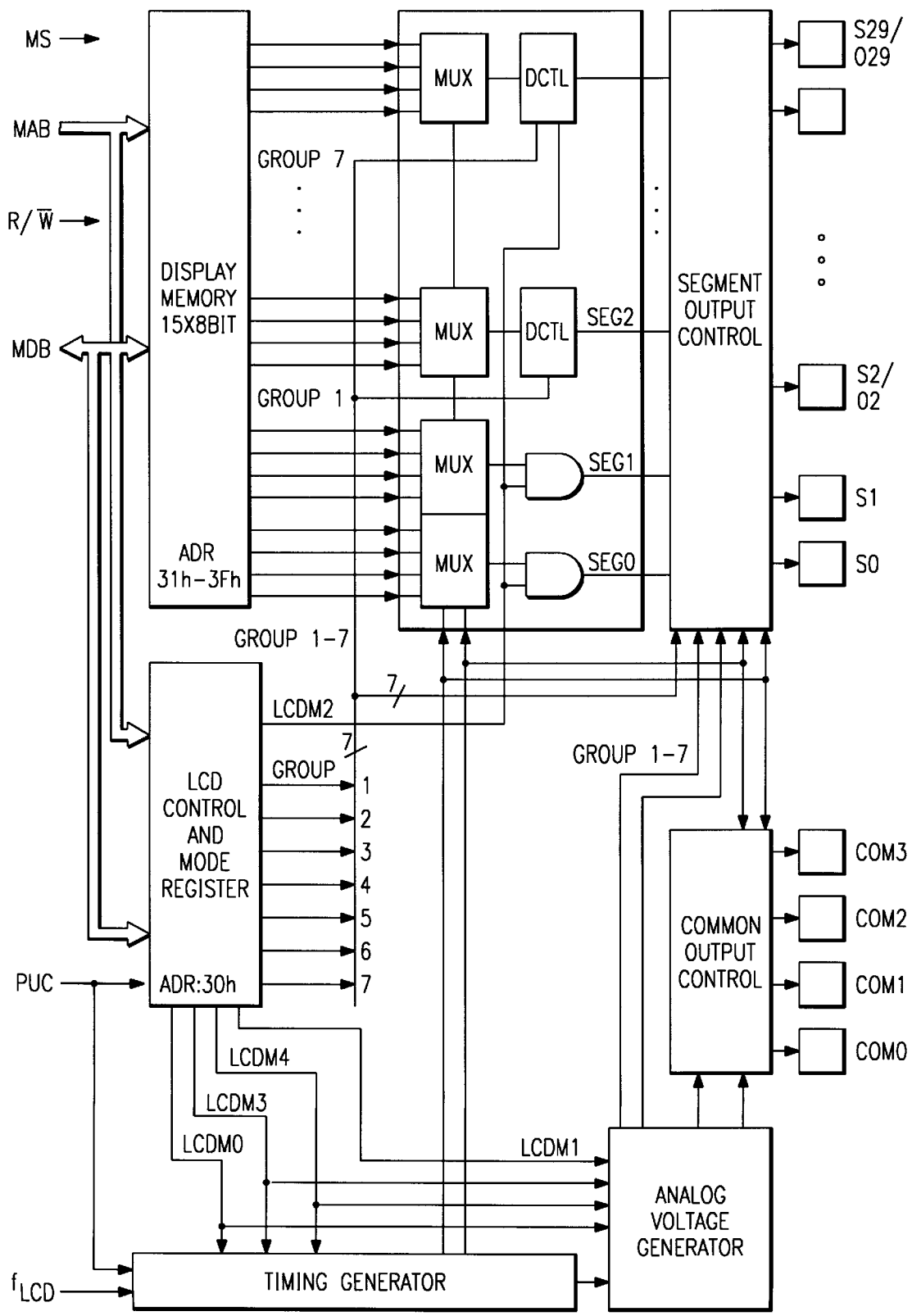
FIG. 55 represents LCD Controller/Driver Block Diagram.

The LCD controller/driver peripheral generates the segment and common signals according to data in the display data memory and is shown in FIG. 55. It contains all functional blocks to drive an external direct connected LCD. The main blocks in the LCD peripherals are:

Data memory containing the segment information

Timing generator

Analog voltage generator

Module bus interface.

The LC Display Memory holds the information to be displayed during all operating and power down modes. The bits in the memory are directly attached to the segments of the liquid crystal display. The figures displayed at the LCD are decoded by the software from the BCD or binary representation to the segment/common conjunction of the individual display. The bit information in the memory matches with one common line and one segment line. The bit information in the memory corresponds to the selection of segments—a bit set in the memory is identically with segment selection 'on' and reverse. One segment line carries the on/off information of one to four segments pending on the multiplex rate:

| | | |
|---|---|---|
| Static drive | -> | one segment information/segment line |
| 2MUX drive | -> | two segment information's/segment line |
| 3MUX drive | -> | three segment information's/segment line |
| 4MUX drive | -> | four segment information's/segment line |

The timing generator of the LCD controller/driver drives the conversion of the parallel information stored in the LC Display Memory into the serial information required for the segment line signal. The bits of the LC Display Memory are fixed connected to the common lines:

| | | | |
|---|---|---|---|
| Static drive | -> | COM0: | Bit 0 to Sn, Bit 4 to Sn+1 |
| 2MUX drive | -> | COM0: | Bit 0 to Sn, Bit 4 to Sn+1, |
| | | COM1: | Bit 1 to Sn, Bit 5 to Sn+1 |
| 3MUX drive | -> | COM0: | Bit 0 to Sn, Bit 4 to Sn+1, |
| | | COM1: | Bit 1 to Sn, Bit 5 to Sn+1 |
| | | COM2: | Bit 2 to Sn, Bit 6 to Sn+1 |
| 4MUX drive | -> | COM0: | Bit 0 to Sn, Bit 4 to Sn+1, |
| | | COM1: | Bit 1 to Sn, Bit 5 to Sn+1 |
| | | COM2: | Bit 2 to Sn, Bit 6 to Sn+1, |
| | | COM3: | Bit 3 to Sn, Bit 7 to Sn+1 |

Figure 56:
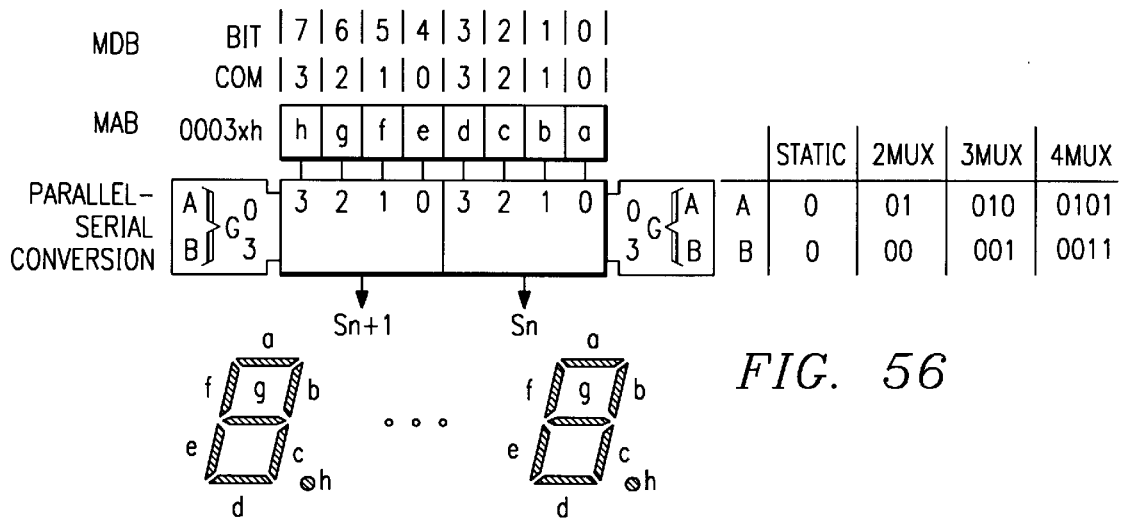
FIG. 56 represents Bits of Display Memory attached to Segment Lines.

The bits of display memory attached to segment lines is illustrated in FIG. 56.

Figure 57:
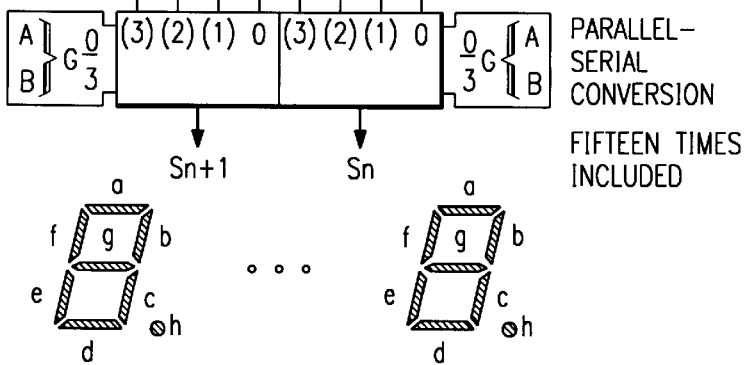
FIG. 57 represents use of Display Memory at static method.

The static driving method uses one common line (see FIG. 57). The active common line is COM0. According to this condition the BIT0 and BIT4 are used for segment information. The other bits can be used like any other memory. The maximum number of segments is 30.

The 2MUX driving method uses two common lines (see FIG. 58). The active common lines are COM0 and COM1. According to this condition the BIT0, BIT1 and BIT4, BIT5 are used for segment information. The other bits can be used like any other memory. The maximum number of segments is 60.

The 3MUX driving method uses three common lines (see FIG. 59). The active common lines are COM0, COM1 and COM2. According to this condition the BIT0, BIT1, BIT2 and BIT4, BIT5, BIT6 are used for segment information. The other bits can be used like any other memory. The maximum number of segments is 90.

The 4MUX driving method uses four common lines (see FIG. 60). The active common lines are COM0, COM1, COM2 and COM3. According to this condition the BIT0, BIT1, BIT2, BIT3 and BIT4, BIT5, BIT6, BIT7 are used for segment information. The maximum number of segments is 120.

Figure 61:
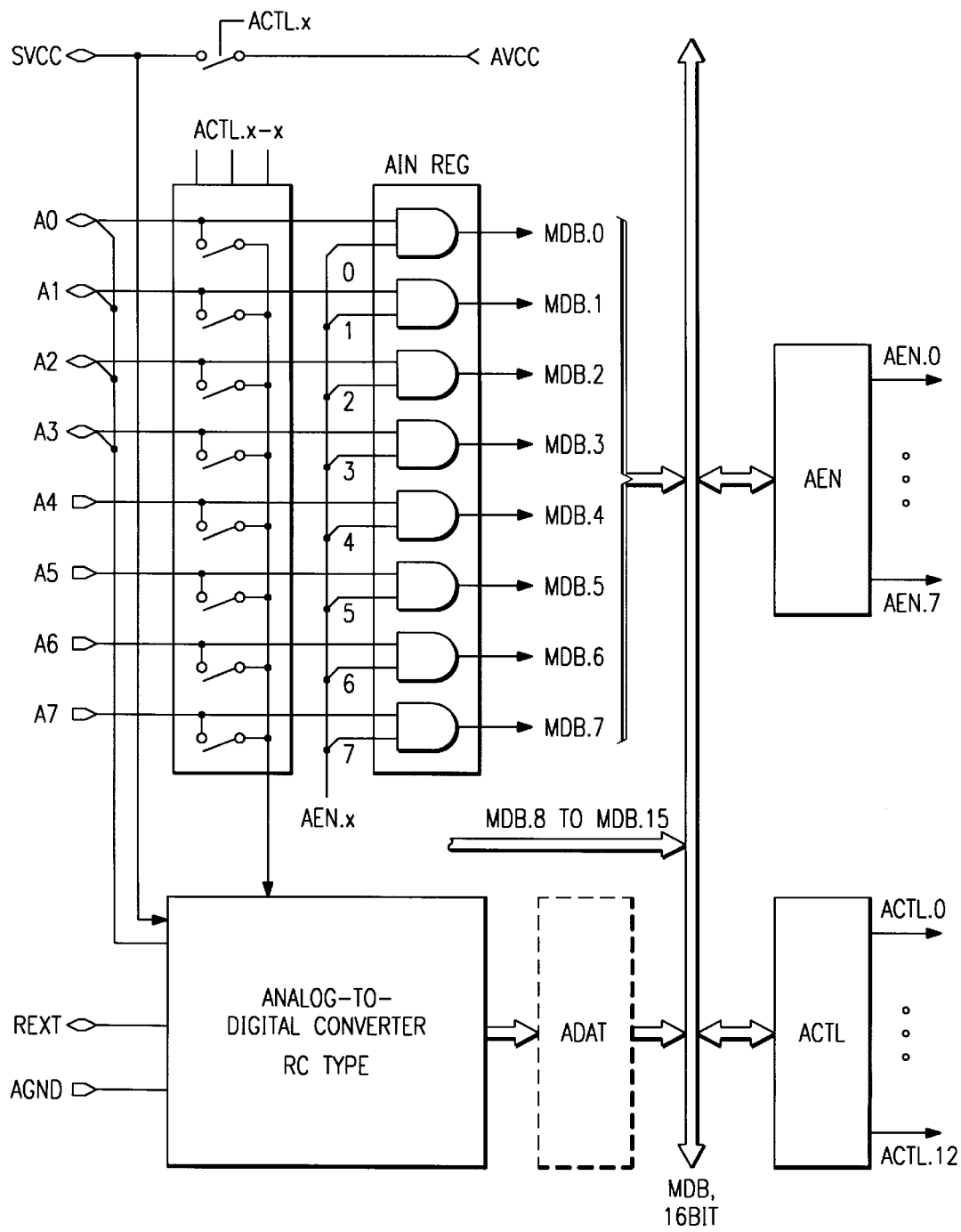
FIG. 61 represents ADC Module Configuration.

The 12+2 bit Analog-to-Digital converter is a peripheral module, connected to the 16 bit memory data bus MDB and shown in FIG. 61. The result of the converter is available on this 16 bit wide bus by reading the ADAT register. It must be noted that when a conversion is started, the bits as they are resolved by the converter are latched by the successive approximation register (SAR). They are available immediately at the ADAT register and are not cleared until the next conversion is initiated by setting the Start-Of-Conversion (SOC) bit in the ACTL register. Since the SAR is transparent to the MDB the conversion progress can be monitored by reading data via the read only ADAT register. The SOC bit clears the SAR register for the new result as well as starting the clock of the A/D converter for another conversion.

The module has eight individually selectable analog input channels that are multiplexed to the converter's input circuitry such that a conversion can be made on any one of these channels at a time. Four of these channels, A0, A1, A2 and A3 are also configured as four constant current source outputs whose values can be programmed by an external resistor Rext. Any of these current source outputs can be turned on (one at a time) to drive external sensors in order to make ratiometric measurements. An absolute measurement can also be made to the accuracy of the reference voltage, by applying an external stable voltage source to the SVCC pin.

The eight channels can also be configured as analog or digital inputs. The digital data can be presented at all eight channels or individually selected channels by writing to the respective bits of the AEN register. The digital data presented at the channels can be read from the AIN register. When a sensitive analog conversion is being done, any digital activity on adjacent channels will cause cross-talk and interference, leading to noise and incorrect output codes. The converter has two modes of operation depending on the status of bit 11 of the ACTL register, either a 12 bit or a 12+2 bit conversion is possible. When the range of the input signal is known two bits from the ACTL register can be used to define the range required with bit 11 reset. The converter will sample the input and then convert it to 12 bits of resolution, within any one of these four ranges. In this manual mode, this yields, effectively a 14 bit dynamic range of operation for the converter. However in the Auto Mode, selected by setting bitll of the ACTL register, the range is automatically selected by the converter to resolve to effectively 14 bits. The input is sampled twice, once for the 2 bit range selection and lastly for the remaining 12 bits of the conversion to give a 12+2 bit result. In both modes, when a conversion is completed (End-Of-Conversion EOC), the interrupt flag is set automatically to signal the microprocessor that a conversion has been completed. The EOC signal also disables the clock for the A/D converter to conserve power until the next SOC bit is set.

The microprocessor core communicates to the A/D via the internal bus system by applying the correct address for the module and supplying the required conditions for the ACTL and AEN registers. It reads the conversion results back via the ADAT registers.

Under power-down the whole Analog-to-Digital converter shuts down to stop current consumption. This is valid while SVCC is not externally driven. Upon a conversion start or power-up signal, the converter wakes up, but may take up to 6 $\mu$s to reach steady state conditions for an accurate conversion.

After powerup, the ACTL register should be programmed to decide whether to make a ratiometeric or absolute measurement, and whether the range is to be manually or automatically selected. In manual mode, once the range bits have been selected these bits can not be changed during the conversion, as this will invalidate the results.

Setting the Start-of-Conversion (SOC) bit in the ACTL register activates the clock for the AID converter for a new conversion to begin. The converter is based on a successive approximation technique utilizing a resistor array to resolve the M most significant bits (MSB'S) first and a switched capacitor array to resolve the remaining L least significant bits (LSB'S).

The resistor array consisting of 2M individual, equally weighted resistors forms the DAC, and the capacitor array consisting of L capacitors forms a charge redistribution A/D. The capacitors are binary-weighted; that is they increase from the smallest value in powers of two. The number of capacitors corresponds to the range of the converter or L bits of the digital output code.

Figure 62:
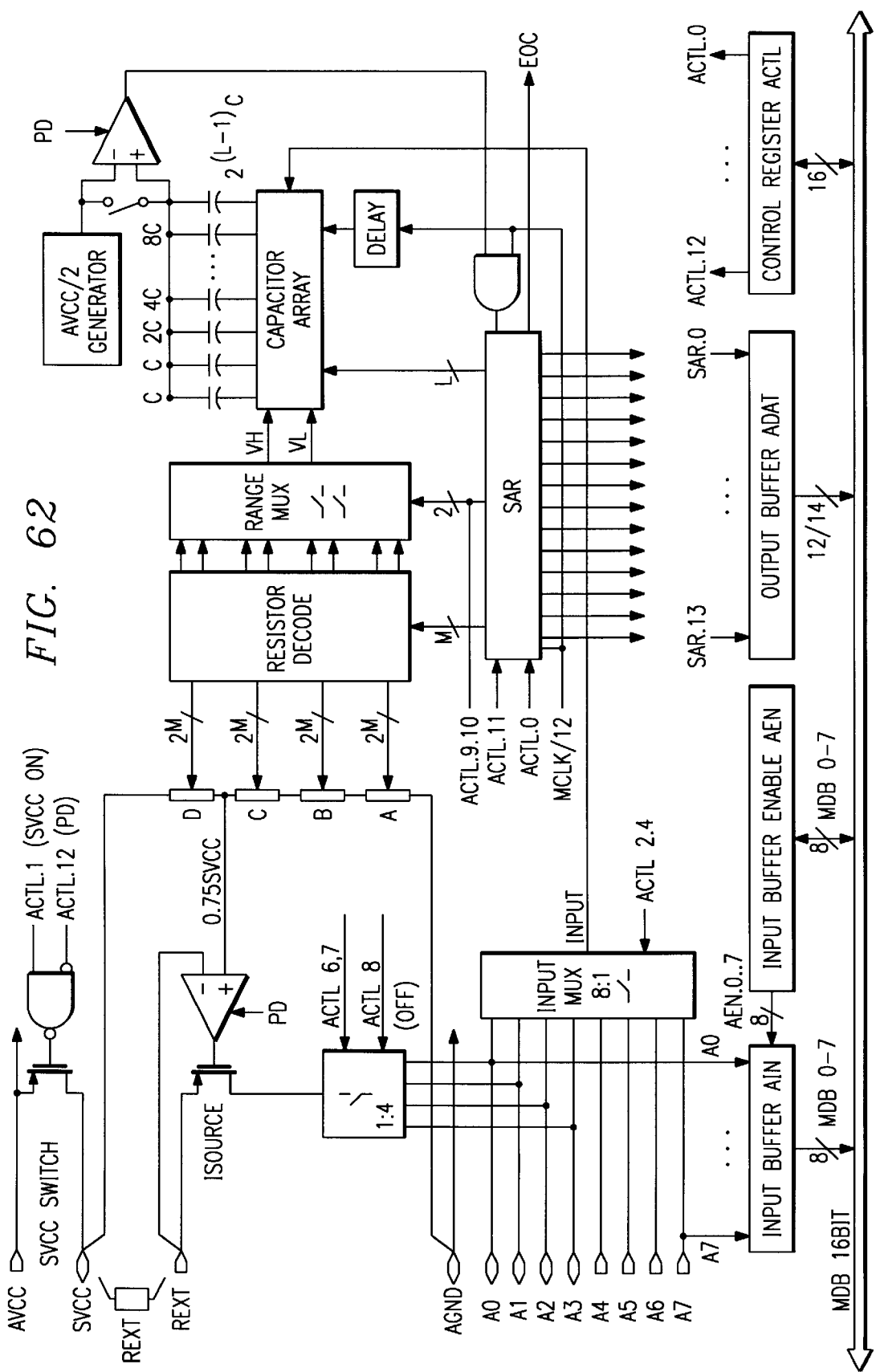
FIG. 62 represents ADC Schematic.

The sequence starts by selecting the analog channel of interest and sampling the analog input voltage onto the top plates of the capacitor array, the analog mux is then disassociated from the A/D and the analog input need not be present anymore after this sample period. A successive approximation search is done on the resistor string to find the tap that corresponds to being within 2L LSB's of VIN, this then gives the VH and VL voltages across one element and has resolved the M MSB's. The capacitor array then resolves this (VH–VL) difference voltage to L bits of resolution using a similar successive approximation search on the capacitor array starting with the MSB capacitor. This switching procedure proceeds with the MSB or largest capacitor to the smallest (LSB) capacitor in the capacitor array, thereby the initial charge is redistributed among the capacitors. The particular setting of the switches both in the resistor array and those connected to the bottoms of the capacitors has then induced a change on the top plate that is as close to the input voltage VIN as possible, and the switch settings then correspond to the binary code (12 bit or 12+2 bit) that represents the fraction VIN/VREF. The top plate voltage is monitored by a comparator with built-in input offset cancellation circuitry which senses whether the input voltage is less than or greater than the voltage on the top plate and generates a digital output which determines which way the successive approximation search is to be performed. The smallest voltage change (LSB) occurs when the smallest capacitor is switched in and this is the resolution of the converter, or $VREF/2^n$ where n is the number of bits. When this sequence is completed, the top plate voltage is as close to zero as the resolution of the converter allows and the LSB has been determined. An End-of-Conversion (EOC) signal is then sent to indicate that a 12 bit or 12+2 bit conversion result is available for reading from the ADAT register for further processing. The schematic of the ADC is shown in FIG. 62.

Figure 63:
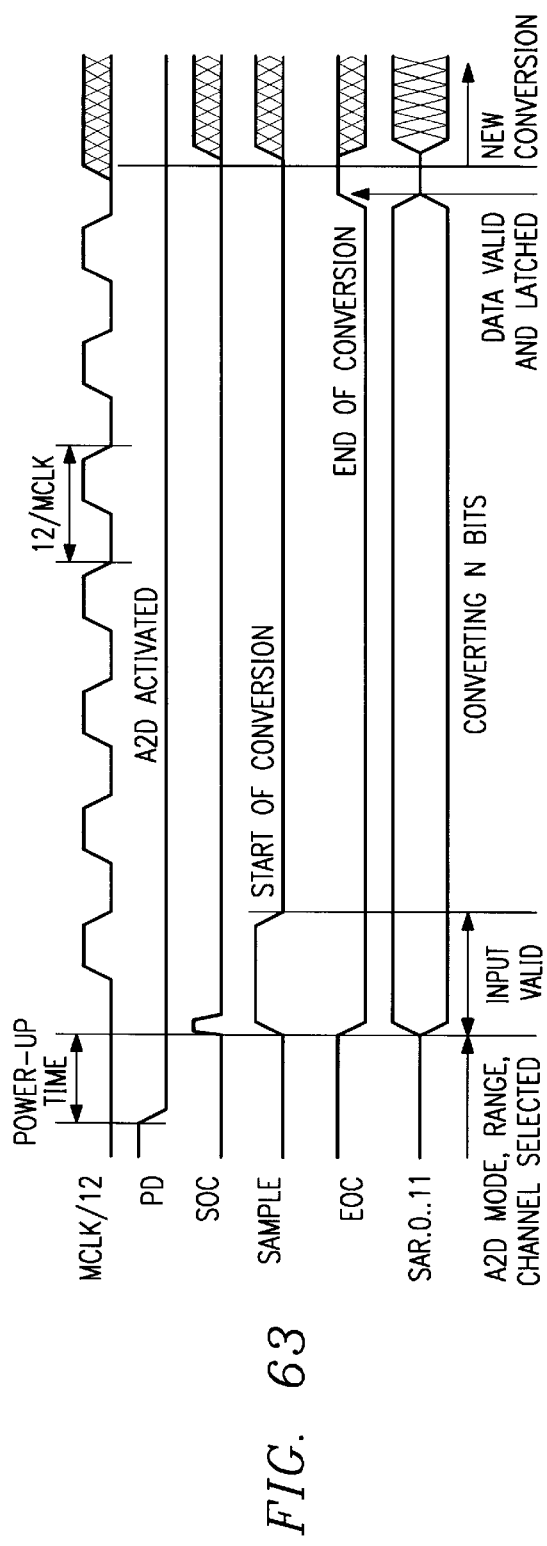
FIG. 63 represents ADC Timing, 12 bit conversion.
Figure 64:
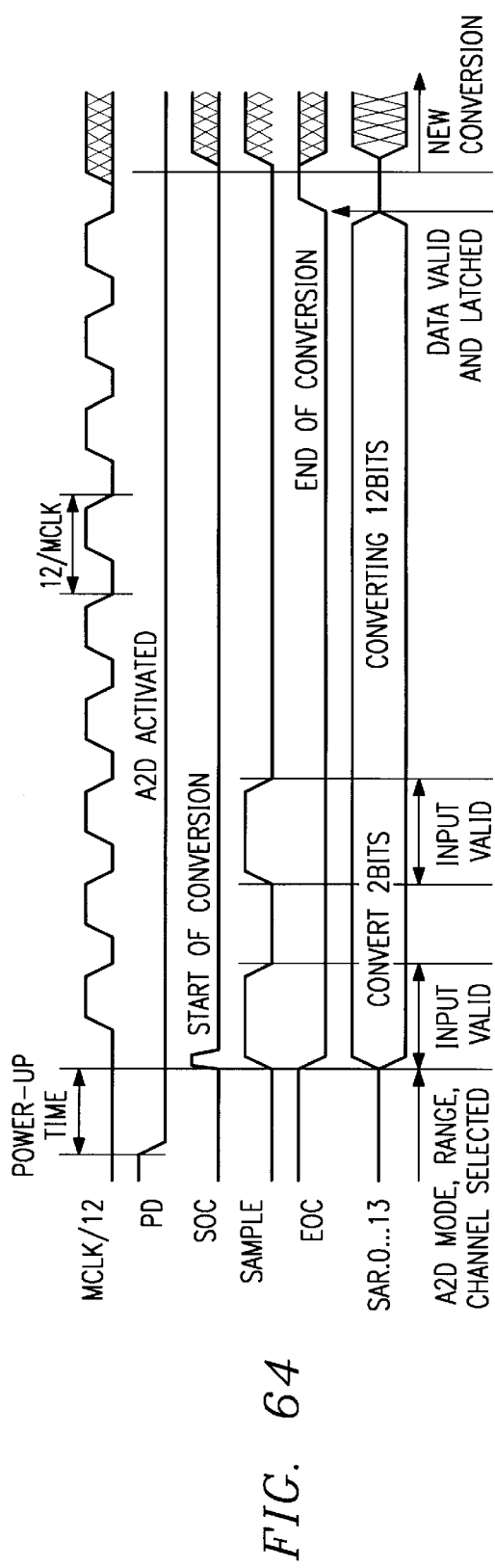
FIG. 64 represents ADC Timing, 12+2 bit conversion.
Figure 65:
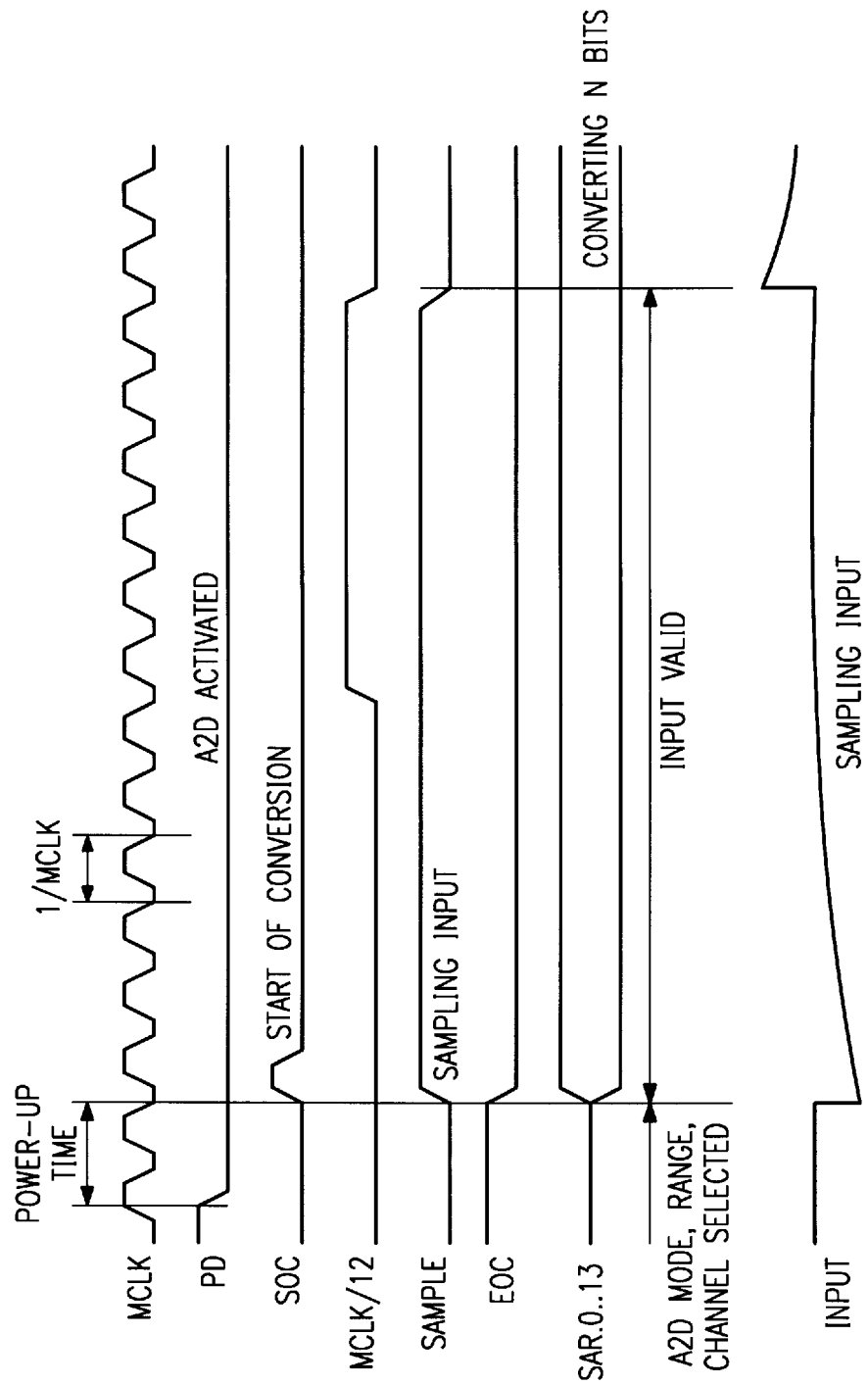
FIG. 65 represents ADC, input sampling timing.

After the ADC module has been activated with the Power Down bit reset, at least 6 $\mu$s time must elapse before a new conversion is attempted in order to allow the correct internal biases to be established. The A/D converter always runs at a clock rate set to an twelveth of the MCLK. The frequency of MCLK should be chosen to meet the conversion time defined in the actual electrical characteristics. If the MCLK is to fast a accurate conversion to 12 bit cannot guaranteed, due to internal time constants associated with sampling the analog input and the conversion network. If the MCLK is too slow a conversion accurate to 12 bits cannot be guaranteed, due to charge loss within the capacitor array of the A/D even if the input signal is valid and steady for the required acquisition time. Sampling the analog input signal takes twelve MCLK clock pulses and the 12 bit conversion takes another twelve times six (72) MCLK clock cycles. This is true for a 12 bit conversion with pre-selected range, ACTL.11 is reset. All together the 12 bit conversion takes 84 MCLK cycles. The ADC timing is shown in FIGS. 63, 64 and 65.

When ACTL.11 is set a 12+2 bit conversion with auto range selected takes place. The analog input signal is sampled twice, each taking twelfe MCLK clock pulses. After the first sampling of the input signal the range conversion is done and takes 12 MCLK clocks. After the second sampling of the input signal the 12 bit conversion is done and takes another 72 (12*6) MCLK clock cycles. All together the 12+2 bit conversion takes 108 MCLK cycles.

The input signal must be valid and steady during this sampling period in order to obtain an accurate conversion. It is also desirable not to have any digital activity on any adjacent digital channels during the whole of the conversion period to ensure errors due to supply glitching and ground bounce or cross-talk interference do not corrupt the results.

The A/D converter uses the charge redistribution method and thus when the inputs are internally switched to sample the input, the switching action causes displacement currents to flow into and out of the analog inputs.

These current spikes or transients occur at the leading and falling edge of the internal sample pulse, and quickly decay and settle before causing any problems because the time constant is less than that given by the internal 'effective RC'. Internally the analog inputs see a nominal RC of effectively a 32pF (C-array) capacitor in series with a 2K resistor (Ron of switches). However if the external dynamic source impedance is large, then these transients may not settle within the allocated sampling time to ensure 12 or 12+2 bits of accuracy.

When an AID conversion is complete, the EOC signal goes high and activates the A/D interrupt circuit by setting the interrupt flag ADCIFG, which informs the rest of the system when a conversion has completed. An interrupt is requested when the enable bit ADIE is set.

One of four ranges can be selected to yield a result with 12 bits of resolution within any one given range. If the bit ACTL.11 is reset, effectively 14 bits of dynamic range are possible. The range is defined prior to conversion start with the bits ACTL.9 and ACTL.10. However if bit 11 is set then the converter will find the appropriate range during the conversion by sampling the input twice, once for the range selection and secondly for the 12 bit conversion, thereby giving overall a (12+2) bit conversion result. The ranges are:

| | |
|---|---|
| 0.00xVREF VIN < 0.25xVREF | Range A |
| 0.25xVREF VIN < 0.50xVREF | Range B |
| 0.50xVREF VIN < 0.75xVREF | Range C |
| 0.75xVREF VIN < 1.00xVREF | Range D |

Where VREF is the voltage at the SVCC pin, either applied externally or that voltage (close to AVCC ) derived by closing the SVCC switch with bit 12 of the ACTL register.

After the proper range has been selected, the input channel, selected by the appropriate bits in the control register, is connected to the input of the converter. The A/D converter processes the signal at the selected input channel and the software can then access the result of the conversion via the ADAT register.

The digital code (Decimal) expected within any one range is:

$$N_{typ} = INT \left| \frac{VIN \times 2^{14}}{VREF} - 2^{13} \times ACTL.10 - 2^{12} \times ACTL.9 \right|$$

where ACTL.10 and ACTL.9 are bits 10 and 9 respectively in the ACTL register.

Thus for a 12 bit conversion:

| | |
|---|---|
| 0000h ≤ N ≤ 0FFFh | Range A |
| 1000h ≤ N ≤ 1FFFh | Range B |
| 2000h ≤ N ≤ 2FFFh | Range C |
| 3000h ≤ N ≤ 3FFFh | Range D | and a 12+2 bit conversion:

0000h≤N≤3FFFh

Note: Any offset voltage (Vio) due to voltage drops at the bottom or top of the resistor array, due to parasitic impedance's to the SVCC pin or the ground AGND pin, will distort the digital code output and the formula.

One of four analog I/O's can be used for the current source output. The current out of the current source (Isource) can be programmed by an external resistor REXT and is then available on pins A0, A1, A2 and A3, with the value:

$$I_{source} = (0.25 \times SVCC)/R_{ext}$$

where SVCC is the voltage at pin SVCC and $R_{ext}$ is the external resistor between pins SVCC and $R_{ext}$.

Therefore for ratiometric measurements the voltage (Vin) developed at the input to the channel with the resistive elements (Channels A0, A1, A2 and A3 only) is:

$$Vin = (0.25 \times SVCC) \times (R_{sens}/R_{ext})$$

where $R_{sens}$ is the external resistive element.

Figure 66:
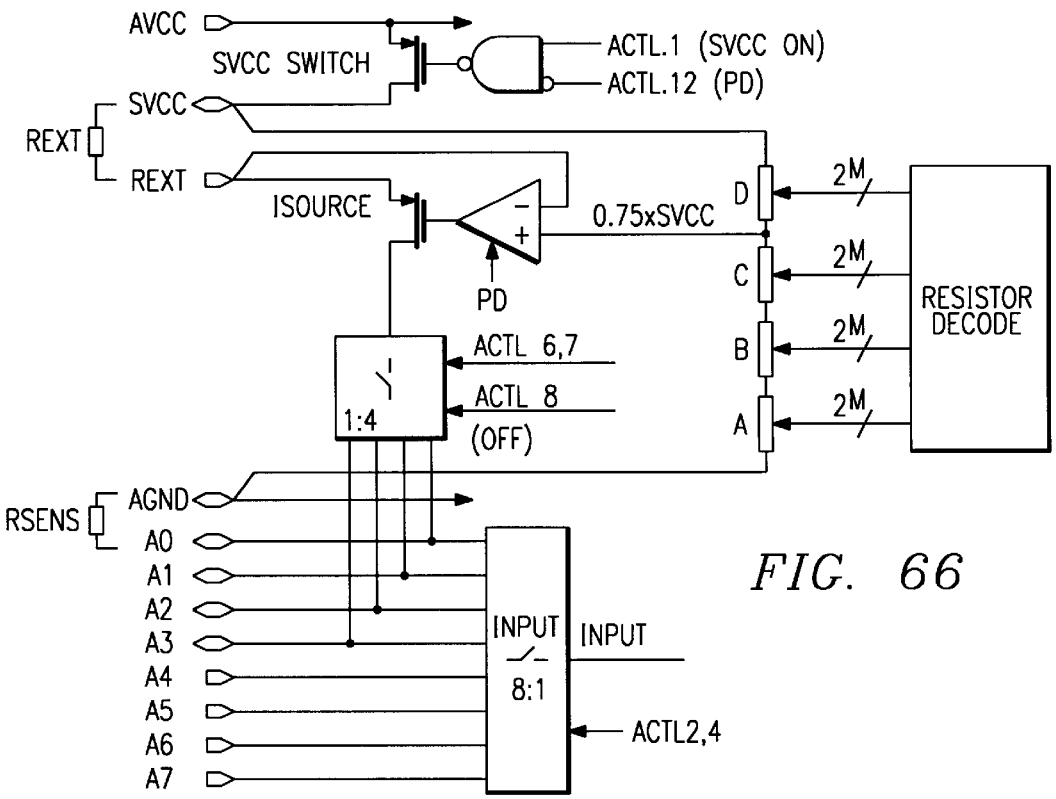
FIG. 66 represents A/D Current Source.

A typical A/D current source is shown in FIG. 66.

When the A/D converter is used in conjunction with resistive elements in sensor applications, current sources of precise value are required so that the input signal can be refered back to the supply voltage or voltage reference in the same manner as the current source, thereby allowing a ratiometric measurement to take place independent of the accuracy of the stable reference.

The analog input signal is sampled onto an internal capacitor and held during the conversion. Since the charge of the capacitance is supplied by the source and the time to charge it up is defined by the sampling time of eight MCLK clocks the external source resistance's and dynamic impedance's must be limited so that the RC time constant is short enough to allow the analog inputs to completely settle within the allocated sampling time to 12 bits accuracy. This is typically a time constant less than $0.8/f_{MCLK}$. High source impedance's have an adverse effect on the accuracy of the converter, not only due to the RC settling behavior , but also due to voltage drops at the inputs due to leakage current or averaged DC input currents (due to input switching currents). Typically for a 12 bit converter, the error in LSB's due to leakage current is:

(LSB's)=4*(uA of leakage current)*(Kohm of source resistance)/(volt of VREF)

Example: 50 nA leakage, 10KΩ of source resistance, 3 V VREF gives 0.7LSB's of error.

This also applies equally to the output impedance of the voltage reference source VREF as well. It must be low enough to enable the transients to settle within (0.2/MCLK) seconds, and generate leakage current induced errors of <<1LSB.

Figure 67:
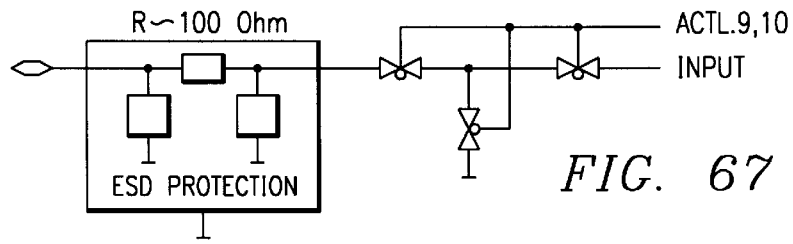
FIG. 67 represents Analog Multiplexer.

The analog multiplexer shown in FIG. 67 selects one of eight single-ended input channels, as determined by the bits in the ACTL register. It is based on a 'T switch' to minimize the coupling between channels corrupting the analog input. Channels that are not selected are isolated from the A/D and the intermediate node connected to the analog ground AGND so that the stray capacitance is 'grounded' to eliminate cross-talk.

Cross-talk exists because there is always some parasitic coupling capacitance across the switch and between switches. This can take several forms, such as coupling from the input to the output of an 'OFF' switch, or coupling from an 'OFF' analog input channel to the output of another adjacent 'ON' output channel causing errors to creep into the digital code output. So for high accuracy conversions cross-talk interference must be minimized altogether by shielding and other well known printed circuit board (PCB) layout techniques.

As with any high resolution converter (≧12 bits) care and special attention has to be paid to the printed circuit board layout and the grounding scheme to eliminate ground loops and any unwanted, parasitic components/effects and noise.

Figure 68:
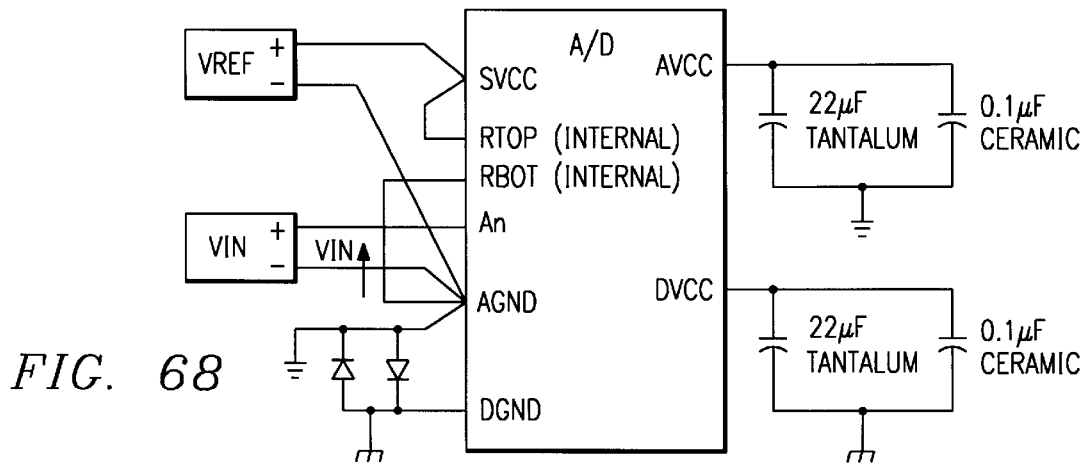
FIG. 68 represents A/D Grounding and Noise Considerations.
Figure 69:
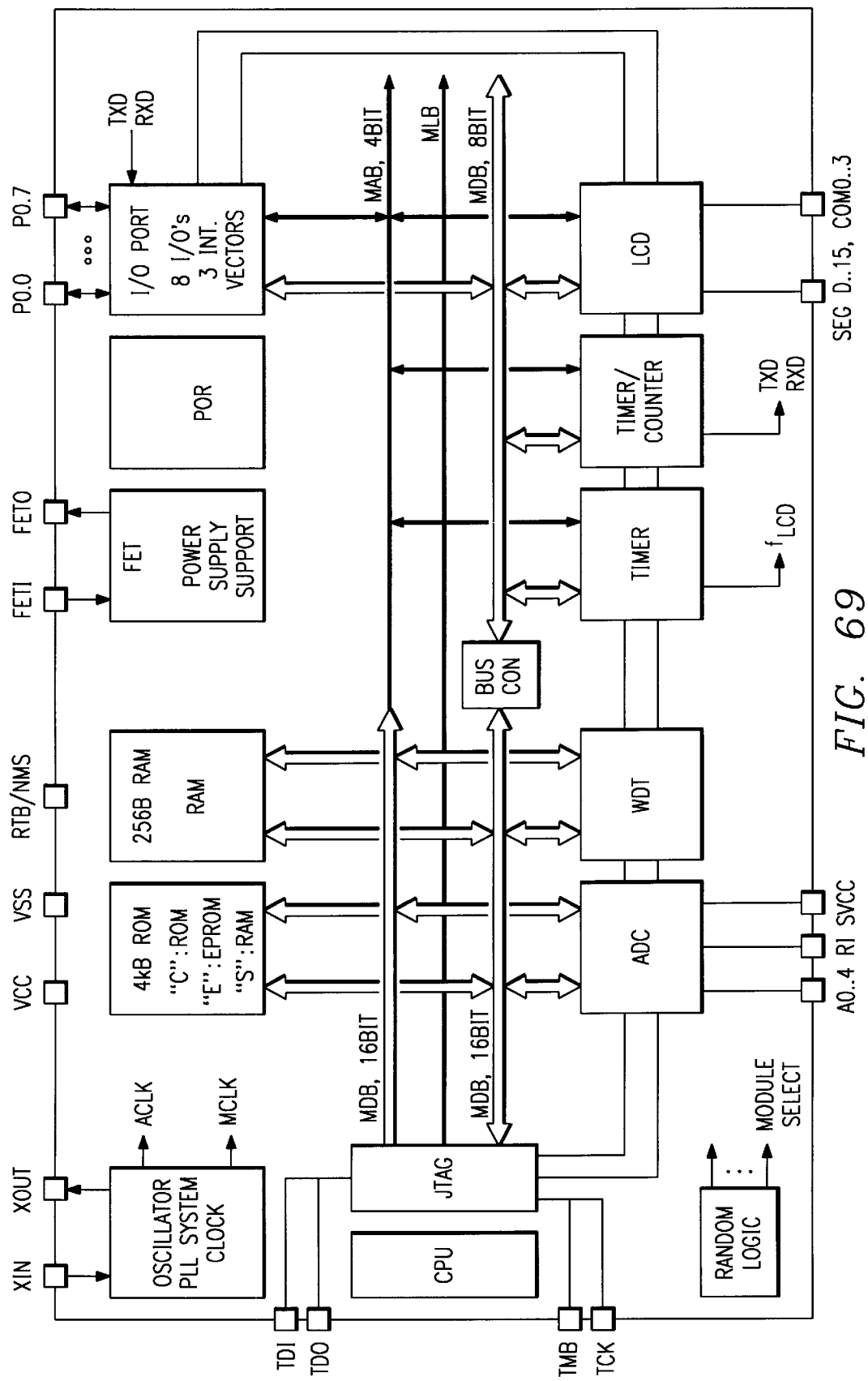
FIG. 69 shows a further example of device architecture.

There are standard techniques which are well documented in application notes that address these issues. Ground Loops, are formed when the return current from the resistor divider of the AID flows through tracks that are common with other analog or digital circuitry. If care is not taken this current can generate small unwanted offset voltages that can add to or subtract from the reference or input voltages of the A/D converter. One way to avoid ground loops is to use the scheme where a 'star connection' is used for the AGND, thereby the ground current or reference currents do not flow through any common input leads, eliminating any error voltages (see FIG. 68).

The digital ground DGND and analog ground AGND can also be star connected together, but if separate supplies are used then two reverse biased diodes limit the voltage difference to less than ±700 mV.

Furthermore ripple and noise spikes on the power supply lines due to digital switching or switching power supplies are especially troublesome.

Normally the internal noise is very small and the total input referred noise is far less than an LSB so the output code is fairly stable. However as noise couples into the device via the supply and ground changes, then the noise margin reduces and code uncertainty and jitter can creep in which may mean taking several readings to average out the noise effects. Another consequence is that as the reference voltage SVCC or VREF is reduced, the absolute value of the LSB also reduces, and therefore the noise becomes even more dominant as the noise margin reduces. Thus a clean, totally noise-free setup becomes of even more paramount importance to achieve the accuracy's desired.

Adding carefully placed bypass capacitors returned to the respective ground planes help in stabilizing the supply current and minimizing the 'noise'.

What is claimed is:

1. A microprocessor or micro-controller formed as a single integrated circuit comprising:

a plurality of similarly addressed modules at least one of said modules being an analog module or an analog interface module;

a clock circuit including a Frequency Locked Loop (FLL) circuit for clocking said microprocessor or micro-controller, said FLL circuit having two states, one of said states having a frequency lock loop active and the other of said states having said frequency lock loop inactive; and a register under control of said microprocessor or micro-controller for controlling the state of said frequency lock loop.

2. A microprocessor or (*) claimed in claim 1 and wherein said analog interface module is an analog to digital converter.

3. A microprocessor or micro-controller as claimed in claim 1 and wherein said analog interface module is a digital to analog converter.

4. A microprocessor or micro-controller as claimed in claim 1 and including:

a central processing unit;

a program memory;

a data memory;

a control circuit for controlling the operating of the processor;

one or more peripheral modules controlled by the CPU; and a plurality of buses connecting the components of the processor.

5. A microprocessor or micro-controller as claimed in claim 1 and wherein said state of said FLL where said loop control is inactive provides a power saving or low power mode.

6. A microprocessor or micro-controller as claimed in claim 5 and having a plurality of different power saving or low power modes.

7. A microprocessor or micro-controller as claimed in claim 6 and wherein said modes are selectable.

8. A microprocessor or micro-controller as claimed in claim 6 and wherein one of said modes provides a greater power saving or requires a lower power than another.

9. A microprocessor or micro-controller as claimed in claim 6 and wherein said mode are arranged to switch off parts of the device stepwise.

10. A microprocessor or micro-controller as claimed in claim 1 and wherein internal architecture is optimized for low power consumption.

11. In a microprocessor or micro-controller having operations controlled by a clock signal, a power saving circuit comprising:

a Frequency Locked Loop (FLL) circuit generating said clock signal, said FLL circuit having two states, one of said states having a frequency lock loop ON and the other of said states having said frequency lock loop OFF; and a register for storing at least one control bit for controlling said state of said frequency lock loop.

* * * * *